(12) United States Patent  
Nomura et al.

(10) Patent No.: US 8,236,146 B2  
(45) Date of Patent: Aug. 7, 2012

(54) PHOTOELECTROCHEMICAL CELL AND ENERGY SYSTEM USING THE SAME

(75) Inventors: Takaiki Nomura, Osaka (JP); Takahiro Suzuki, Osaka (JP); Kenichi Tokuhiro, Osaka (JP); Tomohiro Kuroha, Osaka (JP); Noboru Taniguchi, Osaka (JP); Kazuhito Hatoh, Osaka (JP); Shuzo Tokumitsu, Hyogo (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 12/811,034

(22) PCT Filed: Oct. 29, 2009

(86) PCT No.: PCT/JP2009/005763  
§ 371 (c)(1),  
(2), (4) Date: Jun. 28, 2010

(87) PCT Pub. No.: WO2010/050226  
PCT Pub. Date: May 6, 2010

(65) Prior Publication Data  
US 2010/0282601 A1 Nov. 11, 2010

(30) Foreign Application Priority Data

Oct. 30, 2008 (JP) ................. 2008-279415  
Apr. 10, 2009 (JP) ................. 2009-096315

(51) Int. Cl.  
*C25B 11/04* (2006.01)  
*C25B 9/06* (2006.01)  
*C25B 1/04* (2006.01)

(52) U.S. Cl. ........ 204/248; 205/340; 205/628; 205/630; 204/291; 204/290.01

(58) Field of Classification Search ................ None  
See application file for complete search history.

(56) References Cited

U.S. PATENT DOCUMENTS 4,061,555 A * 12/1977 Miyatani et al. ............. 204/242  
(Continued)

FOREIGN PATENT DOCUMENTS

JP 51-123779 10/1976  
(Continued)

OTHER PUBLICATIONS

Bard, Allen, Design of Semiconductor Photoelectrochemical Systems for Solar Energy Conversion, Journal of Physical Chemistry, 1982, vol. 86, pp. 172-177.*

(Continued)

*Primary Examiner* — Harry D Wilkins, III  
(74) *Attorney, Agent, or Firm* — Hamre, Schumann, Mueller & Larson, P.C.

(57) ABSTRACT

A photoelectrochemical cell (100) includes: a semiconductor electrode (120) including a conductor (121) and an n-type semiconductor layer (122); a counter electrode (130) connected electrically to the conductor (121); an electrolyte (140) in contact with the surfaces of the n-type semiconductor layer (122) and the counter electrode (130); and a container (110) accommodating the semiconductor electrode (120), the counter electrode (130) and the electrolyte (140). The photoelectrochemical cell (100) generates hydrogen by irradiation of the n-type semiconductor layer (122) with light. In the semiconductor electrode (120), relative to the vacuum level, (I) the band edge levels of the conduction band and the valence band in the surface near-field region of the n-type semiconductor layer (122), respectively, are equal to or higher than the band edge levels of the conduction band and the valence band in the junction plane near-field region of the n-type semiconductor layer (122) with the conductor (121), (II) the Fermi level of the junction plane near-field region of the n-type semiconductor layer (122) is higher than the Fermi level of the surface near-field region of the n-type semiconductor layer (122), and (III) the Fermi level of the conductor (121) is higher than the Fermi level of the junction plane near-field region of the n-type semiconductor layer (122).

21 Claims, 51 Drawing Sheets

U.S. PATENT DOCUMENTS

| | | | |
|---|---|---|---|
| 4,181,754 A * | 1/1980 | McKinzie et al. | 427/74 |
| 4,203,814 A * | 5/1980 | Grantham | 205/340 |
| 4,251,289 A * | 2/1981 | Moustakas et al. | 136/255 |
| 4,310,405 A * | 1/1982 | Heller | 204/252 |
| 2003/0025113 A1* | 2/2003 | Van De Walle | 257/11 |
| 2004/0262154 A1* | 12/2004 | Gibson et al. | 204/280 |
| 2007/0227896 A1* | 10/2007 | McNulty et al. | 205/340 |
| 2007/0256729 A1* | 11/2007 | Vijh et al. | 136/252 |
| 2009/0127124 A1* | 5/2009 | Guerra | 205/340 |

FOREIGN PATENT DOCUMENTS

| | | |
|---|---|---|
| JP | 2002-143688 | 5/2002 |
| JP | 2002-234105 | 8/2002 |
| JP | 2002-306963 | 10/2002 |
| JP | 2003-154272 | 5/2003 |
| JP | 2007-39298 | 2/2007 |
| WO | 2006/082801 | 8/2006 |

OTHER PUBLICATIONS

Gratzel, Michael, Photoelectrochemical cells, Nature, Nov. 2001, vol. 414, pp. 338-344.*

Zhao et al, Preparation and photoelectrochemical properties of $Ti_{1-x}V_xO_2$ solid solution thin film photoelectrodes with gradient band gap, Thin Solid Films, No. 340, 1999, pp. 125-131.*

* cited by examiner

PHOTOELECTROCHEMICAL CELL AND ENERGY SYSTEM USING THE SAME

TECHNICAL FIELD

The present invention relates to a photoelectrochemical cell in which water is decomposed by irradiation with light and to an energy system using the photoelectrochemical cell.

BACKGROUND ART

There are conventionally known techniques, for example, in which water is decomposed for obtaining hydrogen and oxygen by irradiation of a semiconductor material that functions as a photocatalyst with light (see Patent Literature 1, for example), or in which a surface of a base material is rendered hydrophilic by covering the surface of the base material with the semiconductor material (see Patent Literature 2, for example).

Patent Literature 1 discloses a method in which an n-type semiconductor electrode and a counter electrode are disposed in an electrolyte and the surface of the n-type semiconductor electrode is irradiated with light, so that hydrogen and oxygen are obtained from the surfaces of both electrodes. Specifically, the use of a $TiO_2$ electrode, a ZnO electrode, a CdS electrode, and the like as the n-type semiconductor electrode is described therein.

Further, Patent Literature 2 discloses a hydrophilic member formed of a base material and a coating layer formed on the surface of the base material, in which the coating layer has a titanium oxide layer that contains titanium oxide particles, and an island-shaped portion that is disposed on the titanium oxide layer and that is made of a second photocatalytic material other than titanium oxide. Specifically, use, as the second photocatalytic material, of a material having potentials at the bottom of a conduction band and the top of a valence band on a more positive side relative to the standard hydrogen electrode potential (negative side relative to the vacuum level) than the titanium oxide is described therein.

Further, there is proposed a photocatalytic thin film that brings about a highly efficient photocatalytic performance under natural light, in which at least one of metal ions such as Nb, V and Cr is injected into a photocatalytic thin film produced on a base to cause a change in the band gap or the potential gradient in the thickness direction of the photocatalytic thin film, thereby forming a gradient film (see Patent Literature 3).

Further, there also is proposed a technique for producing hydrogen by immersing, in a solution containing hydrogen sulfide, a multilayer thin film photocatalyst in which a first compound semiconductor layer and a second compound semiconductor layer that has a band gap different from the first compound semiconductor layer are disposed sequentially on an electrically conductive base material, and then irradiating this multilayer thin film photocatalyst with light (see Patent Literature 4).

CITATION LIST

Patent Literature 1: JP 51(1976)-123779 A
Patent Literature 2: JP 2002-234105 A
Patent Literature 3: JP 2002-143688 A
Patent Literature 4: JP 2003-154272 A

SUMMARY OF INVENTION

Technical Problem

However, the method described in Patent Literature 1 suffers from a problem of a low quantum efficiency for the water-splitting reaction by irradiation with light. This is because it is highly probable that holes and electrons generated by photoexcitation disappear due to recombination before being used for the electrolysis of water.

Patent Literature 2 describes that, among electrons and holes generated by photoexcitation, the electrons transfer to the conduction band of the second photocatalytic material and the holes transfer to the valence band of the titanium oxide, so that the electron-hole pairs are separated, which decreases the probability of the recombination. However, in Patent Literature 2, there is no description about the energy state to be set at the junction plane between the titanium oxide and the second photocatalytic material. When a Schottky barrier junction is formed at the junction plane between the titanium oxide and the second photocatalytic material, Schottky barriers occur at the junction plane in the conduction band and the valence band. At this time, among the electrons and holes generated by photoexcitation, the electrons are confined by the Schottky barrier in the conduction band at the junction plane, and the holes are accumulated around the junction plane of the valence band by the Schottky barrier that serves as a hole stopper in the valence band at the junction plane. Therefore, there has been a problem that the probability of recombination of electrons and holes is increased, compared to the case where the titanium oxide and the second photocatalytic material each are used independently In Patent Literature 3, metal ion doping is used for making a photocatalyst film into a gradient film. However, this configuration has been developed for the purpose of extending the utilized region to the visible light region and improving the light-use efficiency by making a photocatalyst film into a gradient film. Therefore, there is no description about the photocatalytic energy state to be set in the gradient film, and thus optimization of charge separation and the like is not performed.

A multilayer thin film photocatalyst described in Patent Literature 4 has a structure in which two semiconductors, CdS and ZnS, each having a band gap different from the other are joined, and the semiconductor ZnS further is joined to an electrically conductive base material Pt. Patent Literature 4 describes that since these materials with a different band gap are joined, electrons can transfer to the semiconductor ZnS, and further to the electrically conductive base material Pt along the gradient of the band gaps, and therefore can be coupled easily to hydrogen ions on the electrically conductive base material, which facilitates the generation of hydrogen (Paragraphs [0026] and [0027] in Patent Literature 4). However, focusing attention on the junction portions of materials in consideration of the Fermi level (vacuum reference level) of each of the materials, Schottky barriers occur in both the junction portion between CdS (−5.0 eV) and ZnS (−5.4 eV) and the junction portion between ZnS (−5.4 eV) and Pt (−5.7 eV) because the Fermi levels decreases in the transfer direction of the electrons (transfer direction from CdS to ZnS, further from ZnS to Pt). Accordingly, although this configuration can allow the electrons to transfer along the gradient of the band gaps, it hardly allows the electrons to transfer smoothly In view of such conventional problems, it is an object of the present invention to provide a photoelectrochemical cell capable of efficient charge separation between electrons and holes generated by photoexcitation and thus improving the quantum efficiency of the hydrogen evolution reaction by irradiation with light, and an energy system using the photoelectrochemical cell.

Solution to Problem

In order to achieve the object, a first photoelectrochemical cell according to the present invention includes: a semiconductor electrode having a conductor and an n-type semiconductor layer disposed on the conductor; a counter electrode connected electrically to the conductor; an electrolyte in contact with the surfaces of the n-type semiconductor layer and the counter electrode; and a container accommodating the semiconductor electrode, the counter electrode and the electrolyte. The first photoelectrochemical cell generates hydrogen by irradiation of the n-type semiconductor layer with light. Relative to the vacuum level, (I) the band edge levels of the conduction band and the valence band in the surface near-field region of the n-type semiconductor layer, respectively, are equal to or higher than the band edge levels of the conduction band and the valence band in the junction plane near-field region of the n-type semiconductor layer with the conductor; (II) the Fermi level of the junction plane near-field region of the n-type semiconductor layer is higher than the Fermi level of the surface near-field region of the n-type semiconductor layer, and (III) the Fermi level of the conductor is higher than the Fermi level of the junction plane near-field region of the n-type semiconductor layer.

A second photoelectrochemical cell according to the present invention includes: a semiconductor electrode having a conductor and a p-type semiconductor layer disposed on the conductor; a counter electrode connected electrically to the conductor; an electrolyte in contact with the surfaces of the p-type semiconductor layer and the counter electrode; and a container accommodating the semiconductor electrode, the counter electrode and the electrolyte. The second photoelectrochemical cell generates hydrogen by irradiation of the p-type semiconductor layer with light. Relative to the vacuum level, (I) the band edge levels of the conduction band and the valence band in the surface near-field region of the p-type semiconductor layer, respectively, are lower than the band edge levels of the conduction band and the valence band in the junction plane near-field region of the p-type semiconductor layer with the conductor, (II) the Fermi level of the junction plane near-field region of the p-type semiconductor layer is lower than the Fermi level of the surface near-field region of the p-type semiconductor layer, and (III) the Fermi level of the conductor is lower than the Fermi level of the junction plane near-field region of the p-type semiconductor layer.

An energy system according to the present invention includes: the first or second photoelectrochemical cell of the present invention; a hydrogen storage that is connected to the first or second photoelectrochemical cell by a first pipe and that stores hydrogen generated in the first or second photoelectrochemical cell; and a fuel cell that is connected to the hydrogen storage by a second pipe and that converts hydrogen stored in the hydrogen storage into electricity Advantageous Effects of Invention The first and second photoelectrochemical cells of the present invention allow efficient charge separation between electrons and holes generated by photoexcitation to be achieved, and the quantum efficiency of the hydrogen evolution reaction by irradiation with light to be improved. Since the energy system of the present invention is provided with such a photoelectrochemical cell, efficient power supply is rendered possible.

DESCRIPTION OF EMBODIMENTS

Hereinafter, embodiments of the present invention are described in detail with reference to the drawings. It should be noted that the following embodiments are described as an example, and the present invention is not limited to the embodiments. Hereinafter, the same components are denoted by the same referential numerals, and the descriptions thereof will be omitted in some cases.

Embodiment 1

Figure 1:
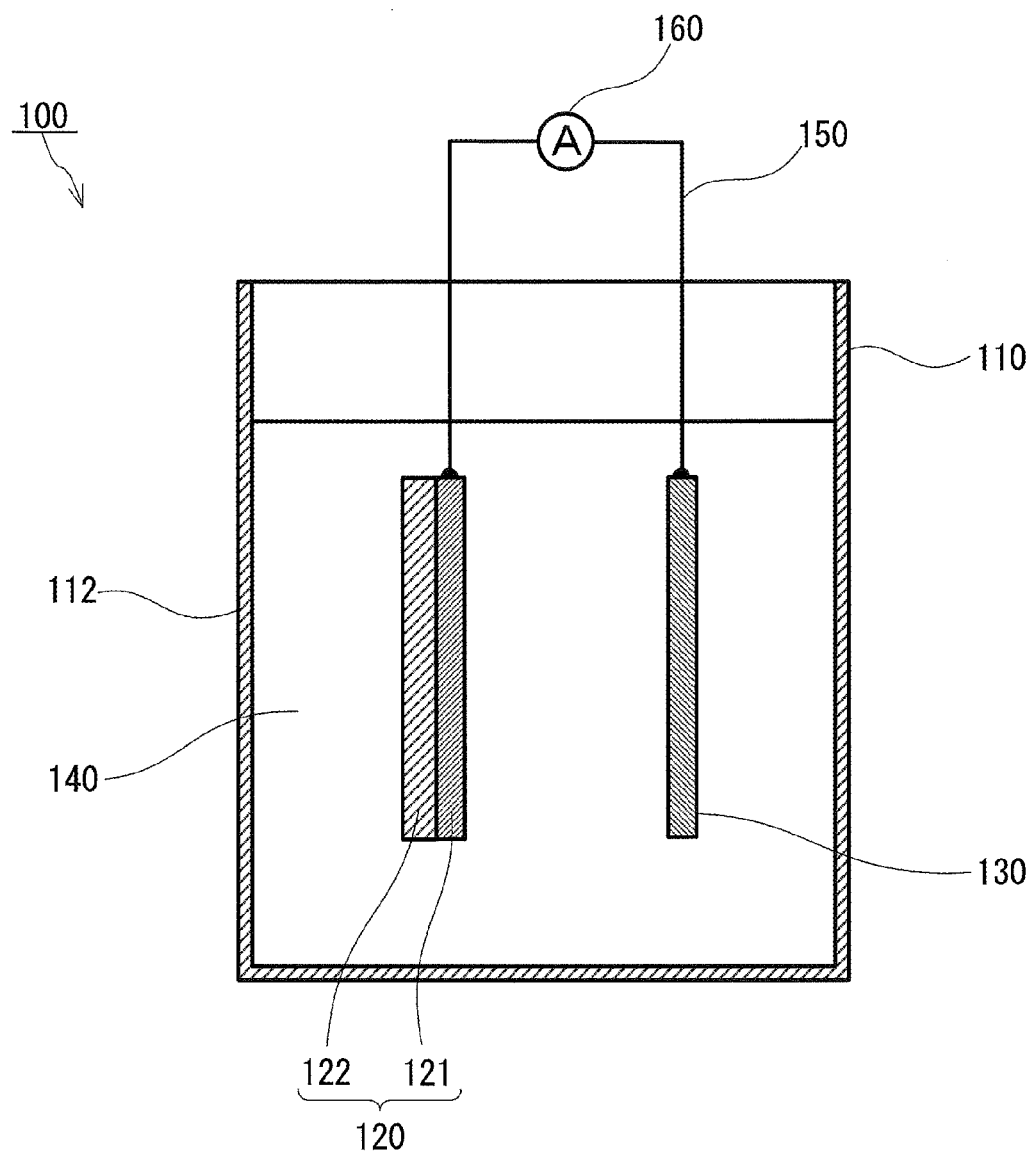
FIG. 1 is a schematic view illustrating a configuration of the photoelectrochemical cell of Embodiment 1 of the present invention.
Figure 2:
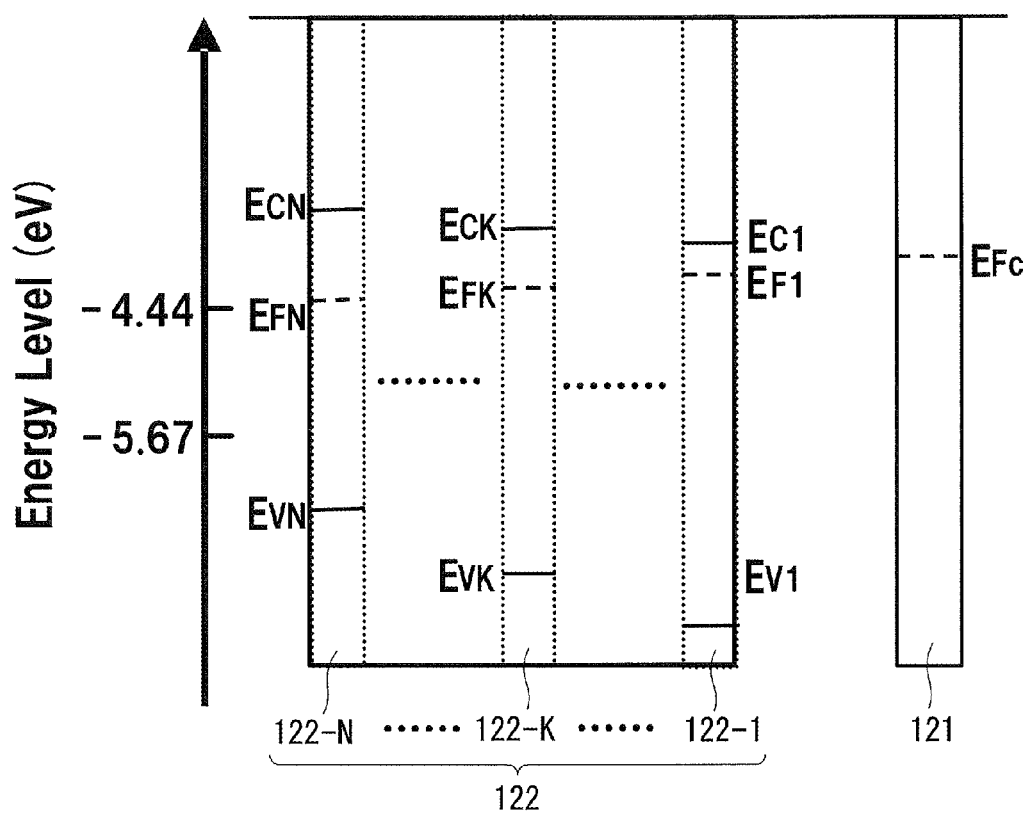
FIG. 2 is a conceptual diagram indicating a band structure of a conductor and an n-type semiconductor layer, before being joined, which constitute a semiconductor electrode in the photoelectrochemical cell of Embodiment 1 of the present invention.
Figure 3:
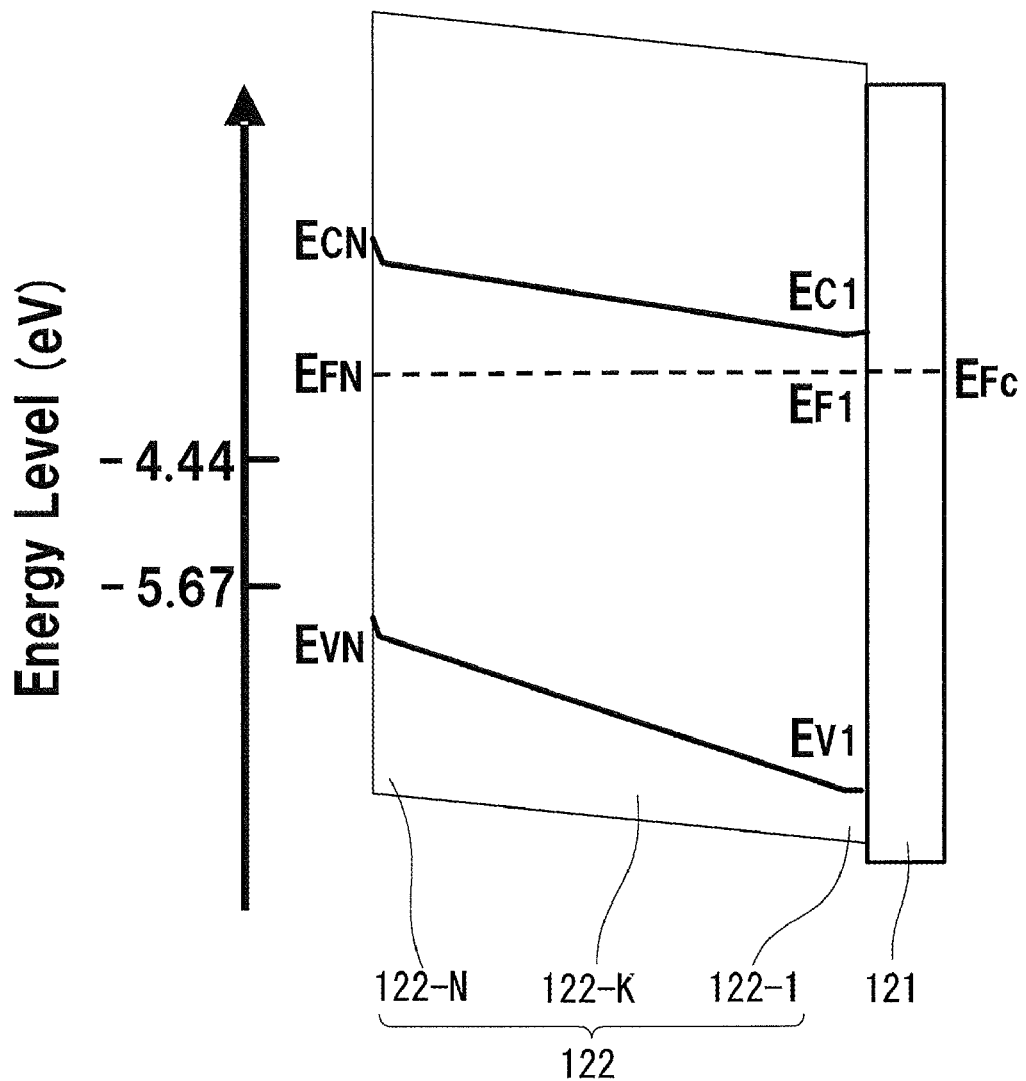
FIG. 3 is a conceptual diagram indicating a band structure of the conductor and the n-type semiconductor layer, after being joined, which constitute the semiconductor electrode in the photoelectrochemical cell of Embodiment 1 of the present invention.

The configuration of the photoelectrochemical cell according to Embodiment 1 of the present invention is described, referring to FIG. 1 to FIG. 3. FIG. 1 is a schematic view illustrating the configuration of the photoelectrochemical cell of the present embodiment. FIG. 2 is a conceptual diagram indicating a band structure of a conductor and an n-type semiconductor layer, before being joined, which constitute a semiconductor electrode in the photoelectrochemical cell of the present embodiment. FIG. 3 is a conceptual diagram indicating a band structure of the conductor and the n-type semiconductor layer, after being joined, which constitute the semiconductor electrode in the photoelectrochemical cell of the present embodiment. In each of FIGS. 2 and 3, the vertical axis indicates energy levels relative to the vacuum level (unit: eV).

As illustrated in FIG. 1, a photoelectrochemical cell 100 of the present embodiment includes a semiconductor electrode 120, a counter electrode 130 paired with the semiconductor electrode 120, an electrolyte 140 containing water, and a container 110 that has an opening and accommodates the semiconductor electrode 120, the counter electrode 130 and the electrolyte 140.

The semiconductor electrode 120 and the counter electrode 130 are disposed inside the container 110 so that the surfaces thereof are in contact with the electrolyte 140. The semiconductor electrode 120 includes a conductor 121 and an n-type semiconductor layer 122 disposed on the conductor 121. The n-type semiconductor layer 122 includes at least two elements, and at least one of the elements in the n-type semiconductor layer 122 has a concentration increasing or decreasing along the thickness direction of the n-type semiconductor layer 122. Hereinafter, this state of the n-type semiconductor layer 122 may be expressed in such a way that the composition is in a gradient. A portion of the container 110 facing the n-type semiconductor layer 122 of the semiconductor electrode 120 that is disposed inside the container 110 (which is, hereinafter, abbreviated as a light incident portion 112) is made of a material that allows transmission of light, such as sunlight.

The conductor 121 of the semiconductor electrode 120 is connected electrically to the counter electrode 130 by a conducting wire 150. Here, the counter electrode means an electrode that can exchange electrons with a semiconductor electrode without the intermediation of an electrolyte. Accordingly, there is no limitation on the positional relationship and the like of the counter electrode 130 with the semiconductor electrode 120, as long as the counter electrode 130 is connected electrically to the conductor 121 that constitutes the semiconductor electrode 120. It should be noted that since an n-type semiconductor is used for the semiconductor electrode 120 in the present embodiment, the counter electrode 130 should be an electrode capable of receiving electrons from the semiconductor electrode 120 without the intermediation of the electrolyte 140.

Next, the band structure of the conductor 121 and the n-type semiconductor layer 122 in the semiconductor electrode 120 is described. It should be noted that although the n-type semiconductor layer 122 in the present embodiment is constituted actually by a single film having a gradient composition, for convenience of description, the band structure is described, referring to FIG. 2 and FIG. 3, on the assumption that a plurality (N, which is a natural number of not less than 3) of n-type semiconductor thin films with different compositions in steps are joined to one another so as to constitute the n-type semiconductor layer 122. FIG. 2 indicates a state where the conductor 121 and the n-type semiconductor layer 122 are not joined to each other (a state where N of n-type semiconductor thin films that have been assumed for convenience of the description also are not joined to one another). FIG. 3 indicates a state where the conductor 121 and the n-type semiconductor layer 122 are joined to each other. In FIG. 2 and FIG. 3, the near-field region of the junction plane of the n-type semiconductor layer 122 with the conductor 121 (hereinafter, which may be referred to as the junction plane near-field region of the n-type semiconductor layer 122) is denoted by 122-1 as the first n-type semiconductor thin film, the surface near-field region of the n-type semiconductor layer 122 is denoted by 122-N as the Nth n-type semiconductor thin film, and the intermediate region of the n-type semiconductor layer 122 is denoted by 122-K as the Kth n-type semiconductor thin film from the junction plane near-field region 122-1 (where K is an arbitrary natural number satisfying: $2 \leq K \leq N-1$).

As indicated in FIG. 2, the band edge level $E_{CN}$ of the conduction band and the band edge level $E_{VN}$ of the valence band in the surface near-field region 122-N of the n-type semiconductor layer 122, respectively, are higher than the band edge level $E_{C1}$ of the conduction band and the band edge level $E_{V1}$ of the valence band in the junction plane near-field region 122-1 of the n-type semiconductor layer 122, relative to the vacuum level ($E_{CN} > E_{C1}$ and $E_{VN} > E_{V1}$). Since the n-type semiconductor layer 122 has a gradient composition, the band edge level $E_{CK}$ of the conduction band and the band edge level $E_{VK}$ of the valence band in the intermediate region 122-K between the surface near-field region 122-N and the junction plane near-field region 122-1, respectively, are located between those band edge levels of the surface near-field region 122-N and the junction plane near-field region 122-1 ($E_{CN}>E_{CK}>E_{C1}$ and $E_{VN}>E_{VK}>E_{V1}$). Relative to the vacuum level, the Fermi level $E_{F1}$ of the junction plane near-field region 122-1 of the n-type semiconductor layer 122 is higher than the Fermi level $E_{FN}$ of the surface near-field region 122-N of the n-type semiconductor layer 122 ($E_{FN}<E_{F1}$). Further, since the n-type semiconductor layer 122 has a gradient composition, the Fermi level $E_{FK}$ of the intermediate region 122-K is located between the Fermi level of the surface near-field region 122-N and that of the junction plane near-field region 122-1 ($E_{FN}<E_{FK}<E_{F1}$). Furthermore, relative to the vacuum level, the Fermi level $E_{Fc}$ of the conductor 121 is higher than the Fermi level $E_{F1}$ of the junction plane near-field region 122-1 of the n-type semiconductor layer 122 ($E_{F1}<E_{Fc}$).

Next, when the conductor 121, and the junction plane near-field region 122-1, the intermediate region 122-K and the surface near-field region 122-N of the n-type semiconductor layer 122 are joined to one another, at the junction planes of the junction plane near-field region 122-1, the intermediate region 122-K and the surface near-field region 122-N of the n-type semiconductor layer 122, carriers transfer so that the Fermi levels match one another, thereby causing bending of the band edge as indicated in FIG. 3. At this time, since the relationships of $E_{CN}>E_{CK}>E_{C1}$, $E_{VN}>E_{VK}>E_{V1}$, and $E_{FN}<E_{FK}<E_{F1}$ are satisfied relative to the vacuum level, as described above, no Schottky barriers occur inside the n-type semiconductor layer 122, and thus ohmic contacts are formed inside the n-type semiconductor layer 122.

When the above-mentioned semiconductor electrode 120 is made to be in contact with the electrolyte 140, the band edge level $E_{CN}$ of the conduction band and the band edge level $E_{VN}$ of the valence band in the surface near-field region 122-N are raised at the interface between the surface near-field region 122-N of the n-type semiconductor layer 120 and the electrolyte 140. Thus, a space charge layer occurs around the surface of the n-type semiconductor layer 122.

As a comparative embodiment, an n-type semiconductor layer having a band edge level of the conduction band in the surface near-field region lower than the band edge level of the conduction band in the junction plane near-field region, relative to the vacuum level, is assumed. In this case, a square well potential is developed in the band edge level of the conduction band inside the n-type semiconductor layer due to the bending of the band edge of the conduction band in the surface near-field region and the difference in the band edge levels of the conduction band between the surface near-field region and the junction plane near-field region. This square well potential causes the electrons to be accumulated inside the n-type semiconductor layer and the probability of recombination between the electrons and holes generated by photoexcitation to increase.

In contrast, in the photoelectrochemical cell 100 of the present embodiment, the band edge level $E_{CN}$ of the conduction band in the surface near-field region 122-N of the n-type semiconductor layer 122 is set higher than the band edge level $E_{C1}$ of the conduction band in the junction plane near-field region 122-1 of the n-type semiconductor layer 122. Accordingly, no square well potential as mentioned above occurs in the band edge level of the conduction band inside the n-type semiconductor layer 122. Furthermore, since the n-type semiconductor layer 122 has a gradient composition in the thickness direction in the present embodiment, the conduction band also is not flat but in a gradient in the thickness direction. Therefore, the electrons are not accumulated inside the n-type semiconductor layer 122 and can transfer toward the side of the conductor 121, so that the efficiency of charge separation is improved significantly.

As another comparative embodiment, an n-type semiconductor layer having a band edge level of the valence band in the surface near-field region lower than the band edge level of the valence band in the junction plane near-field region, relative to the vacuum level, is assumed. In this case, a square well potential is developed in the band edge level of the valence band inside the n-type semiconductor layer due to the bending of the band edge of the valence band in the surface near-field region and the difference in the band edge levels of the valence band between the surface near-field region and the junction plane near-field region. This square well potential causes the holes that have been generated inside the n-type semiconductor layer by photoexcitation to transfer separately in the interface direction with the electrolyte (surface near-field region side) and in the junction plane direction of the n-type semiconductor layer with the conductor (junction plane near-field region side).

In contrast, in the photoelectrochemical cell 100 of the present embodiment, the band edge level $E_{VN}$ of the valence band in the surface near-field region 122-N of the n-type semiconductor layer 122 is set higher than the band edge level $E_{V1}$ of the valence band in the junction plane near-field region 122-1 of the n-type semiconductor layer 122. Accordingly no square well potential as mentioned above occurs in the band edge level of the valence band inside the n-type semiconductor layer 122. Furthermore, since the n-type semiconductor layer 122 has a gradient composition in the thickness direction in the present embodiment, the valence band also is not flat but in a gradient in the thickness direction. Therefore, the holes are not accumulated inside the n-type semiconductor layer 122 and can transfer toward the interface direction with the electrolyte 140, so that the efficiency of charge separation is improved significantly Further, in the photoelectrochemical cell 100 of the present embodiment, the Fermi level $E_{F1}$ of the junction plane near-field region 122-1 of the n-type semiconductor layer 122 is set higher than the Fermi level $E_{FN}$ of the surface near-field region 122-N of the n-type semiconductor layer 122, relative to the vacuum level, in addition to the band edge level of the conduction band and the band edge level of the valence band inside the n-type semiconductor layer 122 being set as mentioned above. This configuration causes band bending but no Schottky barriers inside the n-type semiconductor layer 122. As a result, among the electrons and holes generated by photoexcitation inside the n-type semiconductor layer 122, the electrons transfer in the conduction band toward the junction plane direction of the n-type semiconductor layer 122 with the conductor 121, and the holes transfer in the valence band toward the interface direction with the electrolyte 140. That is, an efficient charge separation between the electrons and holes is possible without being prevented by Schottky barriers. This reduces the probability of the recombination between the electrons and holes generated by photoexcitation inside the n-type semiconductor layer 122, therefore improving the quantum efficiency of the hydrogen evolution reaction by irradiation with light.

Further, in the photoelectrochemical cell 100 of the present embodiment, the Fermi level $E_{Fc}$ of the conductor 121 is set higher than the Fermi level $E_{F1}$ of the junction plane near-field region 122-1 of the n-type semiconductor layer 122, relative to the vacuum level. This configuration causes no Schottky barriers at the junction plane between the conductor 121 and the n-type semiconductor layer 122 as well. Therefore, the electrons can transfer from the n-type semiconductor layer 122 to the conductor 121 without being prevented by Schottky barriers. This further reduces the probability of the recombination between the electrons and holes generated by photoexcitation inside the n-type semiconductor layer 122, therefore further improving the quantum efficiency of the hydrogen evolution reaction by irradiation with light.

It should be noted that, in the photoelectrochemical cell 100 of the present embodiment, the band edge level $E_{CN}$ of the conduction band and the band edge level $E_{VN}$ of the valence band in the surface near-field region 122-N of the n-type semiconductor layer 122, respectively, are set higher than the band edge level $E_{C1}$ of the conduction band and the band edge level $E_{V1}$ of the valence band in the junction plane near-field region 122-1 of the n-type semiconductor layer 122. However, even in the case where the band edge level $E_{CN}$ of the conduction band (or the band edge level $E_{VN}$ of the valence band) in the surface near-field region 122-N of the n-type semiconductor layer 122 is nearly equal to the band edge level $E_{C1}$ of the conduction band (or the band edge level $E_{V1}$ of the valence band) in the junction plane near-field region 122-1 of the n-type semiconductor layer 122, bending of the band edge as indicated in FIG. 3 can be caused at the junction planes of the junction plane near-field region 122-1, the intermediate region 122-K and the surface near-field region 122-N of the n-type semiconductor layer 122. In this case, the Fermi level $E_{F1}$ of the junction plane near-field region 122-1 of the n-type semiconductor layer 122 is set higher than the Fermi level $E_{FN}$ of the surface near-field region 122-N of the n-type semiconductor layer 122 and thus, when the conductor 121, the junction plane near-field region 122-1, the intermediate region 122-K and the surface near-field region 122-N of the n-type semiconductor layer 122 are joined to one another, carriers transfer so that the Fermi levels match one another at the junction planes, which causes the bending of the band edge. Accordingly, the band edge level $E_{CN}$ of the conduction band and the band edge level $E_{VN}$ of the valence band in the surface near-field region 122-N of the n-type semiconductor layer 122, respectively, are set equal to or higher than the band edge level $E_{C1}$ of the conduction band and the band edge level $E_{V1}$ of the valence band in the junction plane near-field region 122-1 of the n-type semiconductor layer 122, thereby bringing about the same effects as those in the photoelectrochemical cell 100 of the present embodiment.

In the present embodiment, when the n-type semiconductor layer 122 is in contact with the electrolyte 140 at a pH of 0 and a temperature of 25° C., the Fermi level $E_{F1}$ of the junction plane near-field region 122-1 is −4.44 eV or more and the band edge level $E_{VN}$ of the valence band in the surface near-field region 122-N is −5.67 eV or less, relative to the vacuum level.

When the Fermi level $E_{F1}$ of the junction plane near-field region 122-1 is −4.44 eV or more, the Fermi level $E_{Fc}$ of the conductor 121 in contact with the junction plane near-field region 122-1 is allowed to be −4.44 eV or more, relative to the vacuum level. This value of −4.44 eV is the oxidation reduction potential of hydrogen. Thus, hydrogen ions are reduced efficiently on the surface of the counter electrode 130 that is connected electrically with the conductor 121, and therefore hydrogen can be generated efficiently Further, when the band edge level $E_{VN}$ of the valence band in the surface near-field region 122-N is −5.67 eV or less, the band edge level $E_{VN}$ of the valence band in the surface near-field region 122-N is allowed to be −5.67 eV or less, relative to the vacuum level. This value of −5.67 eV is the oxidation reduction potential of water. Thus, water is oxidized efficiently on the surface of the n-type semiconductor layer 122, and therefore oxygen can be generated efficiently As described above, when the n-type semiconductor layer 122 is in contact with the electrolyte 140 at a pH of 0 and a temperature of 25° C., water can be decomposed efficiently by setting the Fermi level $E_{F1}$ of the junction plane near-field region 122-1 to −4.44 eV or more and the band edge level $E_{VN}$ of the valence band in the surface near-field region 122-N to −5.67 eV or less, relative to the vacuum level.

It should be noted that although the n-type semiconductor layer 122 that satisfies the above-mentioned energy levels is exemplified in the present embodiment, the Fermi level $E_{F1}$ of the junction plane near-field region 122-1 of the n-type semiconductor layer 122 may be less than −4.44 eV, and the band edge level $E_{VN}$ of the valence band in the surface near-field region 122-N of the n-type semiconductor layer 122 may exceed −5.67 eV, for example. Also in such a case, it is possible to generate hydrogen and oxygen.

Here, the Fermi level and the potential (band edge level) at the bottom of the conduction band of the n-type semiconductor layer 122 can be calculated using the flat band potential and carrier concentration. The flat band potential and carrier concentration of a semiconductor can be determined from the Mott-Schottky plot obtained by measurement using a semiconductor that is a measurement object as an electrode.

Further, the Fermi level of the n-type semiconductor layer 122 in the state of being in contact with the electrolyte 140 at a pH of 0 and a temperature of 25° C. can be determined by measurement of the Mott-Schottky plot using a semiconductor that is a measurement object as an electrode while the semiconductor electrode is in contact with an electrolyte at a pH of 0 and a temperature of 25° C.

The potential (band edge level) at the top of the valence band in the n-type semiconductor layer 122 can be calculated using the band gap and the potential at the bottom of the conduction band in the n-type semiconductor layer 122 that has been calculated by the above-mentioned method. Here, the band gap of the n-type semiconductor layer 122 can be obtained from the optical absorption edge to be observed in the measurement of the light absorption spectrum of a semiconductor that is a measurement object.

The Fermi level of the conductor 121 can be determined, for example, by photoelectron spectroscopy.

Next, the material of each constituent member provided in the photoelectrochemical cell 100 of the present embodiment is described.

In the present embodiment, at least one selected from oxide, sulfide, selenide, telluride, nitride, oxynitride, phosphide and the like can be used for the n-type semiconductor layer 122. Among these, a compound containing at least one element selected from titanium, zirconium, vanadium, niobium, tantalum, chromium, molybdenum, tungsten, manganese, iron, cobalt, zinc, cadmium and the like as a constituent element can be used suitably. The n-type semiconductor layer 122 includes at least two elements, and at least one of the elements in the n-type semiconductor layer 122 has a concentration increasing or decreasing along the thickness direction of the n-type semiconductor layer 122. For example, in the case where the n-type semiconductor layer 122 is formed of one kind of a compound, at least one element composing the compound has a concentration increasing or decreasing along the thickness direction of the n-type semiconductor layer 122. It should be noted that the elements composing the n-type semiconductor layer 122 may include an element having a concentration of 0 at the surface of the n-type semiconductor layer 122 or the junction plane with the conductor 121.

Particularly, it is preferable to use at least one selected from the group consisting of oxide, nitride and oxynitride. This is because, use of oxide, nitride or oxynitride can prevent the n-type semiconductor layer 122 from being dissolved in the electrolyte 140 even if the n-type semiconductor layer 122 of the semiconductor electrode 120 is irradiated with light in a state where the semiconductor electrode 120 is in contact with the electrolyte 140, so that stable operation of the photoelectrochemical cell 100 is possible. Further, at least one element selected from titanium, zirconium, niobium, tantalum and zinc is particularly preferable as a constituent element of the n-type semiconductor layer 122. The n-type semiconductor layer 122 containing one of these elements allows the Fermi level $E_{F1}$ of the junction plane near-field region 122-1 of the n-type semiconductor layer 122 with the conductor 121 to be set to −4.44 eV or more, relative to the vacuum level, while being in contact with the electrolyte 140 at a pH of 0 and a temperature of 25° C. Further, the above-mentioned compound additionally may contain alkali metal ions, alkaline earth metal, or the like.

In the present embodiment, the conductor 121 of the semiconductor electrode 120 is joined to the n-type semiconductor layer 122 by an ohmic contact. Accordingly, for the conductor 121, electrically conductive materials, such as ITO (Indium Tin Oxide) and FTO (Fluorine doped Tin Oxide), or metals such as Ti, Ni, Ta, Nb, Al and Ag, can be used, for example.

It is preferable that, in the surface of the conductor 121, the area that is not covered by the n-type semiconductor layer 122 be covered, for example, by an insulating material such as a resin. With such a configuration, the conductor 121 can be prevented from dissolving in the electrolyte 140.

A material with a low overvoltage is used preferably for the counter electrode 130. In the present embodiment, since an n-type semiconductor is used for the semiconductor electrode 120, hydrogen is generated at the counter electrode 130. Therefore, Pt, Au, Ag, Fe, or the like is used preferably as the counter electrode 130, for example.

Any electrolyte containing water can be used for the electrolyte 140. The electrolyte containing water may be acidic or alkali. In the case where a solid electrolyte is disposed between the semiconductor electrode 120 and the counter electrode 130, the electrolyte 140 in contact with the n-type semiconductor layer 122 of the semiconductor electrode 120 and the surface of the counter electrode 130 can be replaced by pure water for electrolysis.

Next, the operation of the photoelectrochemical cell 100 of the present embodiment is described.

When the n-type semiconductor layer 122 of the semiconductor electrode 120 disposed inside the container 110 is irradiated with sunlight from the light incident portion 112 of the container 110 in the photoelectrochemical cell 100, electrons are generated in the conduction band and holes are generated in the valence band in the portion of the n-type semiconductor layer 122 subjected to the light irradiation (which is the surface near-field region 122-N of the n-type semiconductor layer 122 in the present embodiment). The holes generated at this time transfer toward the surface near-field region 122-N of the n-type semiconductor layer 122. Thus, water is decomposed on the surface of the n-type semiconductor layer 122 according to the following reaction formula (1), so that oxygen is generated. On the other hand, the electrons transfer to the conductor 121 from the junction plane near-field region 122-1 of the n-type semiconductor layer 122 along the bending of the band edge of the conduction band caused by the junction between the conductor 121 and the n-type semiconductor layer 122. The electrons that have transferred to the conductor 121 transfer toward the side of the counter electrode 130 that is connected electrically to the conductor 121 through the conducting wire 150. Thus, hydrogen is generated on the surface of the counter electrode 130 according to the following reaction formula (2).

Formula (1):

$$4h^+ + 2H_2O \rightarrow O_2\uparrow + 4H^+ \quad (1)$$

Formula (2):

$$4e^- + 4H^+ \rightarrow 2H_2\uparrow \quad (2)$$

At this time, since no Schottky barriers occur inside the n-type semiconductor layer 122, the electrons can transfer to the junction plane near-field region 122-1 of the n-type semiconductor layer 122 without being prevented. Accordingly, the probability of the recombination between the electrons and holes generated by photoexcitation inside the n-type semiconductor layer 122 is reduced, and the quantum efficiency of the hydrogen evolution reaction by irradiation with light can be improved.

It should be noted that although an example of using the n-type semiconductor layer 122 that includes at least two elements, in which at least one of the elements has a concentration increasing or decreasing along the thickness direction, is described in the present embodiment, the n-type semiconductor layer 122 is not limited thereto as long as it satisfies the aforementioned relationships (I) to (III) in the first photoelectrochemical cell of the present invention. For example, the n-type semiconductor layer 122 may include the surface near-field region 122-N and the junction plane near-field region 122-1 each having a different crystal structure from the other. Specifically, the same effects as those of the photoelectrochemical cell 100 of the present embodiment can be achieved by the n-type semiconductor layer 122 containing anatase-type titanium oxide and rutile-type titanium oxide, in which the present ratio of the anatase-type titanium oxide is higher than the present ratio of the rutile-type titanium oxide in the surface near-field region 122-N (anatase rich), and the present ratio of the rutile-type titanium oxide is higher than the present ratio of the anatase-type titanium oxide in the junction plane near-field region 122-1 (rutile rich). In this case, a configuration in which the conduction band and the valence band of the n-type semiconductor layer 122 are in a gradient in the thickness direction of the n-type semiconductor layer 122 can be achieved by forming the n-type semiconductor layer 122 so that the present ratio of the anatase-type titanium oxide increases from the junction plane with the conductor 121 toward the surface as well as the present ratio of the rutile-type titanium oxide increases from the surface toward the junction plane with the conductor 121 in the n-type semiconductor layer 122.

In the case of producing the n-type semiconductor layer 122 using rutile-type titanium oxide and anatase-type titanium oxide as mentioned above, the rutile-type titanium oxide and anatase-type titanium oxide to be used each additionally may contain zirconium, vanadium, niobium, tantalum, chromium, molybdenum, tungsten, manganese, iron, cobalt, copper, silver, zinc, cadmium, gallium, indium, germanium, tin, antimony, or the like, as metal ions, without changing its crystal structure. The phrase, "without changing its crystal structure", herein means the extent to which the relationship of the band structure of the rutile-type titanium oxide and anatase-type titanium oxide (the positional relationship of the band edge levels of the conduction band and the valence band) remains unchanged. From such a viewpoint, the amount of the metal ions to be added can be, for example, not more than 0.25 atm %, preferably not more than 0.1 atm %.

Further, since the Fermi level $E_{F1}$ of the junction plane near-field region 122-1 of the n-type semiconductor layer 122 is required to be set higher than the Fermi level $E_{FN}$ of the surface near-field region 122-N also in this case, it is necessary to control the Fermi level of the titanium oxide at the time of the production. The Fermi level of titanium oxide can be controlled by varying the degree of crystallinity. The control of the degree of crystallinity can be achieved by changing the film forming conditions (for example, film forming temperature).

The quantum efficiency can be improved, compared to the case of using each single film, by forming the n-type semiconductor layer 122 from titanium oxide, and allowing the junction plane near-field region thereof to be rutile rich and the surface near-field region thereof to be anatase rich.

Embodiment 2

Figure 4:
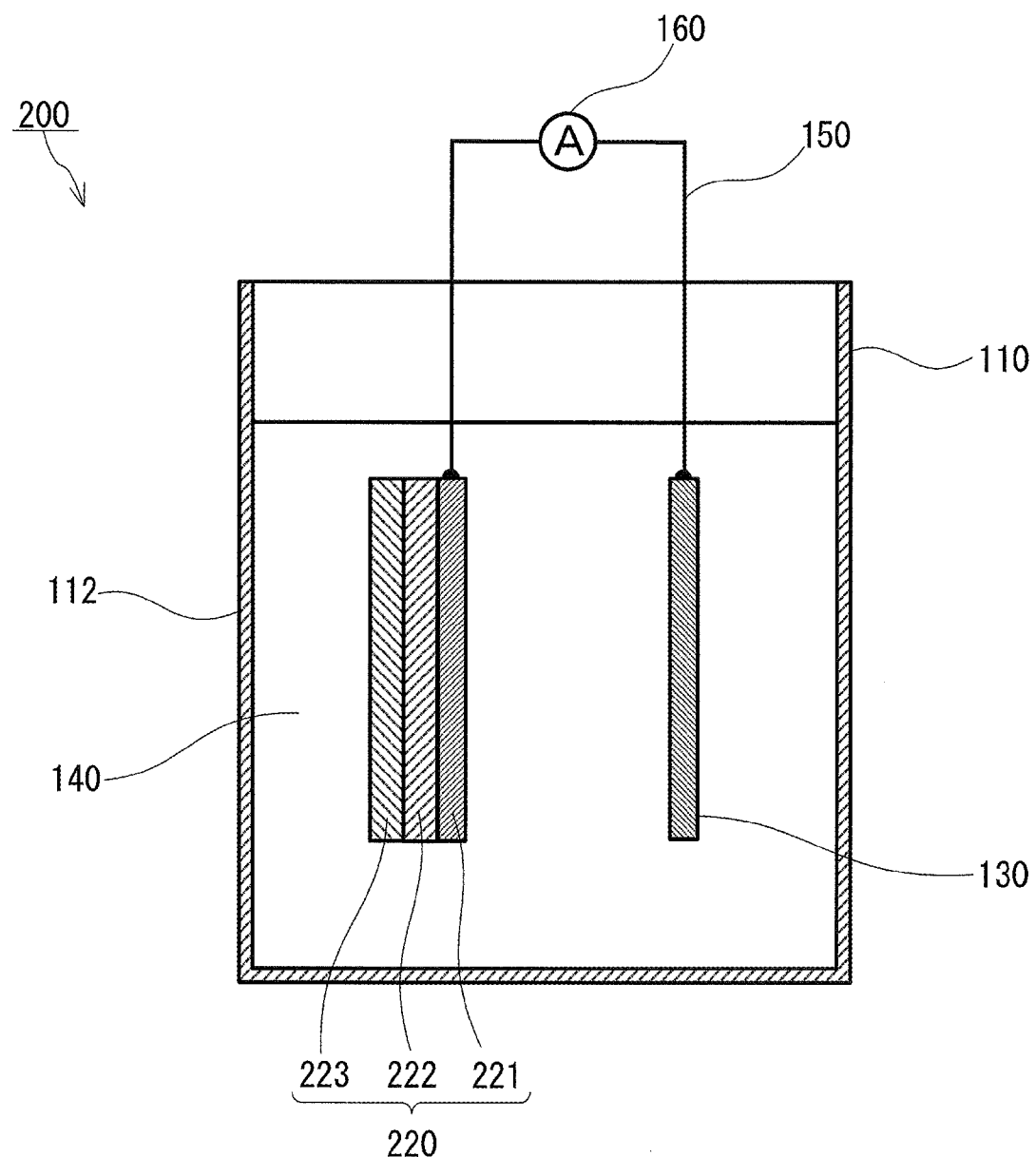
FIG. 4 is a schematic view illustrating a configuration of the photoelectrochemical cell of Embodiment 2 of the present invention.
Figure 5:
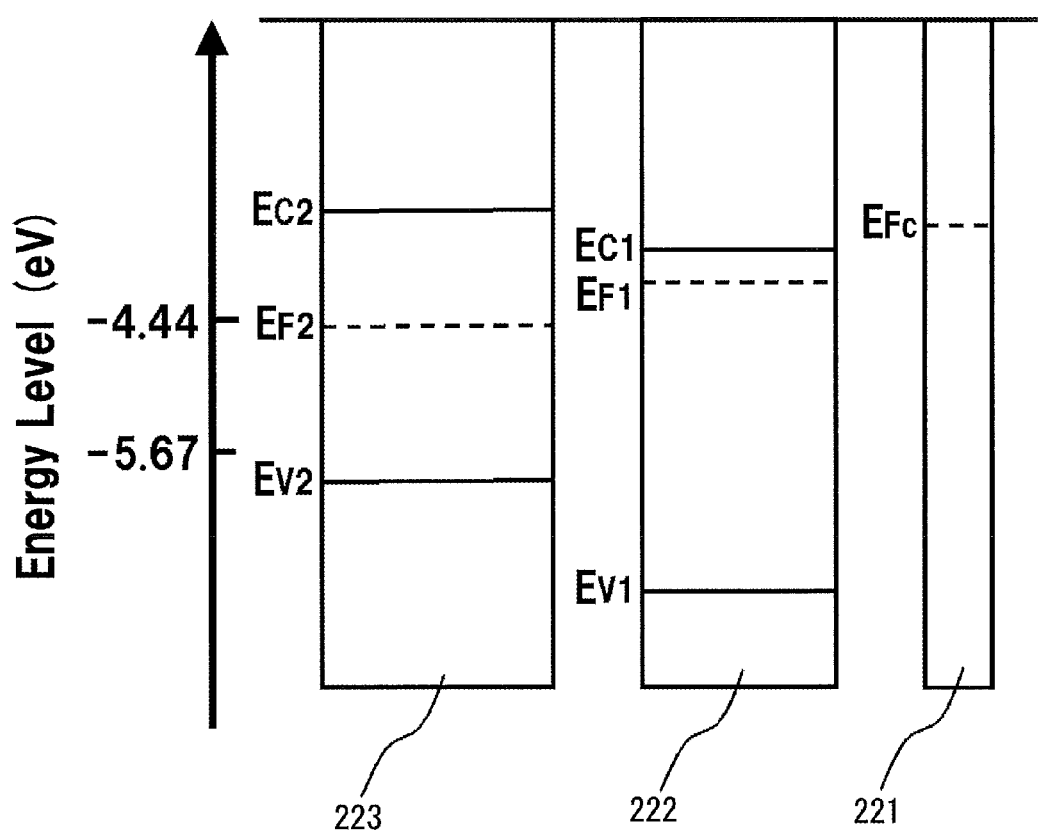
FIG. 5 is a conceptual diagram indicating a band structure of a conductor, a first n-type semiconductor layer and a second n-type semiconductor layer, before being joined, which constitute a semiconductor electrode in the photoelectrochemical cell of Embodiment 2 of the present invention.
Figure 6:
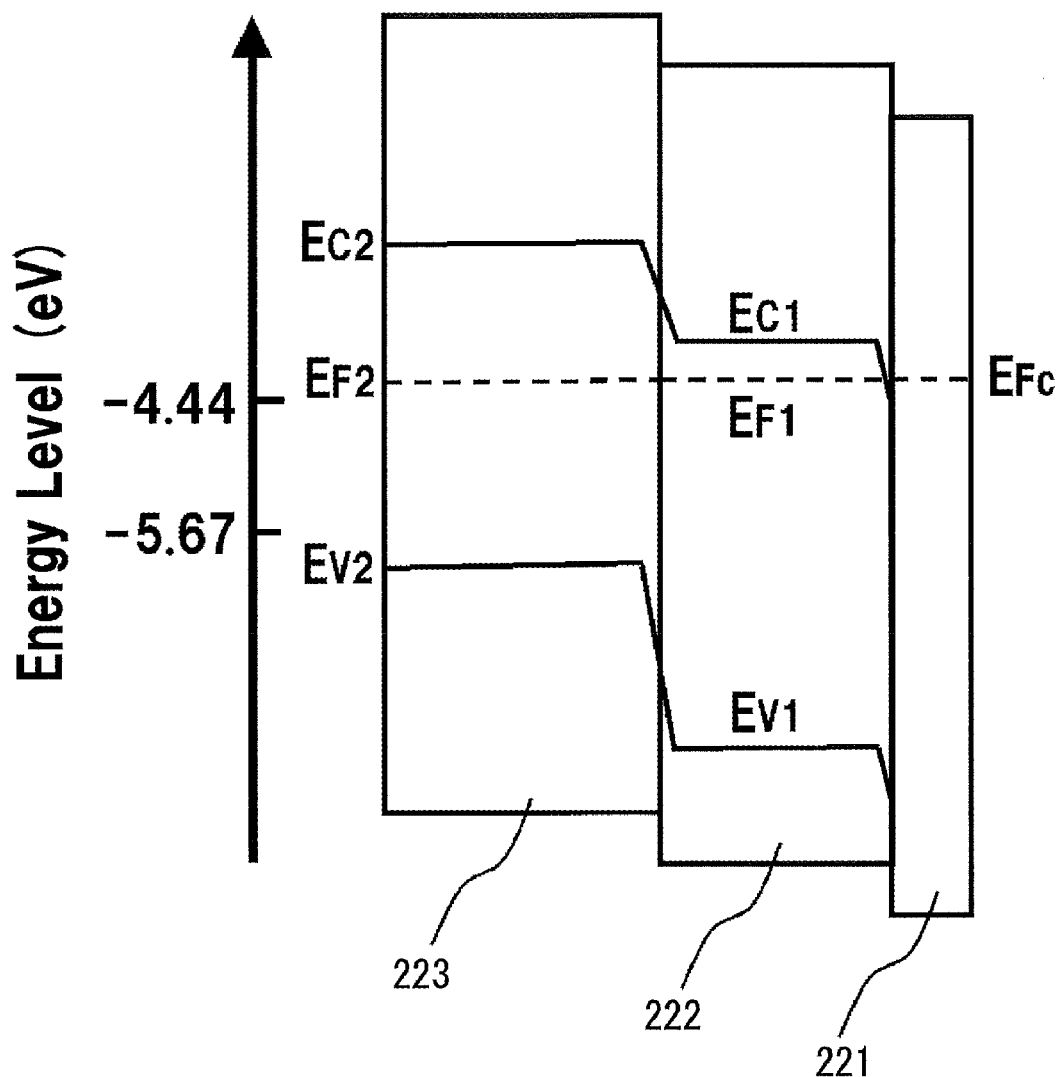
FIG. 6 is a conceptual diagram indicating a band structure of the conductor, the first n-type semiconductor layer and the second n-type semiconductor layer, after being joined, which constitute the semiconductor electrode in the photoelectrochemical cell of Embodiment 2 of the present invention.

The configuration of the photoelectrochemical cell according to Embodiment 2 of the present invention is described, referring to FIG. 4 to FIG. 6. FIG. 4 is a schematic view illustrating the configuration of the photoelectrochemical cell of the present embodiment. FIG. 5 is a conceptual diagram indicating a band structure of a conductor, a first n-type semiconductor layer and a second n-type semiconductor layer, before being joined, which constitute a semiconductor electrode in the photoelectrochemical cell of the present embodiment. FIG. 6 is a conceptual diagram indicating a band structure of the conductor, the first n-type semiconductor layer and the second n-type semiconductor layer, after being joined, which constitute the semiconductor electrode in the photoelectrochemical cell of the present embodiment. In each of FIGS. 5 and 6, the vertical axis indicates energy levels relative to the vacuum level (unit: eV).

As indicated in FIG. 4, a photoelectrochemical cell 200 of the present embodiment has the same configuration as the photoelectrochemical cell 100 of Embodiment 1 except that a semiconductor electrode 220 has a different configuration from the semiconductor electrode 120 of Embodiment 1. Accordingly, only the semiconductor electrode 220 is described in the present embodiment.

The semiconductor electrode 220 is disposed in the same manner as in Embodiment 1 so that the surface thereof is in contact with the electrolyte 140. The semiconductor electrode 220 includes a conductor 221, a first n-type semiconductor layer 222 disposed on the conductor 221, and a second n-type semiconductor layer 223 disposed on the first n-type semiconductor layer 222. That is, an n-type semiconductor layer that constitutes the semiconductor electrode 220 includes the first n-type semiconductor layer 222 and the second n-type semiconductor layer 223 in the present embodiment. The second n-type semiconductor layer 223 faces the light incident portion 112 of the container 110.

The conductor 221 of the semiconductor electrode 220 is connected electrically to the counter electrode 130 by the conducting wire 150.

Next, the band structure of the conductor 221, the first n-type semiconductor layer 222 and the second n-type semiconductor layer 223 in the semiconductor electrode 220 is described.

As indicated in FIG. 5, the band edge level $E_{C2}$ of the conduction band and the band edge level $E_{V2}$ of the valence band in the second n-type semiconductor layer 223, respectively, are higher than the band edge level $E_{C1}$ of the conduction band and the band edge level $E_{V1}$ of the valence band in the first n-type semiconductor layer 222, relative to the vacuum level.

The Fermi level $E_{F1}$ of the first n-type semiconductor layer 222 is higher than the Fermi level $E_{F2}$ of the second n-type semiconductor layer 223, relative to the vacuum level. Further, the Fermi level $E_{Fc}$ of the conductor 221 is higher than the Fermi level $E_{F1}$ of the first n-type semiconductor layer 222, relative to the vacuum level.

When the first n-type semiconductor layer 222 and the second n-type semiconductor layer 223 are regarded as one n-type semiconductor layer as a whole, the second n-type semiconductor layer 223 corresponds to the surface near-field region of the n-type semiconductor layer, and the first n-type semiconductor layer 222 corresponds to the junction plane near-field region with the conductor 221. Accordingly, it can be said that the band edge levels of the conduction band and the valence band in the surface near-field region of the n-type semiconductor layer, respectively, are higher than the band edge levels of the conduction band and the valence band in the junction plane near-field region of the n-type semiconductor layer with the conductor 221 in the present embodiment. Furthermore, it also can be said that the Fermi level of the junction plane near-field region of the n-type semiconductor layer with the conductor 221 is higher than the Fermi level of the surface near-field region of the n-type semiconductor layer, and the Fermi level of the conductor 221 is higher than the Fermi level of the junction plane near-field region of the n-type semiconductor layer with the conductor 221.

In the present embodiment, when the semiconductor electrode 220 is in contact with the electrolyte 140 at a pH of 0 and a temperature of 25° C., the Fermi level $E_{F1}$ of the first n-type semiconductor layer 222 is −4.44 eV or more and the band edge level $E_{V2}$ of the valence band in the second n-type semiconductor layer 223 is −5.67 eV or less, relative to the vacuum level. When the semiconductor electrode 220 satisfies such energy levels, the Fermi level $E_{Fc}$ of the conductor 221 in contact with the first n-type semiconductor layer 222 is allowed to be −4.44 eV or more, relative to the vacuum level. This value of −4.44 eV is the oxidation reduction potential of hydrogen. Thus, hydrogen ions can be reduced efficiently on the surface of the counter electrode 130 that is connected electrically to the conductor 221, so that hydrogen can be generated efficiently Further, when the band edge level $E_{V2}$ of the valence band in the second n-type semiconductor layer 223 is −5.67 eV or less, the band edge level $E_{V2}$ of the valence band in the second n-type semiconductor layer 223 is allowed to be −5.67 eV or less, relative to the vacuum level. This value of −5.67 eV is the oxidation reduction potential of water. Thus, water is oxidized efficiently on the surface of the second n-type semiconductor layer 223, and therefore oxygen can be generated efficiently.

As described above, when the semiconductor electrode 220 is in contact with the electrolyte 140 at a pH of 0 and a temperature of 25° C., water can be decomposed efficiently by setting the Fermi level $E_{F1}$ of the first n-type semiconductor layer 222 to −4.44 eV or more and the band edge level $E_{V2}$ of the valence band in the second n-type semiconductor layer 223 to −5.67 eV or less, relative to the vacuum level.

It should be noted that although the semiconductor electrode 220 that satisfies such energy levels as mentioned above is exemplified in the present embodiment, the Fermi level $E_{F1}$ of the first n-type semiconductor layer 222 may be less than −4.44 eV, and the band edge level $E_{V2}$ of the valence band in the second n-type semiconductor layer 223 may exceed −5.67 eV, for example. Also in such a case, it is possible to generate hydrogen and oxygen.

Next, when the conductor 221, the first n-type semiconductor layer 222 and the second n-type semiconductor layer 223 are joined to one another, carriers transfer between the first n-type semiconductor layer 222 and the second n-type semiconductor layer 223 so that the Fermi levels match each other, thereby causing bending of the band edge at the junction plane therebetween, as indicated in FIG. 6. At this time, the band edge level $E_{C2}$ of the conduction band and the band edge level $E_{V2}$ of the valence band in the second n-type semiconductor layer 223, respectively, are higher than the band edge level $E_{C1}$ of the conduction band and the band edge level $E_{V1}$ of the valence band in the first n-type semiconductor layer 222, and the Fermi level $E_{F1}$ of the first n-type semiconductor layer 222 is higher than the Fermi level $E_{F2}$ of the second n-type semiconductor layer 223, relative to the vacuum level. Therefore, no Schottky barriers occur at the junction plane between the first n-type semiconductor layer 222 and the second n-type semiconductor layer 223.

Further, also at the junction plane between the conductor 221 and the first n-type semiconductor layer 222, carriers transfer so that the Fermi levels match each other, thereby causing bending of the band edge around the junction plane of the first n-type semiconductor layer 222. At this time, since the Fermi level $E_{Fc}$ of the conductor 221 is higher than the Fermi level $E_{F1}$ of the first n-type semiconductor layer 222, relative to the vacuum level, the junction between the conductor 221 and the first n-type semiconductor layer 222 is formed by an ohmic contact.

When the above-mentioned semiconductor electrode 220 is made to be in contact with the electrolyte, the band edge level $E_{C2}$ of the conduction band and the band edge level $E_{V2}$ of the valence band around the surface of the second n-type semiconductor layer 223 are raised at the interface between the second n-type semiconductor layer 223 and the electrolyte. Thus, a space charge layer occurs around the surface of the second n-type semiconductor layer 223.

As a comparative embodiment, an embodiment having a band edge level of the conduction band in the second n-type semiconductor layer lower than the band edge level of the conduction band in the first n-type semiconductor layer, relative to the vacuum level, is assumed. In this case, a square well potential is developed in the band edge level of the conduction band inside the second n-type semiconductor layer due to the bending of the band edge of the conduction band around the surface of the second n-type semiconductor layer and the difference in the band edge levels of the conduction band between the first n-type semiconductor layer and the second n-type semiconductor layer. This square well potential causes the electrons to be accumulated inside the second n-type semiconductor layer, and the probability of recombination between the electrons and holes generated by photoexcitation to increase.

In contrast, in the photoelectrochemical cell 200 of the present embodiment, since the band edge level $E_{C2}$ of the conduction band in the second n-type semiconductor layer 223 is set higher than the band edge level $E_{C1}$ of the conduction band in the first n-type semiconductor layer 222, no square well potential as mentioned above occurs in the band edge level of the conduction band inside the second n-type semiconductor layer 223. Therefore, the electrons are not accumulated inside the second n-type semiconductor layer 223 and can transfer toward the side of the first n-type semiconductor layer 222, so that the efficiency of charge separation is improved significantly.

Further, as another comparative embodiment, an embodiment having a band edge level of the valence band in the second n-type semiconductor layer lower than the band edge level of the valence band in the first n-type semiconductor layer 222, relative to the vacuum level, is assumed. In this case, a square well potential is developed in the band edge level of the valence band inside the second n-type semiconductor layer due to the bending of the band edge of the valence band around the surface of the second n-type semiconductor layer and the difference in the band edge levels of the valence band between the first n-type semiconductor layer and the second n-type semiconductor layer. This square well potential causes the holes that have been generated inside the second n-type semiconductor layer by photoexcitation to transfer separately in the interface direction with the electrolyte and in the interface direction with the first n-type semiconductor layer.

In contrast, in the photoelectrochemical cell 200 of the present embodiment, since the band edge level $E_{V2}$ of the valence band in the second n-type semiconductor layer 223 is set higher than the band edge level $E_{V1}$ of the valence band in the first n-type semiconductor layer 222, no square well potential as mentioned above occurs in the band edge level $E_{V2}$ of the valence band inside the second n-type semiconductor layer 223. Therefore, the holes are not accumulated inside the second n-type semiconductor layer 223 and can transfer toward the interface direction with the electrolyte, so that the efficiency of charge separation is improved significantly Further, in the photoelectrochemical cell 200 of the present embodiment, the Fermi level $E_{F1}$ of the first n-type semiconductor layer 222 is set higher than the Fermi level $E_{F2}$ of the second n-type semiconductor layer 223, relative to the vacuum level, in addition to the band edge levels of the conduction band and the band edge level of the valence band inside the first n-type semiconductor layer 222 and the second n-type semiconductor layer 223 being set as mentioned above. This configuration causes band bending but no Schottky barriers at the interface between the first n-type semiconductor layer 222 and the second n-type semiconductor layer 223. As a result, among the electrons and holes generated by photoexcitation inside the second n-type semiconductor layer 223, the electrons transfer to the conduction band of the first n-type semiconductor layer 222, and the holes transfer in the valence band toward the interface direction with the electrolyte. Therefore, efficient charge separation between the electrons and holes is possible without being prevented by Schottky barriers. This reduces the probability of the recombination between the electrons and holes generated by photoexcitation inside the second n-type semiconductor layer 223, therefore improving the quantum efficiency of the hydrogen evolution reaction by irradiation with light.

Further, in the photoelectrochemical cell 200 of the present embodiment, the Fermi level of the conductor 221 is set higher than the Fermi level of the first n-type semiconductor layer 222, relative to the vacuum level. This configuration causes no Schottky barriers also at the junction plane between the conductor 221 and the first n-type semiconductor layer 222. Therefore, the electrons can transfer from the first n-type semiconductor layer 222 to the conductor 221 without being prevented by Schottky barriers. This further reduces the probability of the recombination between the electrons and holes generated by photoexcitation inside the second n-type semiconductor layer 223, therefore further improving the quantum efficiency of the hydrogen evolution reaction by irradiation with light.

In the photoelectrochemical cell 200 of the present embodiment, the band edge level $E_{C2}$ of the conduction band and the band edge level $E_{V2}$ of the valence band in the second n-type semiconductor layer 223, respectively, are set higher than the band edge level $E_{C1}$ of the conduction band and the band edge level $E_{V1}$ of the valence band in the first n-type semiconductor layer 222. However, even in the case where the band edge level $E_{C2}$ of the conduction band (or the band edge level $E_{V2}$ of the valence band) in the second n-type semiconductor layer 223 is nearly equal to the band edge level $E_{C1}$ of the conduction band (or the band edge level $E_{V1}$ of the valence band) in the first n-type semiconductor layer 222, bending of the band edge as indicated in FIG. 6 can be caused at the junction planes of the conductor 221, the first n-type semiconductor layer 222 and the second n-type semiconductor layer 223. In this case, the Fermi level $E_{F1}$ of the first n-type semiconductor layer 222 is set higher than the Fermi level $E_{F2}$ of the second n-type semiconductor layer 223 and thus, when the conductor 221, the first n-type semiconductor layer 222 and the second n-type semiconductor layer 223 are joined to one another, carriers transfer so that the Fermi levels match one another at the junction planes, which causes the bending of the band edge. Accordingly, the band edge level $E_{C2}$ of the conduction band and the band edge level $E_{V2}$ of the valence band in the second n-type semiconductor layer 223, respectively, are set equal to or higher than the band edge level $E_{C1}$ of the conduction band and the band edge level $E_{V1}$ of the valence band in the first n-type semiconductor layer 222, thereby bringing about the same effects as those in the photoelectrochemical cell 200 of the present embodiment.

It should be noted that the Fermi levels, the potentials (band edge levels) at the bottom of the conduction band, and the potentials (band edge levels) at the top of the valence band of the first n-type semiconductor layer 222 and the second n-type semiconductor layer 223 can be obtained in the same manner as in the n-type semiconductor layer 122 described in Embodiment 1. Further, the Fermi level of the conductor 221 also can be obtained in the same manner as in Embodiment 1.

Next, the materials of the first n-type semiconductor layer 222 and the second n-type semiconductor layer 223 in the present embodiment each are described.

Examples of the semiconductor to be used for the first n-type semiconductor layer 222 and the second n-type semiconductor layer 223 include oxide, sulfide, selenide, telluride, nitride, oxynitride, phosphide, and the like containing titanium, zirconium, vanadium, niobium, tantalum, chromium, molybdenum, tungsten, manganese, iron, cobalt, zinc, cadmium, or the like, as a constituent element.

As the first n-type semiconductor layer 222, oxide that contains titanium, zirconium, niobium, or zinc, as a constituent element, is used preferably. Use of such oxide allows the Fermi level $E_{F1}$ of the first n-type semiconductor layer 222 to be set to −4.44 eV or more, relative to the vacuum level, while the semiconductor electrode 220 is in contact with the electrolyte 140 at a pH of 0 and a temperature of 25° C. The first n-type semiconductor layer 222 may be formed of a single substance of the above-mentioned oxides, or may be formed of a complex compound containing the above-mentioned oxide. Further, the first n-type semiconductor layer 222 may be the above-mentioned oxide additionally containing alkali metal ions, alkaline earth metal, or the like.

The carrier concentration of the second n-type semiconductor layer 223 preferably is lower than the carrier concentration of the first n-type semiconductor layer 222. The second n-type semiconductor layer 223 preferably is one selected from the group consisting of oxide, nitride and oxynitride. In this way, stable operation of the photoelectrochemical cell is possible because the second n-type semiconductor layer 223 is prevented from dissolving in the electrolyte 140, even if the second n-type semiconductor layer 223 is irradiated with light in the state where the semiconductor electrode 220 is in contact with the electrolyte 140.

In the case of using titanium oxide for the first n-type semiconductor layer 222, tantalum nitride, tantalum oxynitride or cadmium sulfide, for example, can be used for the second n-type semiconductor layer 223. Among these, use of tantalum nitride or tantalum oxynitride is preferable. In this way, stable operation of the photoelectrochemical cell is possible because the second n-type semiconductor layer 223 is prevented from dissolving in the electrolyte, even if the second n-type semiconductor layer 223 is irradiated with light in the state where the semiconductor electrode 220 is in contact with the electrolyte 140.

Further, for example, a configuration in which the first n-type semiconductor layer 222 is composed of rutile-type titanium oxide and the second n-type semiconductor layer 223 is composed of anatase-type titanium oxide is possible. The rutile-type titanium oxide and anatase-type titanium oxide to be used herein each additionally may contain zirconium, vanadium, niobium, tantalum, chromium, molybdenum, tungsten, manganese, iron, cobalt, copper, silver, zinc, cadmium, gallium, indium, germanium, tin, antimony, or the like, as metal ions, without changing its crystal structure. The phrase, "without changing its crystal structure", herein has the same meaning as described in Embodiment 1.

In the photoelectrochemical cell 200, since the Fermi level $E_{F1}$ of the first n-type semiconductor layer 222 is required to be set higher than the Fermi level $E_{F2}$ of the second n-type semiconductor layer 223, the Fermi levels of these layers need to be controlled at the time of the production. The Fermi levels of the rutile-type titanium oxide and anatase-type titanium oxide can be controlled by varying the degree of the crystallinity. The degree of the crystallinity can be controlled by changing the film forming conditions (for example, film forming temperature).

When the first n-type semiconductor layer 222 is composed of rutile-type titanium oxide and the second n-type semiconductor layer 223 is composed of anatase-type titanium oxide, the quantum efficiency can be improved, compared to the case of using each single film.

The conductor 221 is joined to the first n-type semiconductor layer 222 by an ohmic contact. The same material as that of the conductor 121 in Embodiment 1 can be used for the conductor 221.

Next, the operation of the photoelectrochemical cell 200 of the present embodiment is described.

When the second n-type semiconductor layer 223 of the semiconductor electrode 220 disposed inside the container 110 is irradiated with sunlight from the light incident portion 112 of the container 110 in the photoelectrochemical cell 200, electrons are generated in the conduction band and holes are generated in the valence band in the second n-type semiconductor layer 223. The holes generated at this time transfer toward the surface side of the second n-type semiconductor layer 223. Thereby, water is decomposed on the surface of the second n-type semiconductor layer 223 according to the above reaction formula (1), so that oxygen is generated. On the other hand, the electrons transfer to the conductor 221 along the bending of the band edge of the conduction band at the interface between the first n-type semiconductor layer 222 and the second n-type semiconductor layer 223 and at the interface between the first n-type semiconductor layer 222 and the conductor 221. The electrons that have transferred to the conductor 221 transfer toward the side of the counter electrode 130 connected electrically to the semiconductor electrode 220 through the conducting wire 150. Thereby, hydrogen is generated on the surface of the counter electrode 130 according to the above reaction formula (2).

At this time, since no Schottky barriers occur at the junction plane between the first n-type semiconductor layer 222 and the second n-type semiconductor layer 223, the electrons can transfer from the second n-type semiconductor layer 223 to the first n-type semiconductor layer 222 without being prevented.

Furthermore, since no Schottky barriers occur also at the junction plane between the first n-type semiconductor layer 222 and the conductor 221, the electrons can transfer from the first n-type semiconductor layer 222 to the conductor 221 without being prevented. Accordingly, the probability of the recombination between the electrons and holes generated by photoexcitation inside the second n-type semiconductor layer 223 is reduced, and the quantum efficiency of the hydrogen evolution reaction by irradiation with light can be improved further.

The photoelectrochemical cells of Comparative Embodiments 2-1 to 2-7 each having a relationship of the energy levels among a first n-type semiconductor layer, a second n-type semiconductor layer and a conductor different from that in the semiconductor electrode 220 are exemplified below and the differences in the operational effects are described. It should be noted that although the relationship of the energy levels among the first n-type semiconductor layer, the second n-type semiconductor layer and the conductor in each of Comparative Embodiments 2-1 to 2-7 indicated below is different from that in the photoelectrochemical cell 200 of the present embodiment, other configurations are the same as in the photoelectrochemical cell 200, and thus descriptions thereof are omitted.

Comparative Embodiment 2-1

Figure 7:
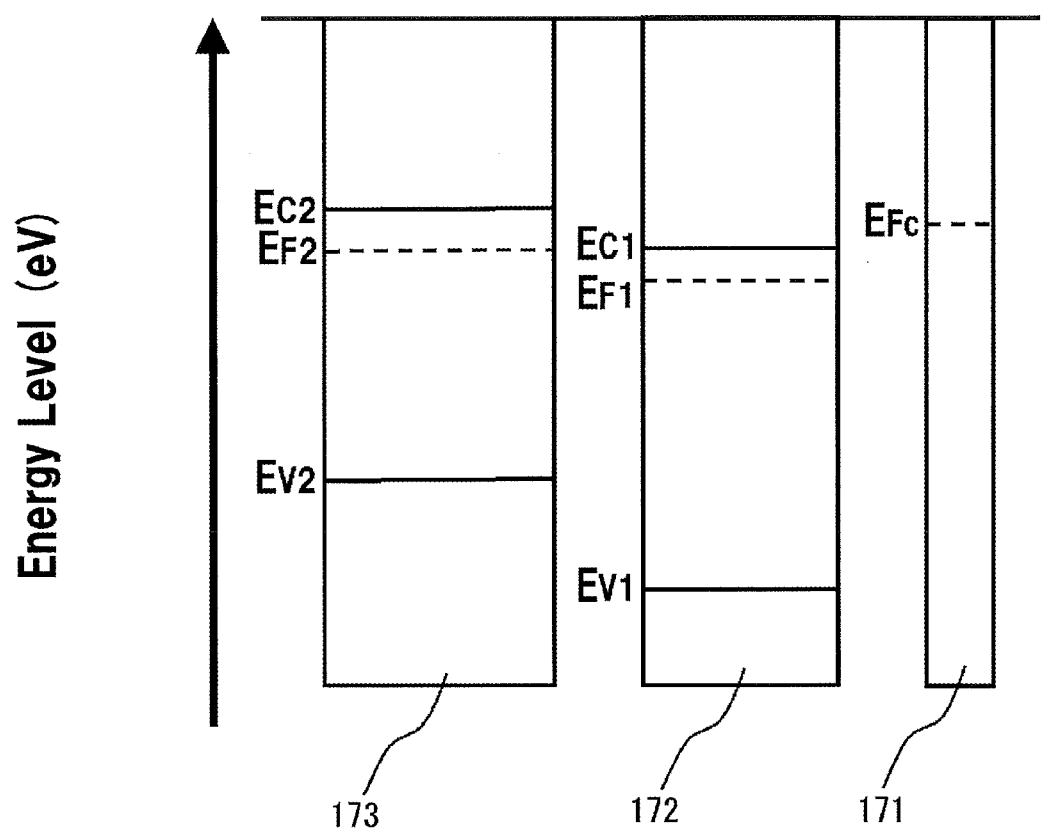
FIG. 7 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-1.
Figure 8:
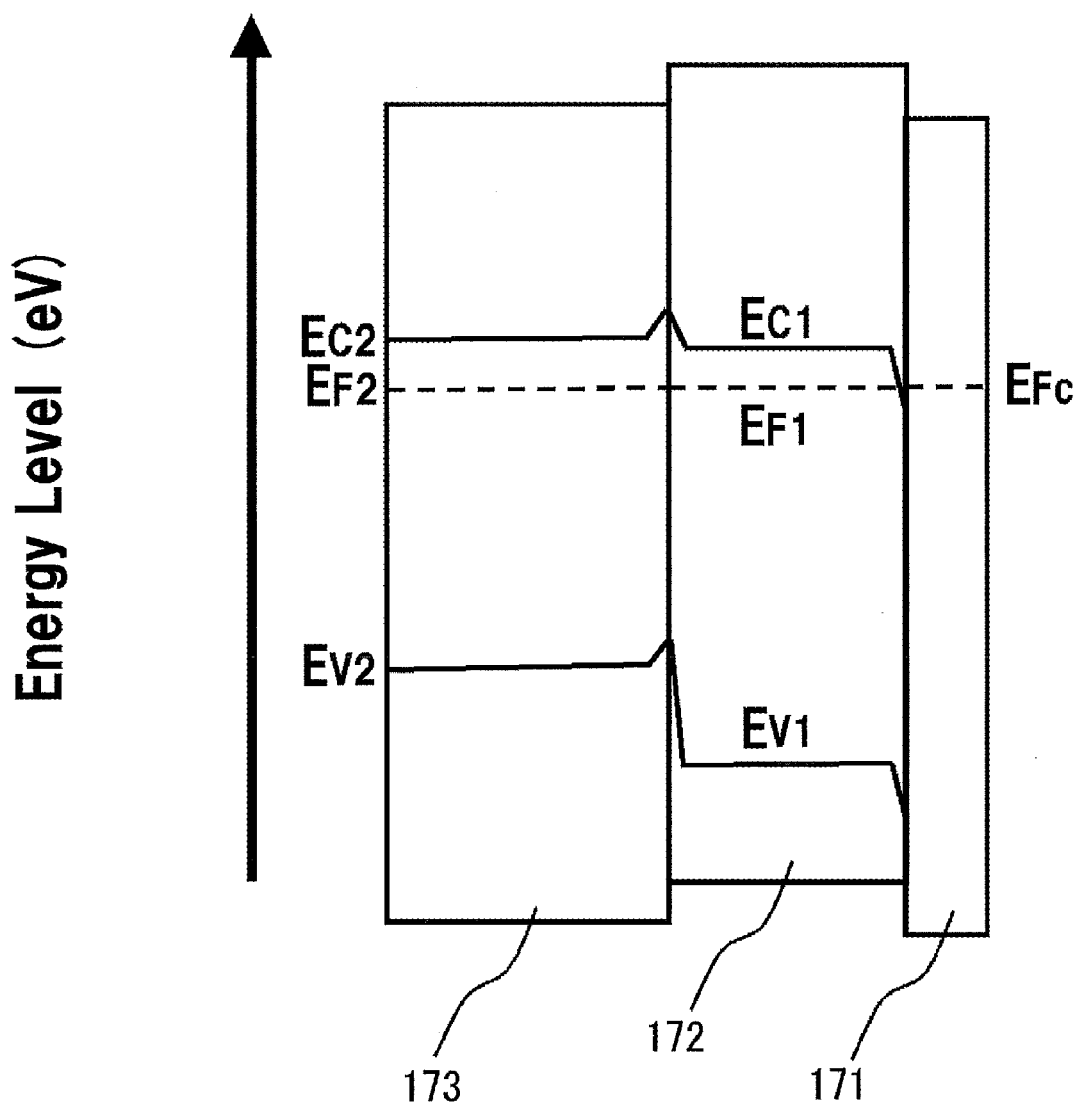
FIG. 8 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-1.

The photoelectrochemical cell according to Comparative Embodiment 2-1 is described, referring to FIGS. 7 and 8. FIG. 7 is a conceptual diagram indicating a band structure of a conductor, a first n-type semiconductor layer and a second n-type semiconductor layer, before being joined, in the present comparative embodiment. FIG. 8 is a conceptual diagram indicating a band structure of the conductor, the first n-type semiconductor layer and the second n-type semiconductor layer, after being joined, in the present comparative embodiment. In each of FIGS. 7 and 8, the vertical axis indicates energy levels relative to the vacuum level (unit: eV).

The semiconductor electrode of this comparative embodiment is constituted by a conductor 171, a first n-type semiconductor layer 172 and a second n-type semiconductor layer 173. The semiconductor electrode of this comparative embodiment is different from the semiconductor electrode 220 of Embodiment 2 in that the Fermi level $E_{F1}$ of the first n-type semiconductor layer 172 is lower than the Fermi level $E_{F2}$ of the second n-type semiconductor layer 173, relative to the vacuum level, as indicated in FIG. 7.

Next, when the conductor 171, the first n-type semiconductor layer 172 and the second n-type semiconductor layer 173 are joined to one another, carriers transfer between the first n-type semiconductor layer 172 and the second n-type semiconductor layer 173 so that the Fermi levels match each other, thereby causing bending of the band edge, at the junction plane therebetween, as indicated in FIG. 8. At this time, the band edge level $E_{C2}$ of the conduction band and the band edge level $E_{V2}$ of the valence band in the second n-type semiconductor layer 173, respectively, are higher than the band edge level $E_{C1}$ of the conduction band and the band edge level $E_{V1}$ of the valence band in the first n-type semiconductor layer 172, but the Fermi level $E_{F1}$ of the first n-type semiconductor layer 172 is lower than the Fermi level $E_{F2}$ of the second n-type semiconductor layer 173, relative to the vacuum level. Therefore, Schottky barriers occur at the junction plane between the first n-type semiconductor layer 172 and the second n-type semiconductor layer 173, which is different from the case of the semiconductor electrode 220 of Embodiment 2.

At the junction plane between the first n-type semiconductor layer 172 and the conductor 171, carriers transfer so that the Fermi levels match each other, thereby causing bending of the band edge around the junction plane of the first n-type semiconductor layer 172. At this time, since the Fermi level $E_{Fc}$ of the conductor 171 is higher than the Fermi level $E_{F1}$ of the first n-type semiconductor layer 172, relative to the vacuum level, the junction between the conductor 171 and the first n-type semiconductor layer 172 is formed by an ohmic contact, as is the case of the semiconductor electrode 220 in Embodiment 2.

In the case of the semiconductor electrode of this comparative embodiment, Schottky barriers occur at the junction plane between the first n-type semiconductor layer 172 and the second n-type semiconductor layer 173, which is different from the case of the semiconductor electrode 220 in Embodiment 2. The Schottky barrier prevents the transfer of the electrons from the second n-type semiconductor layer 173 toward the first n-type semiconductor layer 172. Accordingly, in this comparative embodiment, the probability of the recombination between the electrons and holes generated by photoexcitation inside the second n-type semiconductor layer 173 is increased, compared to that in the photoelectrochemical cell 200 according to Embodiment 2, and the quantum efficiency of the hydrogen evolution reaction by irradiation with light is decreased.

Comparative Embodiment 2-2

Figure 9:
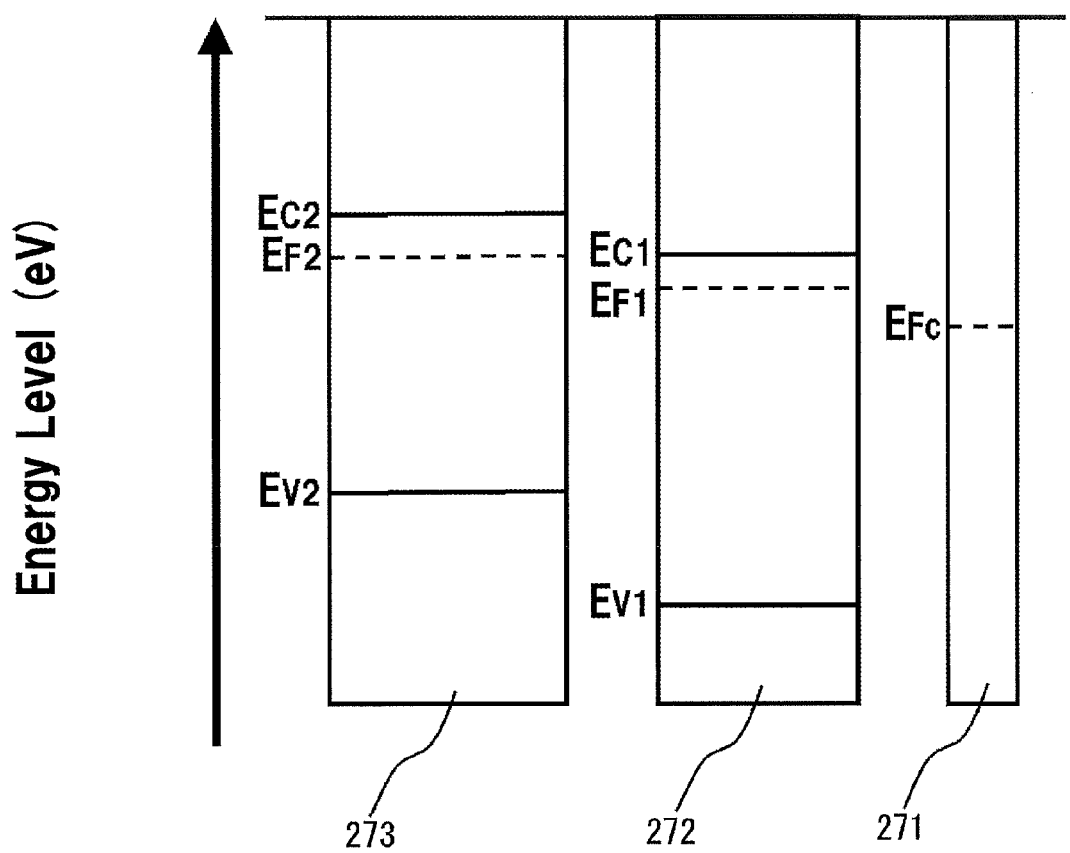
FIG. 9 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-2.
Figure 10:
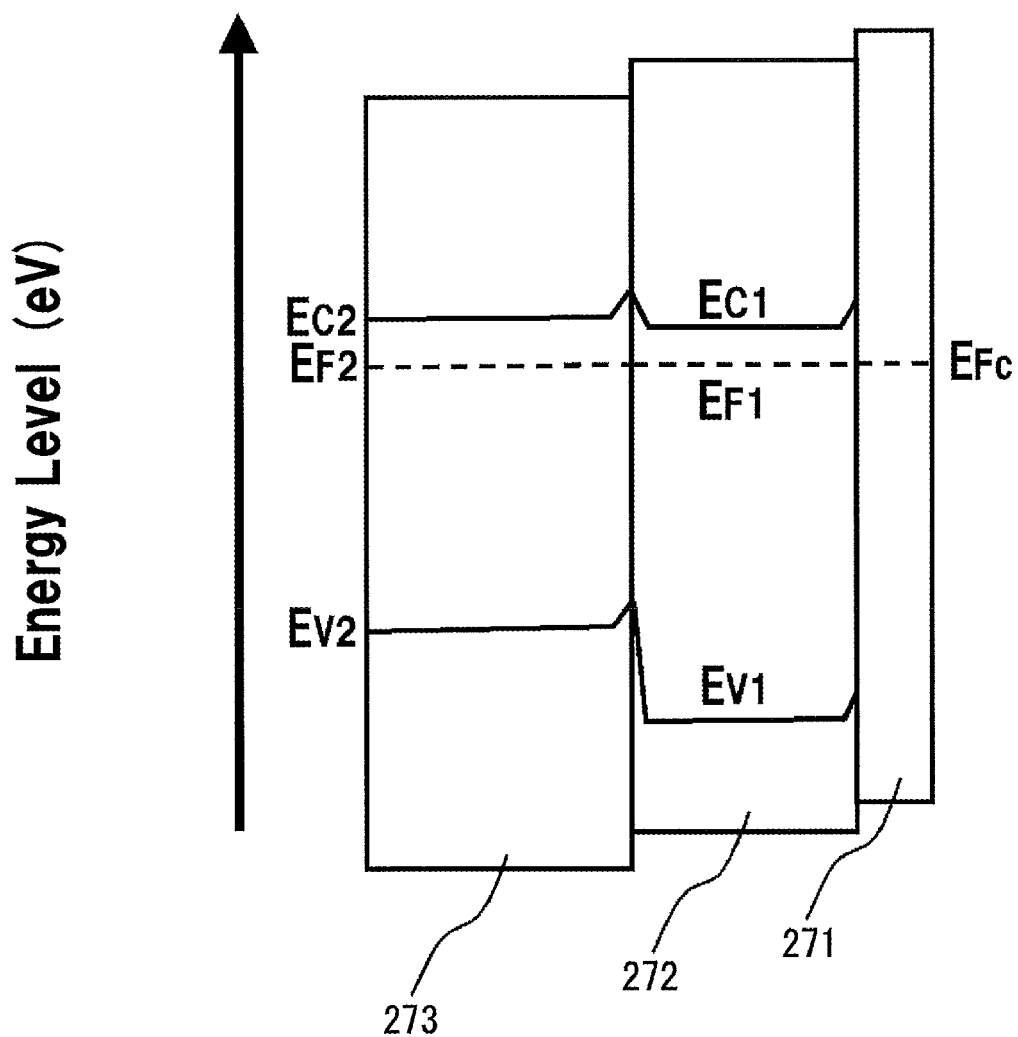
FIG. 10 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-2.

The photoelectrochemical cell according to Comparative Embodiment 2-2 is described, referring to FIGS. 9 and 10. FIG. 9 is a conceptual diagram indicating a band structure of a conductor, a first n-type semiconductor layer and a second n-type semiconductor layer, before being joined, in the present comparative embodiment. FIG. 10 is a conceptual diagram indicating a band structure of the conductor, the first n-type semiconductor layer and the second n-type semiconductor layer, after being joined, which constitute the semiconductor electrode in the present comparative embodiment. In each of FIGS. 9 and 10, the vertical axis indicates energy levels relative to the vacuum level (unit: eV).

The semiconductor electrode of this comparative embodiment is constituted by a conductor 271, a first n-type semiconductor layer 272 and a second n-type semiconductor layer 273. The semiconductor electrode of this comparative embodiment is different from the semiconductor electrode 220 of Embodiment 2 in that the Fermi level $E_{F1}$ of the first n-type semiconductor layer 272 is lower than the Fermi level $E_{F2}$ of the second n-type semiconductor layer 273, and the Fermi level $E_{Fc}$ of the conductor 271 is lower than the Fermi level $E_{F1}$ of the first n-type semiconductor layer 272, relative to the vacuum level, as indicated in FIG. 9.

When the conductor 271, the first n-type semiconductor layer 272 and the second n-type semiconductor layer 273 are joined to one another, carriers transfer between the first n-type semiconductor layer 272 and the second n-type semiconductor layer 273 so that the Fermi levels match each other, thereby causing bending of the band edge, at the junction plane therebetween, as indicated in FIG. 10. At this time, the band edge level $E_{C2}$ of the conduction band and the band edge level $E_{V2}$ of the valence band in the second n-type semiconductor layer 273, respectively, are higher than the band edge level $E_{C1}$ of the conduction band and the band edge level $E_{V1}$ of the valence band in the first n-type semiconductor layer 272, but the Fermi level $E_{F1}$ of the first n-type semiconductor layer 272 is lower than the Fermi level $E_{F2}$ of the second n-type semiconductor layer 273, relative to the vacuum level. Therefore, Schottky barriers occur at the junction plane between the first n-type semiconductor layer 272 and the second n-type semiconductor layer 273, which is different from the case of the semiconductor electrode 220 of Embodiment 2.

At the junction plane between the first n-type semiconductor layer 272 and the conductor 271, carriers transfer so that the Fermi levels match each other, thereby causing bending of the band edge around the junction plane of the first n-type semiconductor layer 272. At this time, since the Fermi level $E_{Fc}$ of the conductor 271 is lower than the Fermi level $E_{F1}$ of the first n-type semiconductor layer 272, relative to the vacuum level, Schottky barriers occur at the junction plane between the conductor 271 and the first n-type semiconductor layer 272.

In the case of the semiconductor electrode of this comparative embodiment, Schottky barriers occur at the junction plane between the first n-type semiconductor layer 272 and the second n-type semiconductor layer 273, which is different from the case of the semiconductor electrode 220 in Embodiment 2. The Schottky barrier prevents the transfer of the electrons from the second n-type semiconductor layer 273 toward the first n-type semiconductor layer 272. Furthermore, in the semiconductor electrode of this comparative embodiment, Schottky barriers occur also at the junction plane between the conductor 271 and the first n-type semiconductor layer 272. The Schottky barrier prevents the transfer of the electrons from the first n-type semiconductor layer 272 toward the conductor 271. Accordingly, in the photoelectrochemical cell of this comparative embodiment, the probability of the recombination between the electrons and holes generated by photoexcitation inside the second n-type semiconductor layer is increased, compared to that in the photoelectrochemical cell 200 of Embodiment 2, and the quantum efficiency of the hydrogen evolution reaction by irradiation with light is decreased.

Comparative Embodiment 2-3

Figure 11:
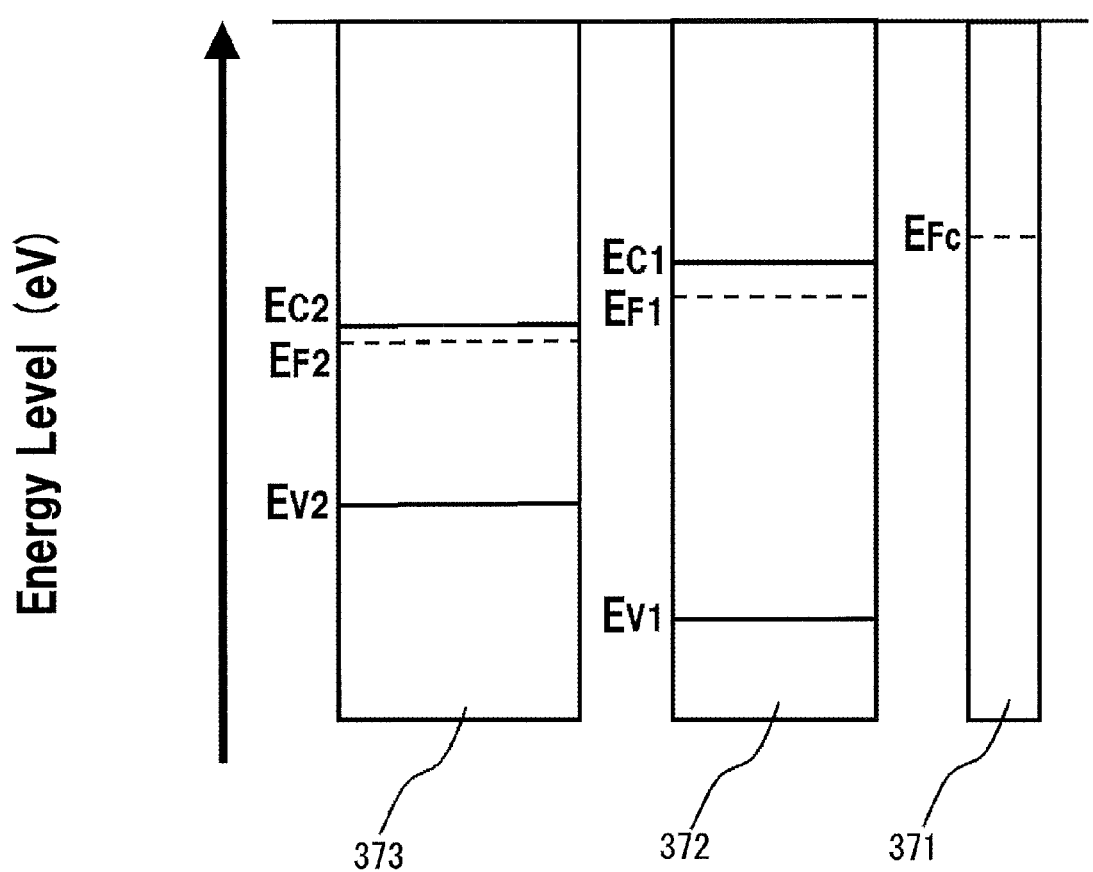
FIG. 11 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-3.
Figure 12:
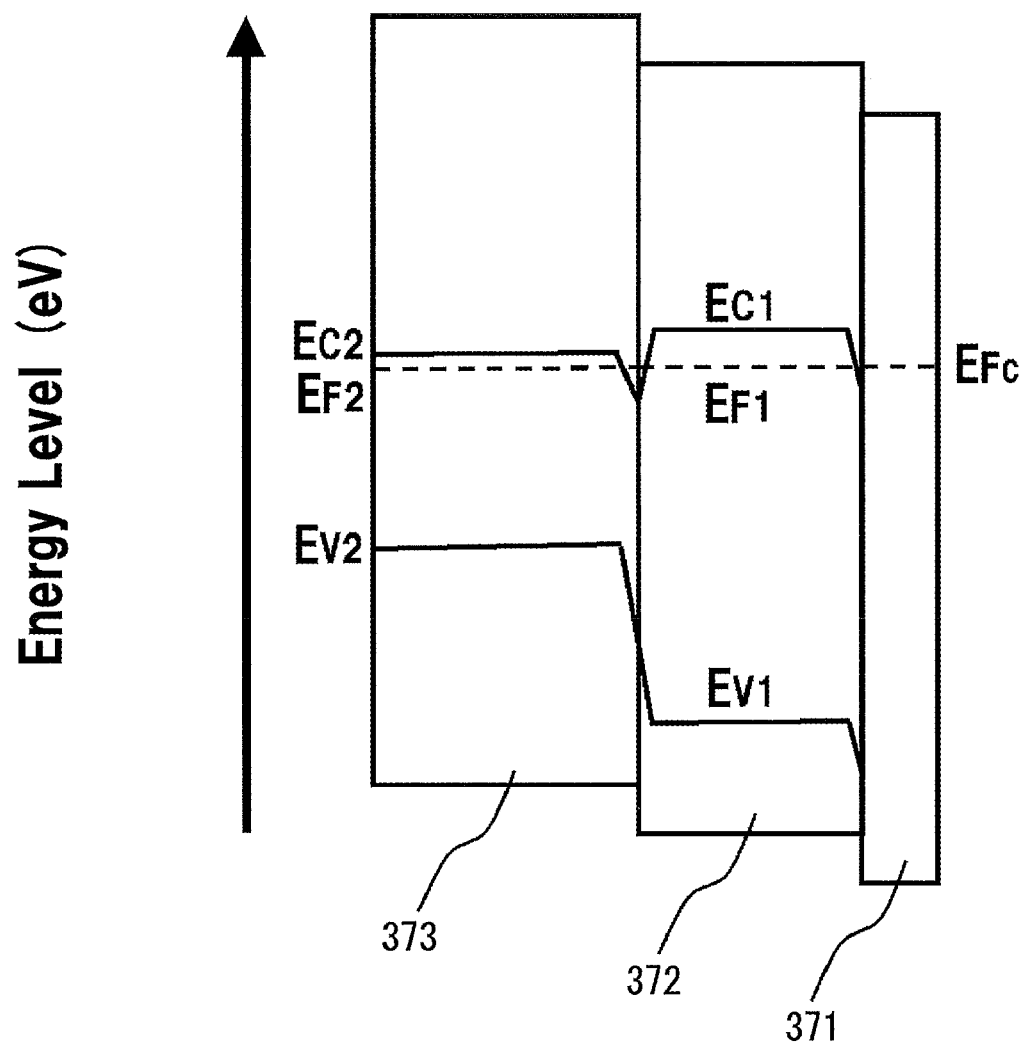
FIG. 12 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-3.

The photoelectrochemical cell according to Comparative Embodiment 2-3 is described, referring to FIGS. 11 and 12. FIG. 11 is a conceptual diagram indicating a band structure of a conductor, a first n-type semiconductor layer and a second n-type semiconductor layer, before being joined, in the present comparative embodiment. FIG. 12 is a conceptual diagram indicating a band structure of the conductor, the first n-type semiconductor layer and the second n-type semiconductor layer, after being joined, in the present comparative embodiment. In each of FIGS. 11 and 12, the vertical axis indicates energy levels relative to the vacuum level (unit: eV).

The semiconductor electrode of this comparative embodiment is constituted by a conductor 371, a first n-type semiconductor layer 372 and a second n-type semiconductor layer 373. The semiconductor electrode of this comparative embodiment is different from the semiconductor electrode 220 of Embodiment 2 in that the band edge level $E_{C2}$ of the conduction band in the second n-type semiconductor layer 373 is lower than the band edge level $E_{C1}$ of the conduction band in the first n-type semiconductor layer 372, relative to the vacuum level, as indicated in FIG. 11.

Next, when the conductor 371, the first n-type semiconductor layer 372 and the second n-type semiconductor layer 373 are joined to one another, carriers transfer between the first n-type semiconductor layer 372 and the second n-type semiconductor layer 373 so that the Fermi levels match each other, thereby causing bending of the band edge, at the junction plane therebetween, as indicated in FIG. 12. At this time, the band edge level $E_{C2}$ of the conduction band in the second n-type semiconductor layer 373 is lower than the band edge level $E_{C1}$ of the conduction band in the first n-type semiconductor layer 372, and the Fermi level $E_{F1}$ of the first n-type semiconductor layer 372 is higher than the Fermi level $E_{F2}$ of the second n-type semiconductor layer 373, relative to the vacuum level. Therefore, the band edge of the conduction band decreases from the side of the second n-type semiconductor layer 373 toward the junction plane with the first n-type semiconductor layer 372, but increases from the junction plane toward the side of the first n-type semiconductor layer 372.

At the junction plane between the first n-type semiconductor layer 372 and the conductor 371, carriers transfer so that the Fermi levels match each other, thereby causing bending of the band edge around the junction plane of the first n-type semiconductor layer 372. At this time, since the Fermi level $E_{Fc}$ of the conductor 371 is higher than the Fermi level $E_{F1}$ of the first n-type semiconductor layer 372, relative to the vacuum level, the junction between the conductor 371 and the first n-type semiconductor layer 372 is formed by an ohmic contact, as is the case of the semiconductor electrode 220 in Embodiment 2.

In the case of the semiconductor electrode of this comparative embodiment, the band edge of the conduction band increases from the junction plane between the first n-type semiconductor layer 372 and the second n-type semiconductor layer 373 toward the side of the first n-type semiconductor layer 372, which is different from the case of the semiconductor electrode 220 in Embodiment 2. Therefore, the transfer of the electrons from the second n-type semiconductor layer 373 toward the first n-type semiconductor layer 372 is prevented. Accordingly, in the photoelectrochemical cell of this comparative embodiment, the probability of the recombination between the electrons and holes generated by photoexcitation inside the second n-type semiconductor is increased, compared to that in the photoelectrochemical cell 200 of Embodiment 2, and the quantum efficiency of the hydrogen evolution reaction by irradiation with light is decreased.

Comparative Embodiment 2-4

Figure 13:
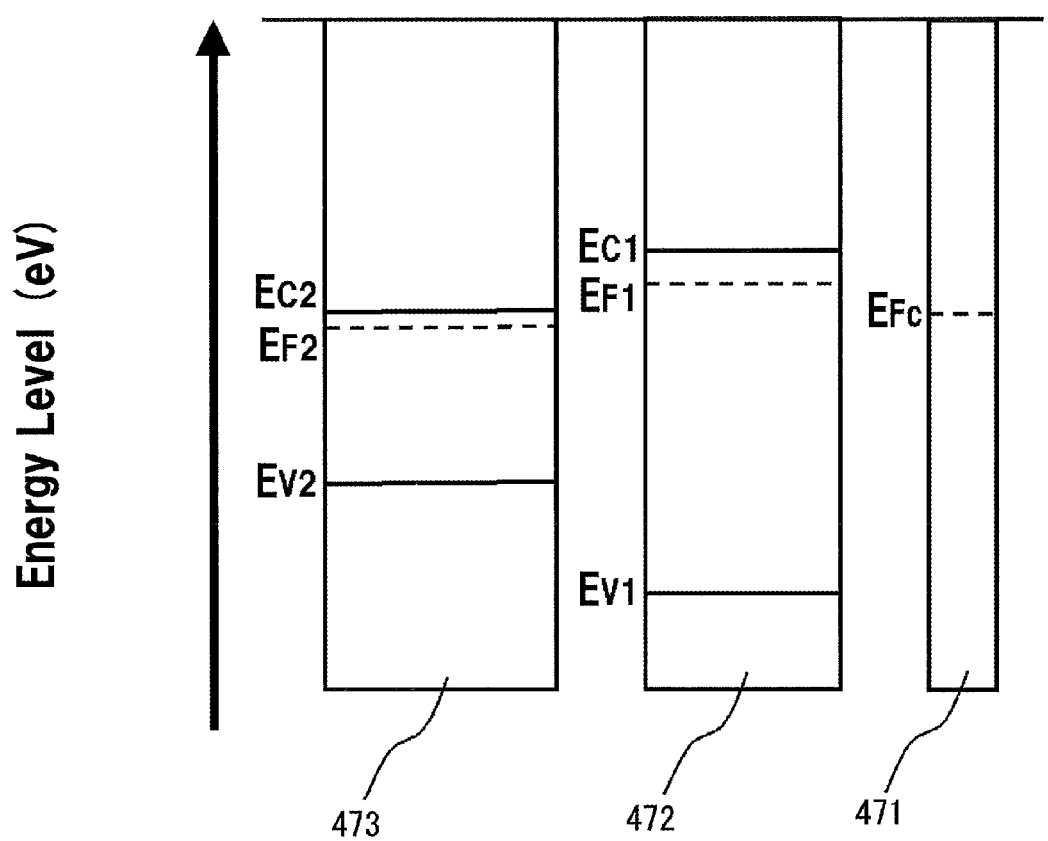
FIG. 13 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-4.
Figure 14:
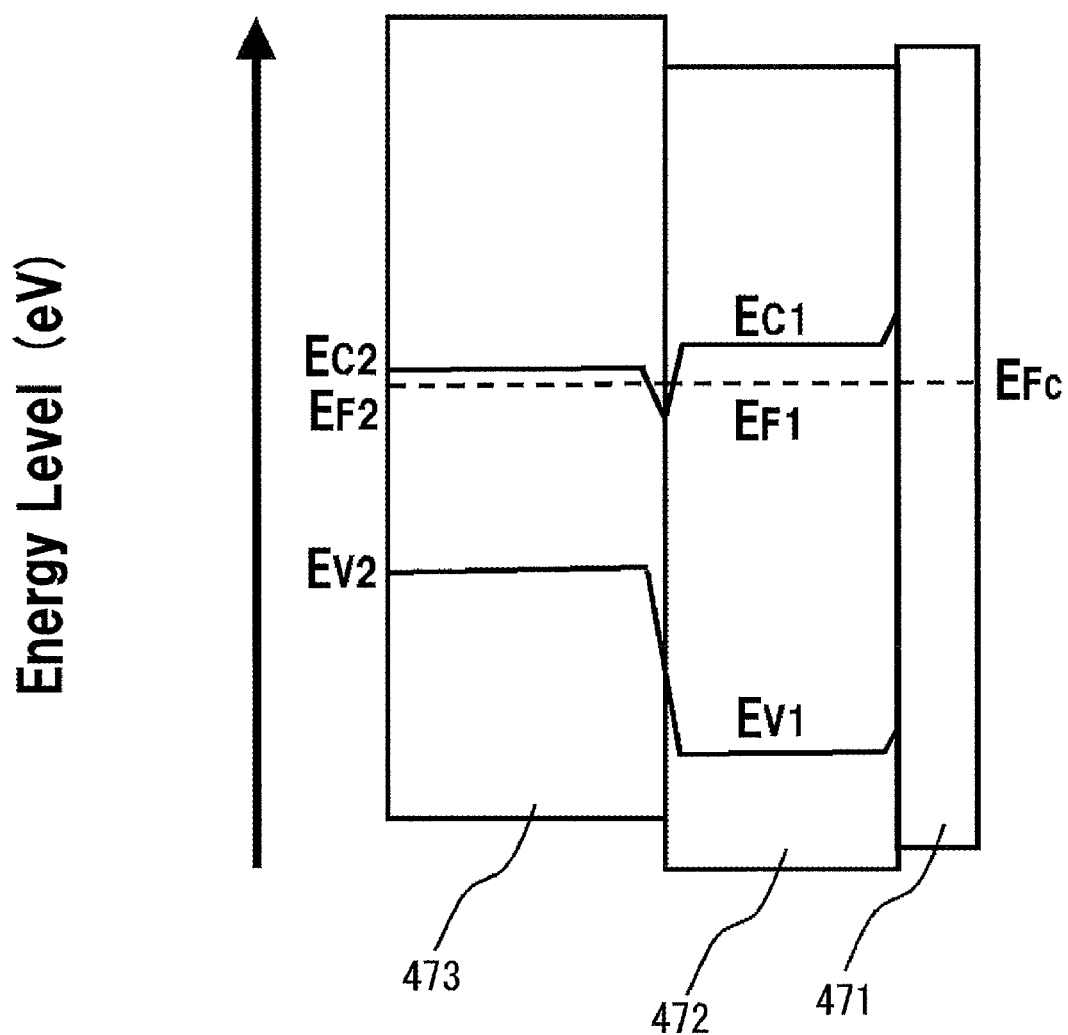
FIG. 14 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-4.

The photoelectrochemical cell according to Comparative Embodiment 2-4 is described, referring to FIGS. 13 and 14. FIG. 13 is a conceptual diagram indicating a band structure of a conductor, a first n-type semiconductor layer and a second n-type semiconductor layer, before being joined, in the present comparative embodiment. FIG. 14 is a conceptual diagram indicating a band structure of the conductor, the first n-type semiconductor layer and the second n-type semiconductor layer, after being joined, in the present comparative embodiment. In each of FIGS. 13 and 14, the vertical axis indicates energy levels relative to the vacuum level (unit: eV).

The semiconductor electrode of this comparative embodiment is constituted by a conductor 471, a first n-type semiconductor layer 472 and a second n-type semiconductor layer 473. The semiconductor electrode of this comparative embodiment is different from the semiconductor electrode 220 of Embodiment 2 in that the band edge level $E_{C2}$ of the conduction band in the second n-type semiconductor layer 473 is lower than the band edge level $E_{C1}$ of the conduction band in the first n-type semiconductor layer 472, and the Fermi level $E_{Fc}$ of the conductor 471 is lower than the Fermi level $E_{F1}$ of the first n-type semiconductor layer 472, relative to the vacuum level, as indicated in FIG. 13.

Next, when the conductor 471, the first n-type semiconductor layer 472 and the second n-type semiconductor layer 473 are joined to one another, carriers transfer between the first n-type semiconductor layer 472 and the second n-type semiconductor layer 473 so that the Fermi levels match each other, thereby causing bending of the band edge, at the junction plane therebetween, as indicated in FIG. 14. At this time, the band edge level $E_{C2}$ of the conduction band in the second n-type semiconductor layer 473 is lower than the band edge level $E_{C1}$ of the conduction band in the first n-type semiconductor layer 472, and the Fermi level $E_{F1}$ of the first n-type semiconductor layer 472 is higher than the Fermi level $E_{F2}$ of the second n-type semiconductor layer 473, relative to the vacuum level. Therefore, the band edge of the conduction band decreases from the side of the second n-type semiconductor layer 473 toward the junction plane with the first n-type semiconductor layer 472, but increases from the junction plane toward the side of the first n-type semiconductor layer 472.

At the junction plane between the first n-type semiconductor layer 472 and the conductor 471, carriers transfer so that the Fermi levels match each other, thereby causing bending of the band edge around the junction plane of the first n-type semiconductor layer 472. At this time, since the Fermi level $E_{Fc}$ of the conductor 471 is lower than the Fermi level $E_{F1}$ of the first n-type semiconductor layer 472, relative to the vacuum level, the junction between the conductor 471 and the first n-type semiconductor layer 472 is formed by a Schottky contact.

In the case of the semiconductor electrode of this comparative embodiment, the band edge of the conduction band increases from the junction plane between the first n-type semiconductor layer 472 and the second n-type semiconductor layer 473 toward the first n-type semiconductor layer 472, which is different from the case of the semiconductor electrode 220 in Embodiment 2. Therefore, the transfer of the electrons from the second n-type semiconductor layer 473 toward the first n-type semiconductor layer 472 is prevented. Furthermore, Schottky barriers occur at the junction plane between the conductor 471 and the first n-type semiconductor layer 472. The Schottky barrier prevents the transfer of the electrons from the first n-type semiconductor layer 472 toward the conductor 471. Accordingly, in the photoelectrochemical cell of this comparative embodiment, the probability of the recombination between the electrons and holes generated by photoexcitation inside the second n-type semiconductor layer is increased, compared to that in the photoelectrochemical cell 200 of Embodiment 2, and the quantum efficiency of the hydrogen evolution reaction by irradiation with light is decreased.

Comparative Embodiment 2-5

Figure 15:
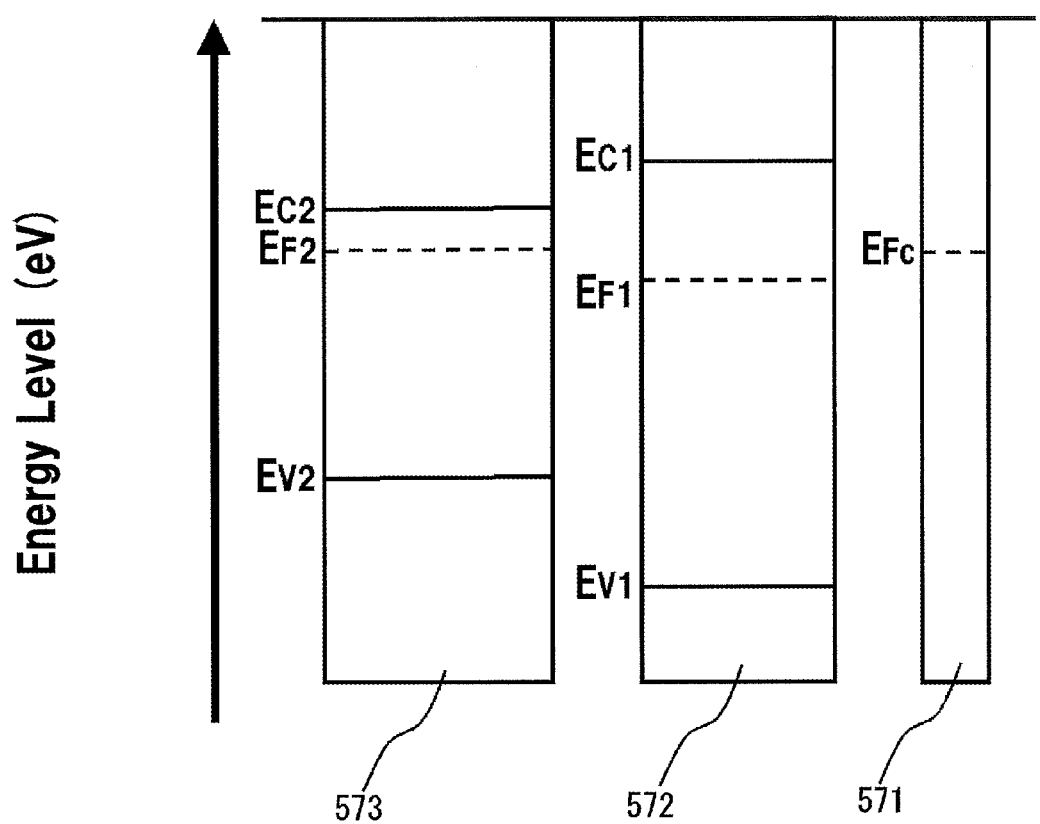
FIG. 15 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-5.
Figure 16:
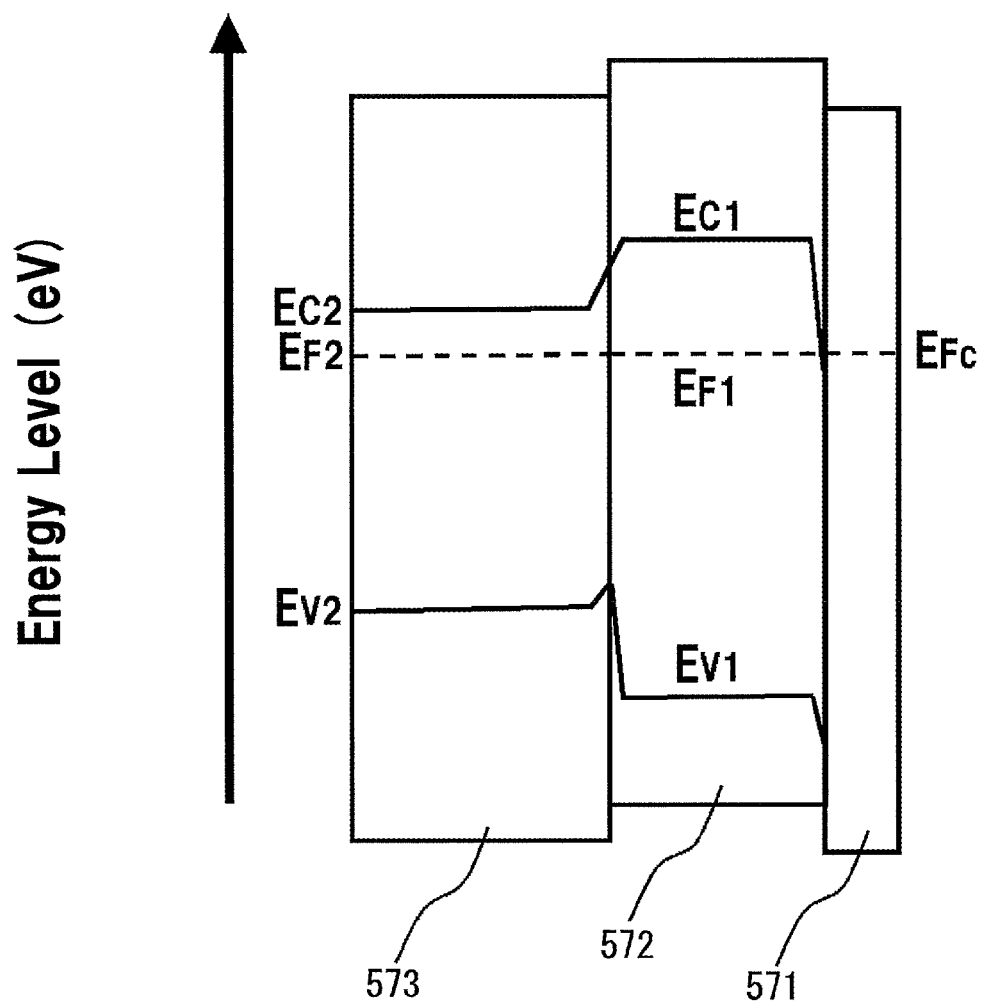
FIG. 16 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-5.

The photoelectrochemical cell according to Comparative Embodiment 2-5 is described, referring to FIGS. 15 and 16. FIG. 15 is a conceptual diagram indicating a band structure of a conductor, a first n-type semiconductor layer and a second n-type semiconductor layer, before being joined, in the present comparative embodiment. FIG. 16 is a conceptual diagram indicating a band structure of the conductor, the first n-type semiconductor layer and the second n-type semiconductor layer, after being joined, in the present comparative embodiment. In each of FIGS. 15 and 16, the vertical axis indicates energy levels relative to the vacuum level (unit: eV).

The semiconductor electrode of this comparative embodiment is constituted by a conductor 571, a first n-type semiconductor layer 572 and a second n-type semiconductor layer 573. The semiconductor electrode of this comparative embodiment is different from the semiconductor electrode 220 of Embodiment 2 in that the band edge level $E_{C2}$ of the conduction band in the second n-type semiconductor layer 573 is lower than the band edge level $E_{C1}$ of the conduction band in the first n-type semiconductor layer 572, and the Fermi level $E_{F1}$ of the first n-type semiconductor layer 572 is lower than the Fermi level $E_{F2}$ of the second n-type semiconductor layer 573, relative to the vacuum level, as indicated in FIG. 15.

Next, when the conductor 571, the first n-type semiconductor layer 572 and the second n-type semiconductor layer 573 are joined to one another, carriers transfer between the first n-type semiconductor layer 572 and the second n-type semiconductor layer 573 so that the Fermi levels match each other, thereby causing bending of the band edge, at the junction plane therebetween, as indicated in FIG. 16. At this time, the band edge level $E_{C2}$ of the conduction band in the second n-type semiconductor layer 573 is lower than the band edge level $E_{C1}$ of the conduction band in the first n-type semiconductor layer 572, and the Fermi level $E_{F1}$ of the first n-type semiconductor layer 572 is lower than the Fermi level $E_{F2}$ of the second n-type semiconductor layer 573, relative to the vacuum level. Therefore, no Schottky barriers occur at the junction plane between the first n-type semiconductor layer 572 and the second n-type semiconductor layer 573 in the band edge of the conduction band, as is the case of the semiconductor electrode 220 in Embodiment 2. However, the band edge level $E_{C1}$ of the conduction band in the first n-type semiconductor layer 572 is higher than the band edge level $E_{C2}$ of the conduction band in the second n-type semiconductor layer 573, as indicated in FIG. 16.

At the junction plane between the first n-type semiconductor layer 572 and the conductor 571, carriers transfer so that the Fermi levels match each other, thereby causing bending of the band edge around the junction plane of the first n-type semiconductor layer 572. At this time, since the Fermi level $E_{Fc}$ of the conductor 571 is higher than the Fermi level $E_{F1}$ of the first n-type semiconductor layer 572, relative to the vacuum level, the junction between the conductor 571 and the first n-type semiconductor layer 572 is formed by an ohmic contact, as is the case of the semiconductor electrode 220 in Embodiment 2.

In the case of the semiconductor electrode of this comparative embodiment, the band edge level $E_{C1}$ of the conduction band in the first n-type semiconductor layer 572 is higher than the band edge level $E_{C2}$ of the conduction band in the second n-type semiconductor layer 573, which is different from the case of the semiconductor electrode 220 in Embodiment 2. Therefore, the transfer of the electrons from the second n-type semiconductor layer 573 toward the first n-type semiconductor layer 572 is prevented. Accordingly, in the photoelectrochemical cell of this comparative embodiment, the probability of the recombination between the electrons and holes generated by photoexcitation inside the second n-type semiconductor layer is increased, compared to that in the photoelectrochemical cell 200 of Embodiment 2, and the quantum efficiency of the hydrogen evolution reaction by irradiation with light is decreased.

Comparative Embodiment 2-6

Figure 17:
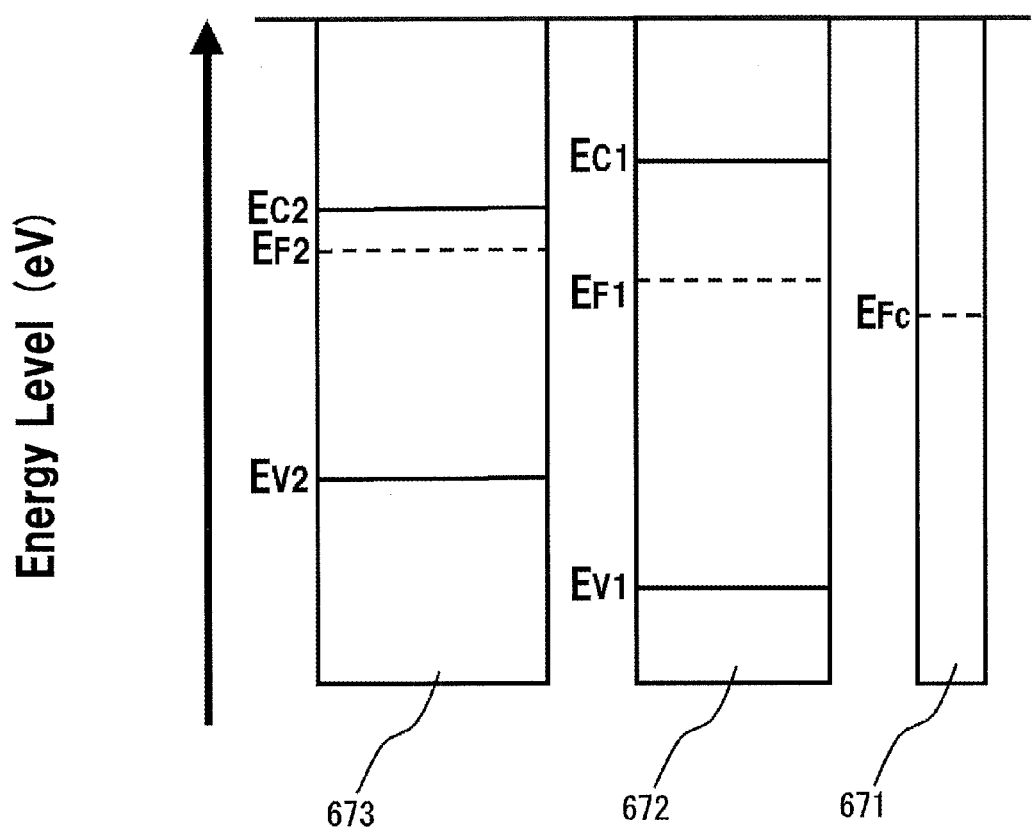
FIG. 17 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-6.
Figure 18:
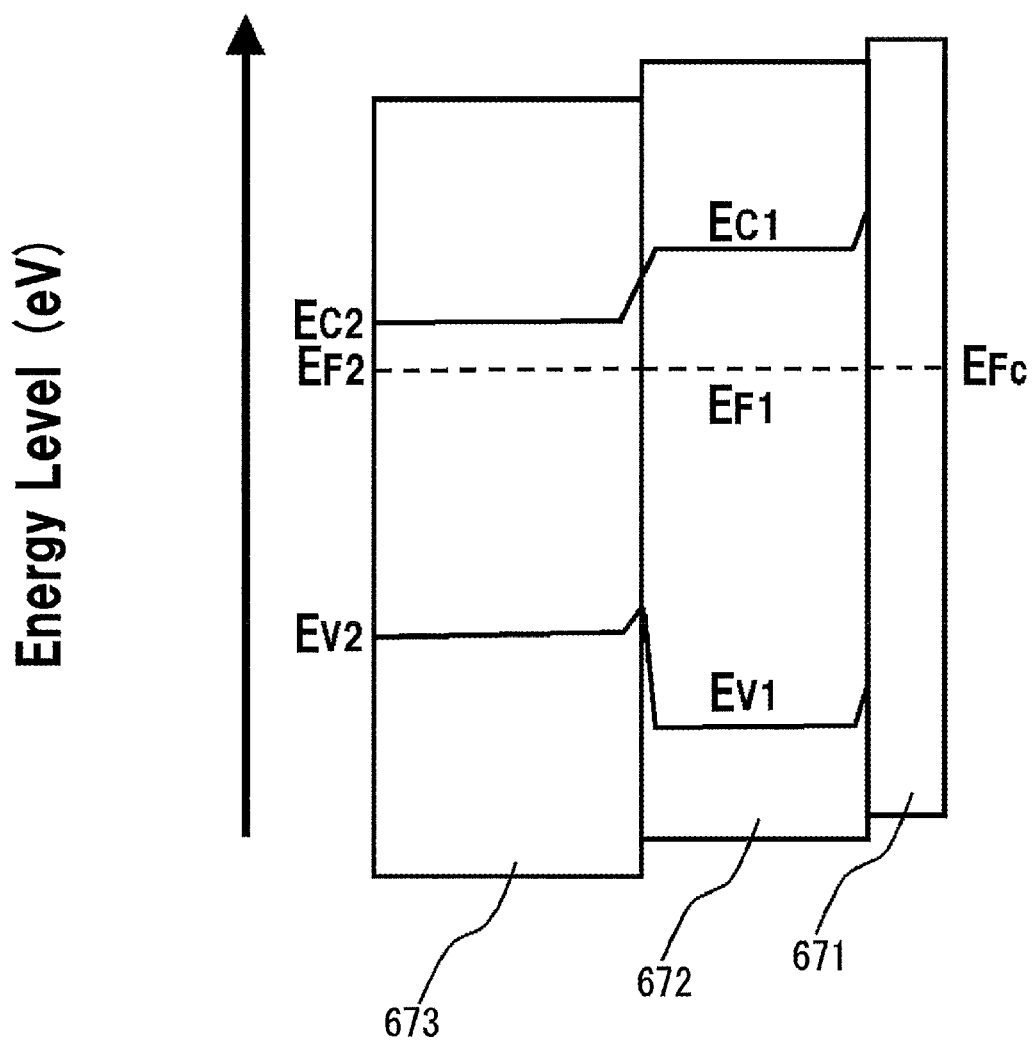
FIG. 18 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-6.

The photoelectrochemical cell according to Comparative Embodiment 2-6 is described, referring to FIGS. 17 and 18. FIG. 17 is a conceptual diagram indicating a band structure of a conductor, a first n-type semiconductor layer and a second n-type semiconductor layer, before being joined, in the present comparative embodiment. FIG. 18 is a conceptual diagram indicating a band structure of the conductor; the first n-type semiconductor layer and the second n-type semiconductor layer, after being joined, in the present comparative embodiment. In each of FIGS. 17 and 18, the vertical axis indicates energy levels relative to the vacuum level (unit: eV).

The semiconductor electrode of this comparative embodiment is constituted by a conductor 671, a first n-type semiconductor layer 672 and a second n-type semiconductor layer 673. The semiconductor electrode of this comparative embodiment is different from the semiconductor electrode 220 of Embodiment 2 in that the band edge level $E_{C2}$ of the conduction band in the second n-type semiconductor layer 673 is lower than the band edge level $E_{C1}$ of the conduction band in the first n-type semiconductor layer 672, the Fermi level $E_{F1}$ of the first n-type semiconductor layer 672 is lower than the Fermi level $E_{F2}$ of the second n-type semiconductor layer 673, and the Fermi level $E_{Fc}$ of the conductor 671 is lower than the Fermi level $E_{F1}$ of the first n-type semiconductor layer 672, relative to the vacuum level, as indicated in FIG. 17.

Next, when the conductor 671, the first n-type semiconductor layer 672 and the second n-type semiconductor layer 673 are joined to one another, carriers transfer between the first n-type semiconductor layer 672 and the second n-type semiconductor layer 673 so that the Fermi levels match each other, thereby causing bending of the band edge, at the junction plane therebetween, as indicated in FIG. 18. At this time, the band edge level $E_{C2}$ of the conduction band in the second n-type semiconductor layer 673 is lower than the band edge level $E_{C1}$ of the conduction band in the first n-type semiconductor layer 672, and the Fermi level $E_{F1}$ of the first n-type semiconductor layer 672 is lower than the Fermi level $E_{F2}$ of the second n-type semiconductor layer 673, relative to the vacuum level. Therefore, no Schottky barriers occur at the junction plane between the first n-type semiconductor layer 672 and the second n-type semiconductor layer 673 in the band edge of the conduction band, as is the case of the semiconductor electrode 220 in Embodiment 2. However, the band edge level $E_{C1}$ of the conduction band in the first n-type semiconductor layer 672 is higher than the band edge level $E_{C2}$ of the conduction band in the second n-type semiconductor layer 673, as indicated in FIG. 18, which is different from the case of the semiconductor electrode 220 in Embodiment 2.

At the junction plane between the first n-type semiconductor layer 672 and the conductor 671, carriers transfer so that the Fermi levels match each other, thereby causing bending of the band edge around the junction plane of the first n-type semiconductor layer 672. At this time, since the Fermi level $E_{Fc}$ of the conductor 671 is lower than the Fermi level $E_{F1}$ of the first n-type semiconductor layer 672, relative to the vacuum level, Schottky barriers occur at the junction plane between the conductor 671 and the first n-type semiconductor layer 672.

In the case of the semiconductor electrode of this comparative embodiment, the band edge level $E_{C1}$ of the conduction band in the first n-type semiconductor layer 672 is higher than the band edge level $E_{C2}$ of the conduction band in the second n-type semiconductor layer 673, which is different from the case of the semiconductor electrode 220 in Embodiment 2. Therefore, the transfer of the electrons from the second n-type semiconductor layer 673 toward the first n-type semiconductor layer 672 is prevented. Further, Schottky barriers occur at the junction plane between the conductor 671 and the first n-type semiconductor layer 672, which is different from the case of the semiconductor electrode 220 in Embodiment 2. The Schottky barrier prevents the transfer of the electrons from the first n-type semiconductor layer 672 toward the conductor 671. Accordingly, in the photoelectrochemical cell of this comparative embodiment, the probability of the recombination between the electrons and holes generated by photoexcitation inside the second n-type semiconductor layer 673 is increased, compared to that in the photoelectrochemical cell 200 of Embodiment 2, and the quantum efficiency of the hydrogen evolution reaction by irradiation with light is decreased.

Comparative Embodiment 2-7

Figure 19:
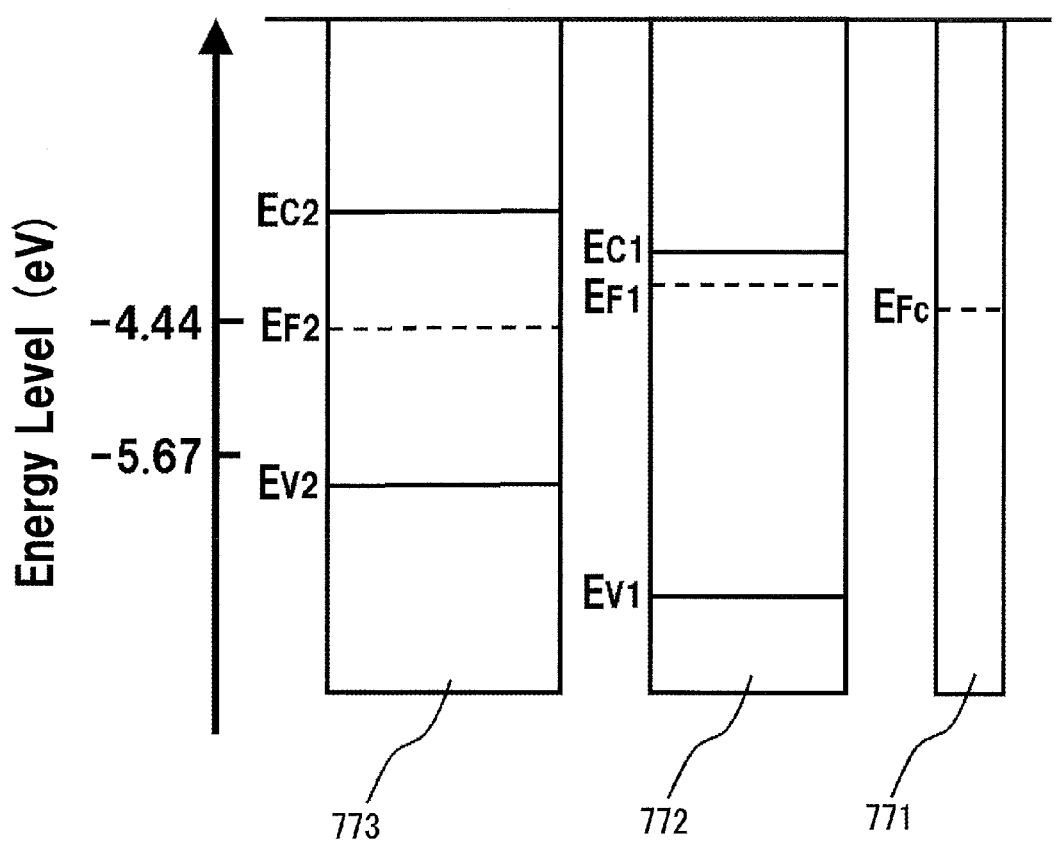
FIG. 19 is a conceptual diagram indicating a band structure of a conductor, a first n-type semiconductor layer and a second n-type semiconductor layer, before being joined, which constitute a semiconductor electrode in the photoelectrochemical cell of Comparative Embodiment 2-7.
Figure 20:
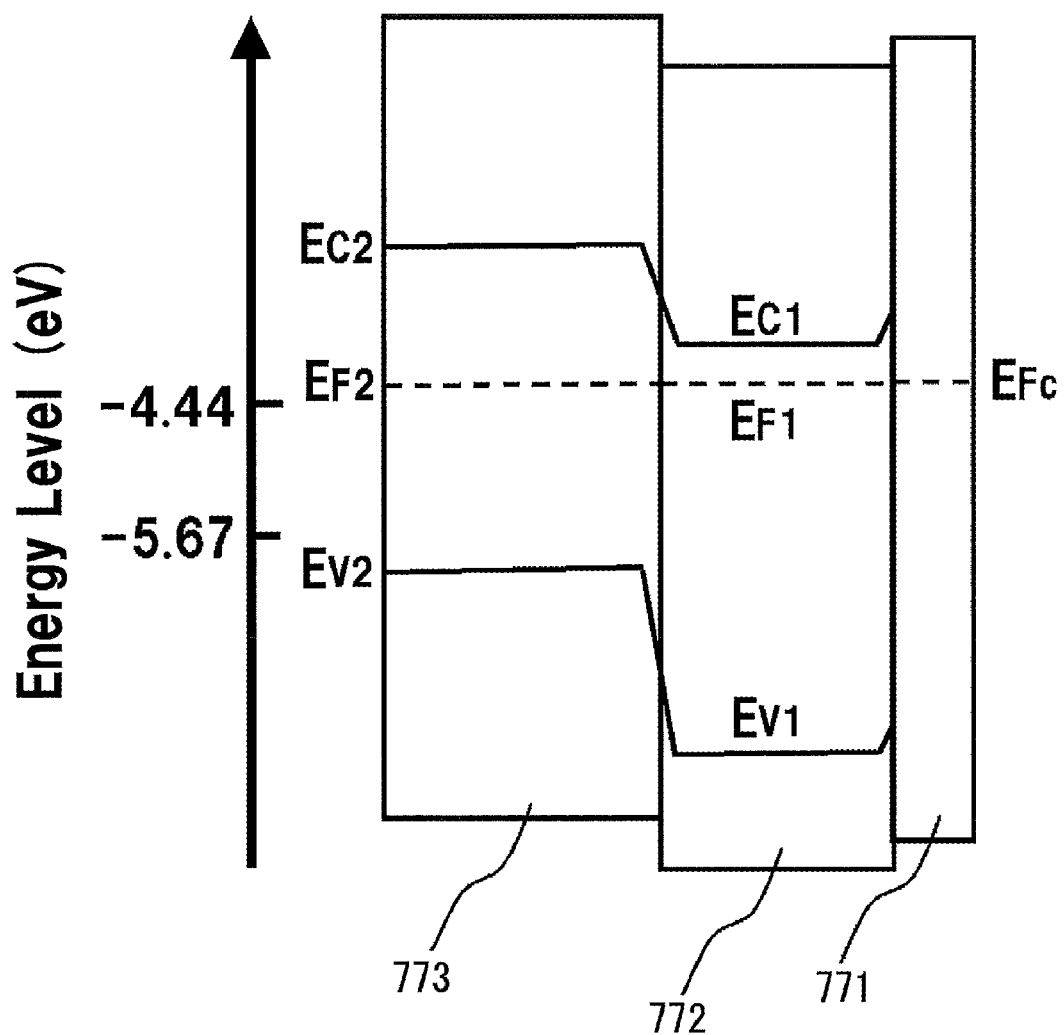
FIG. 20 is a conceptual diagram indicating a band structure of the conductor, the first n-type semiconductor layer and the second n-type semiconductor layer, after being joined, which constitute the semiconductor electrode in the photoelectrochemical cell of Comparative Embodiment 2-7.

The photoelectrochemical cell according to Comparative Embodiment 2-7 is described, referring to FIGS. 19 and 20. FIG. 19 is a conceptual diagram indicating a band structure of a conductor, a first n-type semiconductor layer and a second n-type semiconductor layer, before being joined, in the present comparative embodiment. FIG. 20 is a conceptual diagram indicating a band structure of the conductor, the first n-type semiconductor layer and the second n-type semiconductor layer, after being joined, in the present comparative embodiment. In each of FIGS. 19 and 20, the vertical axis indicates energy levels relative to the vacuum level (unit: eV).

The semiconductor electrode of this comparative embodiment is constituted by a conductor 771, a first n-type semiconductor layer 772 and a second n-type semiconductor layer 773. The semiconductor electrode of this comparative embodiment is different from the semiconductor electrode 220 of Embodiment 2 in that the Fermi level $E_{Fc}$ of the conductor 771 is lower than the Fermi level $E_{F1}$ of the first n-type semiconductor layer 772, relative to the vacuum level, as indicated in FIG. 19.

When the conductor 771, the first n-type semiconductor layer 772 and the second n-type semiconductor layer 773 are joined to one another, carriers transfer between the first n-type semiconductor layer 772 and the second n-type semiconductor layer 773 so that the Fermi levels match each other, thereby causing bending of the band edge, at the junction plane therebetween, as indicated in FIG. 20. At this time, the band edge level $E_{C2}$ of the conduction band and the band edge level $E_{V2}$ of the valence band in the second n-type semiconductor layer 773, respectively, are higher than the band edge level $E_{C1}$ of the conduction band and the band edge level $E_{V1}$ of the valence band in the first n-type semiconductor layer 772, and the Fermi level $E_{F1}$ of the first n-type semiconductor layer 772 is higher than the Fermi level $E_{F2}$ of the second n-type semiconductor layer 773, relative to the vacuum level. Therefore, no Schottky barriers occur at the junction plane between the first n-type semiconductor layer 772 and the second n-type semiconductor layer 773.

At the junction plane between the first n-type semiconductor layer 772 and the conductor 771, carriers transfer so that the Fermi levels match each other, thereby causing bending of the band edge around the junction plane of the first n-type semiconductor layer 772. At this time, since the Fermi level $E_{Fc}$ of the conductor 771 is lower than the Fermi level $E_{F1}$ of the first n-type semiconductor layer 772, relative to the vacuum level, Schottky barriers occur at the junction plane between the conductor 771 and the first n-type semiconductor layer 772.

In the case of the semiconductor electrode of this comparative embodiment, Schottky barriers occur at the junction plane between the conductor 771 and the first n-type semiconductor layer 772, which is different from the semiconductor electrode 220 in Embodiment 2. The Schottky barrier prevents the transfer of the electrons from the first n-type semiconductor layer 772 toward the conductor 771. Accordingly, in the photoelectrochemical cell of this comparative embodiment, the probability of the recombination between the electrons and holes generated by photoexcitation inside the second n-type semiconductor layer 772 is increased, compared to that in the photoelectrochemical cell 200 of Embodiment 2, and the quantum efficiency of the hydrogen evolution reaction by irradiation with light is decreased.

Embodiment 3

Figure 21:
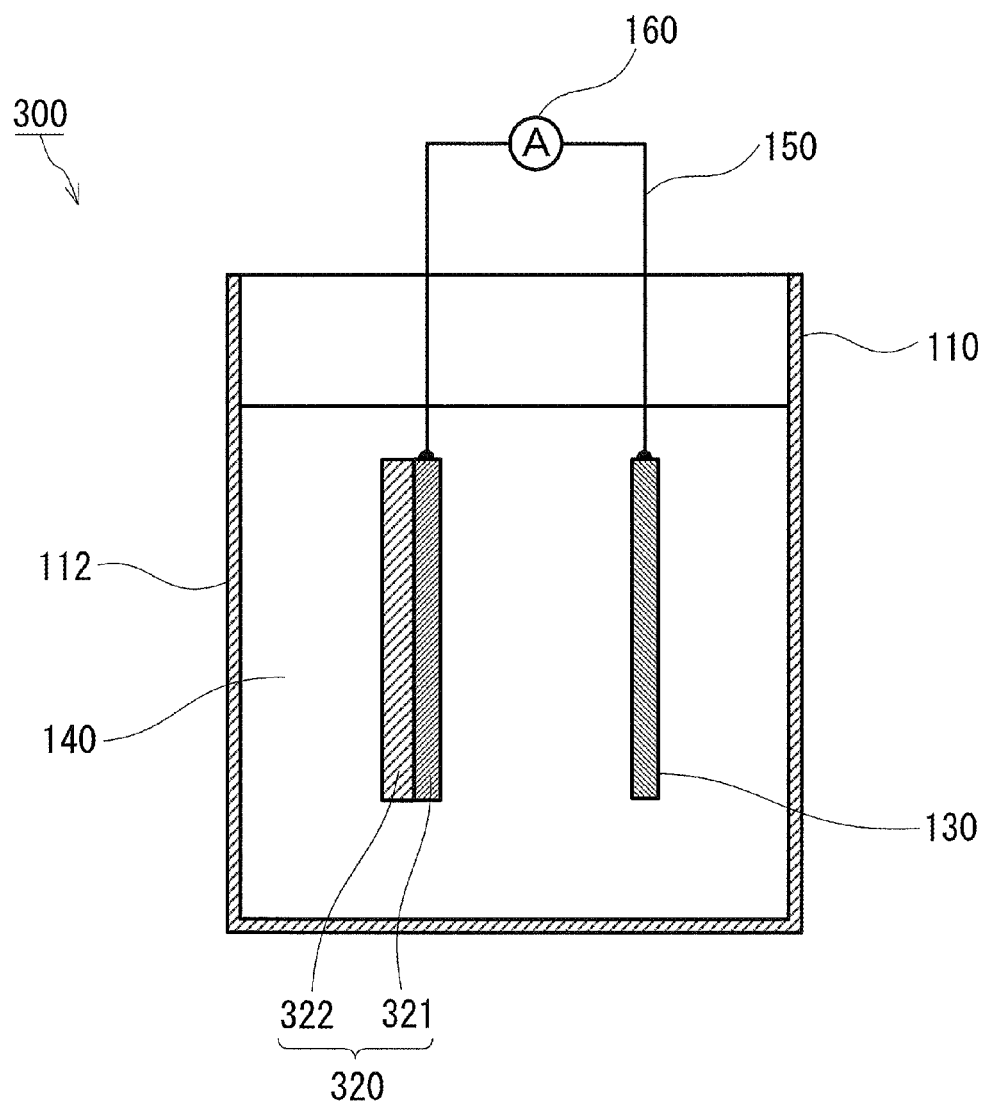
FIG. 21 is a schematic view illustrating a configuration of the photoelectrochemical cell of Embodiment 3 of the present invention.
Figure 22:
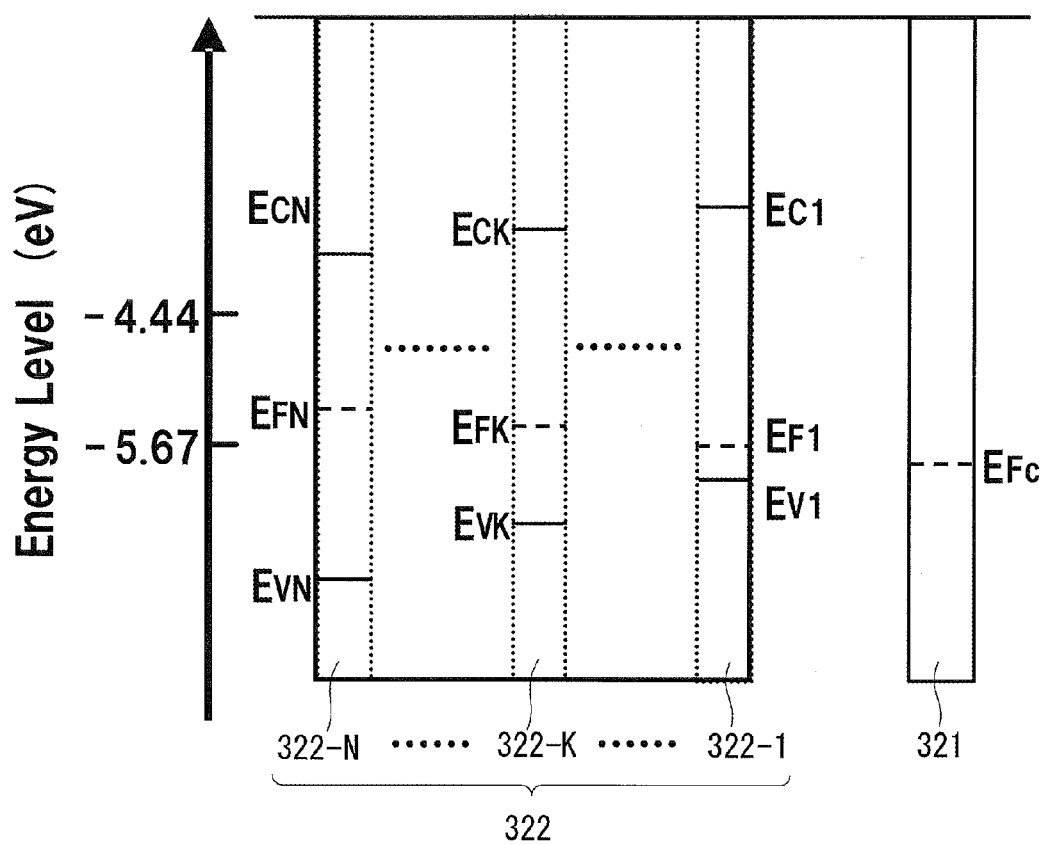
FIG. 22 is a conceptual diagram indicating a band structure of a conductor and a p-type semiconductor layer, before being joined, which constitute a semiconductor electrode in the photoelectrochemical cell of Embodiment 3 of the present invention.
Figure 23:
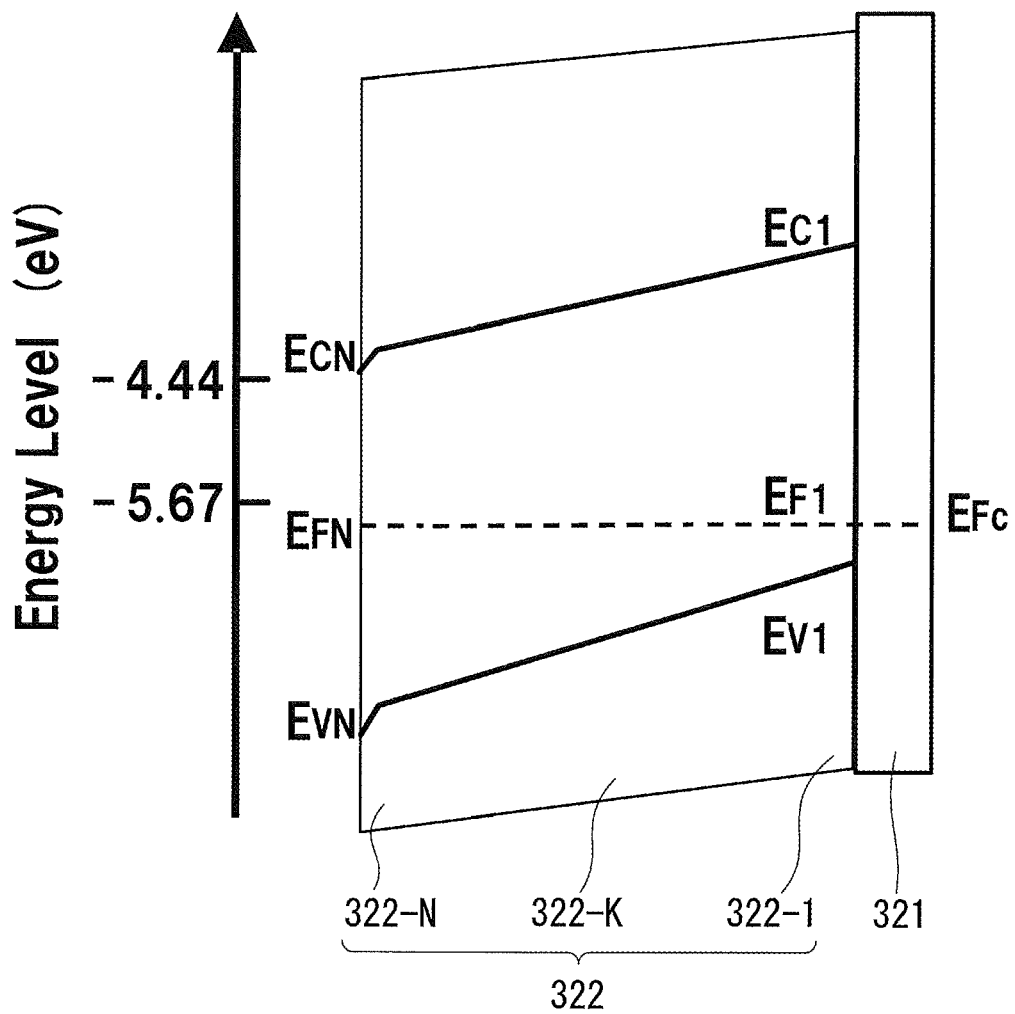
FIG. 23 is a conceptual diagram indicating a band structure of the conductor and the p-type semiconductor layer, after being joined, which constitute the semiconductor electrode in the photoelectrochemical cell of Embodiment 3 of the present invention.

A configuration of the photoelectrochemical cell according to Embodiment 3 of the present invention is described, referring to FIG. 21 to FIG. 23. FIG. 21 is a schematic view illustrating the configuration of the photoelectrochemical cell of the present embodiment. FIG. 22 is a conceptual diagram indicating a band structure of a conductor and a p-type semiconductor layer, before being joined, which constitute a semiconductor electrode in the photoelectrochemical cell of the present embodiment. FIG. 23 is a conceptual diagram indicating a band structure of the conductor and the p-type semiconductor layer, after being joined, which constitute the semiconductor electrode in the photoelectrochemical cell of the present embodiment. In each of FIGS. 22 and 23, the vertical axis indicates energy levels relative to the vacuum level (unit: eV).

As indicated in FIG. 21, a photoelectrochemical cell 300 of the present embodiment has the same configuration as the photoelectrochemical cell 100 of Embodiment 1 except that a semiconductor electrode 320 has a different configuration from the semiconductor electrode 120 of Embodiment 1. Accordingly, only the semiconductor electrode 320 is described in the present embodiment.

The semiconductor electrode 320 is disposed in the same manner as in Embodiment 1 so that the surface thereof is in contact with the electrolyte 140. The semiconductor electrode 320 includes a conductor 321 and a p-type semiconductor layer 322 disposed on the conductor 321. The p-type semiconductor layer 322 includes at least two elements, and at least one of the elements in the p-type semiconductor layer 322 has a concentration increasing or decreasing along the thickness direction of the p-type semiconductor layer 322. Hereinafter, such a state of the p-type semiconductor layer 322 may be expressed in such a way that the composition is in a gradient. The p-type semiconductor layer 332 faces the light incident portion 112 of the container 110.

The conductor 321 of the semiconductor electrode 320 is connected electrically to the counter electrode 130 by the conducting wire 150. In the present embodiment, a p-type semiconductor is used for the semiconductor electrode 320. Accordingly, the counter electrode 130 in the present embodiment is an electrode that gives electrons to the semiconductor electrode 320 without the intermediation of the electrolyte 140, and there is no limitation on the positional relationship, and the like, of the counter electrode 130 with the semiconductor electrode 320, as long as the counter electrode 130 is connected electrically to the conductor 321 that constitutes the semiconductor electrode 320.

Next, the band structure of the conductor 321 and the p-type semiconductor layer 322 in the semiconductor electrode 320 is described. It should be noted that although the p-type semiconductor layer 322 in the present embodiment is constituted by a single film having a gradient composition, the band structure is described, with reference to FIG. 22 and FIG. 23, on the assumption that a plurality (N, which is a natural number, not less than 3) of p-type semiconductor thin films having different compositions in steps are joined to one another so as to constitute the p-type semiconductor layer 322, for convenience of description. FIG. 22 indicates a state where the conductor 321 and the p-type semiconductor layer 322 are not joined to each other (state where N of p-type semiconductor thin films that have been assumed for convenience of the description also are not joined to one another). FIG. 23 indicates a state where the conductor 321 and the p-type semiconductor layer 322 are joined. In FIG. 22 and FIG. 23, the near-field region of the junction plane of the p-type semiconductor layer 322 with the conductor 321 (hereinafter, which may be referred to as the junction plane near-field region of the p-type semiconductor layer 322) is denoted by 322-1 as the first p-type semiconductor thin film, the near-field region of the surface thereof is denoted by 322-N as the Nth p-type semiconductor thin film, and the intermediate region is denoted by 322-K as the Kth p-type semiconductor thin film from the junction plane near-field region 322-1 (where K is an arbitrary natural number satisfying $2 \leq K \leq N-1$).

As indicated in FIG. 22, the band edge level $E_{CN}$ of the conduction band and the band edge level $E_{VN}$ of the valence band in the surface near-field region 322-N of the p-type semiconductor layer 322 that has a gradient composition, respectively, are lower than the band edge level $E_{C1}$ of the conduction band and the band edge level $E_{V1}$ of the valence band in the junction plane near-field region 322-1 of the p-type semiconductor layer 322, relative to the vacuum level ($E_{CN}<E_{C1}$ and $E_{VN}<E_{V1}$). Since the p-type semiconductor layer 322 has a gradient composition, the band edge level $E_{CK}$ of the conduction band and the band edge level $E_{VK}$ of the valence band in the intermediate region 322-K between the surface near-field region 322-N and the junction plane near-field region 322-1, respectively, are located between those band edge levels of the surface near-field region 322-N and the junction plane near-field region 322-1 ($E_{CN}<E_{CK}<E_{C1}$ and $E_{VN}<E_{VK}<E_{V1}$). Relative to the vacuum level, the Fermi level $E_{F1}$ of the junction plane near-field region 322-1 of the p-type semiconductor layer 322 is lower than the Fermi level $E_{FN}$ of the surface near-field region 322-N of the p-type semiconductor layer 322 ($E_{FN}>E_{F1}$). Further, since the p-type semiconductor layer 322 has a gradient composition, the Fermi level $E_{FK}$ of the intermediate region 322-K is located between the Fermi levels of the surface near-field region 322-N and the junction plane near-field region 322-1 ($E_{FN}>E_{FK}>E_{F1}$). Furthermore, relative to the vacuum level, the Fermi level $E_{Fc}$ of the conductor 321 is lower than the Fermi level $E_{F1}$ of the junction plane near-field region of the n-type semiconductor layer 322 ($E_{F1}>E_{Fc}$).

Next, when the conductor 321, and the junction plane near-field region 322-1, the intermediate region 322-K and the surface near-field region 322-N of the p-type semiconductor layer 322 are joined to one another, at the junction planes of the junction plane near-field region 322-1, the intermediate region 322-K and the surface near-field region 322-N of the p-type semiconductor layer 322, carriers transfer so that the Fermi levels match one another, thereby causing bending of the band edge as indicated in FIG. 23. At this time, as described above, since the relationships of $E_{CN}<E_{CK}<E_{C1}$, $E_{VN}<E_{VK}<E_{V1}$ and $E_{FN}>E_{FK}>E_{F1}$ are satisfied, relative to the vacuum level, no Schottky barriers occur inside the p-type semiconductor layer 322, and thus ohmic contacts are formed inside the p-type semiconductor layer 322.

When the above-mentioned semiconductor electrode 320 is made to be in contact with the electrolyte, the band edge level $E_{CN}$ of the conduction band and the band edge level $E_{VN}$ of the valence band in the surface near-field region 322-N are decreased at the interface between the surface near-field region 322-N of the p-type semiconductor layer 322 and the electrolyte 140. Thus, a space charge layer occurs around the surface of the p-type semiconductor layer 322.

As a comparative embodiment, a p-type semiconductor layer having a band edge level of the conduction band in the surface near-field region higher than the band edge level of the conduction band in the junction plane near-field region, relative to the vacuum level, is assumed. In this case, a square well potential is developed in the band edge level of the conduction band inside the p-type semiconductor layer due to the bending of the band edge of the conduction band in the surface near-field region and the difference in the band edge levels of the conduction band between the surface near-field region and the junction plane near-field region in this p-type semiconductor layer. This square well potential causes the electrons to be accumulated inside the p-type semiconductor layer, and the probability of recombination between the electrons and holes generated by photoexcitation to increase.

In contrast, in the photoelectrochemical cell 300 of the present embodiment, since the band edge level $E_{CN}$ of the conduction band in the surface near-field region 322-N of the p-type semiconductor layer 322 is set lower than the band edge level $E_{C1}$ of the conduction band in the junction plane near-field region, no square well potential as mentioned above occurs in the band edge level of the conduction band inside the p-type semiconductor layer 322. Furthermore, since the p-type semiconductor layer 322 has a gradient composition in the thickness direction in the present embodiment, the conduction band also is not flat but in a gradient in the thickness direction. Therefore, the electrons are not accumulated inside the p-type semiconductor layer 322 and can transfer toward the side of the interface with the electrolyte, so that the efficiency of charge separation is improved significantly.

As another comparative embodiment, a p-type semiconductor layer having a band edge level of the valence band in the surface near-field region higher than the band edge level of the valence band in the junction plane near-field region, relative to the vacuum level, is assumed. In this case, a square well potential is developed in the band edge level of the valence band inside the p-type semiconductor layer due to the bending of the band edge of the valence band in the surface near-field region and the difference in the band edge levels of the valence band between the surface near-field region and the junction plane near-field region. This square well potential causes the holes that have been generated inside the p-type semiconductor layer by photoexcitation to transfer separately in the interface direction with the electrolyte (surface near-field region side) and the junction plane direction of the p-type semiconductor layer with the conductor (junction plane near-field region side).

In contrast, in the photoelectrochemical cell 300 of the present embodiment, since the band edge level $E_{VN}$ of the valence band in the surface near-field region 322-N of the p-type semiconductor layer 322 is set higher than the band edge level $E_{V1}$ of the valence band in the junction plane near-field region 322-1 of the p-type semiconductor layer 322, no square well potential as mentioned above occurs in the band edge level of the valence band inside the p-type semiconductor layer 322. Furthermore, since the p-type semiconductor layer 322 has a gradient composition in the thickness direction in the present embodiment, the valence band also is not flat but in a gradient in the thickness direction. Therefore, the holes are not accumulated inside the p-type semiconductor layer 322 and can transfer toward the side of the conductor 321, so that the efficiency of charge separation is improved significantly.

Further, in the photoelectrochemical cell 300 of the present embodiment, the Fermi level $E_{F1}$ of the junction plane near-field region 322-1 of the p-type semiconductor layer 322 is set lower than the Fermi level $E_{FN}$ of the surface near-field region 322-N of the p-type semiconductor layer 322, relative to the vacuum level, in addition to the band edge level of the conduction band and the band edge level of the valence band inside the p-type semiconductor layer 322 being set as mentioned above. This configuration causes band bending but no Schottky barriers inside the p-type semiconductor layer 322. As a result, among the electrons and holes generated by photoexcitation inside the p-type semiconductor layer 322, the electrons transfer in the conduction band toward the interface direction with the electrolyte, and the holes transfer in the valence band toward the junction plane direction with the conductor 321. That is, an efficient charge separation between the electrons and holes is possible without being prevented by Schottky barriers. This reduces the probability of the recombination between the electrons and holes generated by photoexcitation inside the p-type semiconductor layer 322, therefore improving the quantum efficiency of the hydrogen evolution reaction by irradiation with light.

Further, in the photoelectrochemical cell 300 of the present embodiment, the Fermi level $E_{Fc}$ of the conductor 321 is set lower than the Fermi level $E_{F1}$ of the junction plane near-field region 322-1 of the p-type semiconductor layer 322, relative to the vacuum level. This configuration causes no Schottky barriers also at the junction plane between the conductor 321 and the p-type semiconductor layer 322. Therefore, the holes can transfer from the p-type semiconductor layer 322 to the conductor 321 without being prevented by Schottky barriers. Accordingly, the probability of the recombination between the electrons and holes generated by photoexcitation inside the second p-type semiconductor layer 322 is reduced further, and the quantum efficiency of the hydrogen evolution reaction by irradiation with light can be improved further.

In the present embodiment, when the p-type semiconductor layer 322 is in contact with the electrolyte 140 at a pH of 0 and a temperature of 25° C., the Fermi level $E_{F1}$ of the junction plane near-field region 322-1 is −5.67 eV or less, and the band edge level $E_{CN}$ of the conduction band in the surface near-field region 322-N is −4.44 eV or more, relative to the vacuum level.

When the Fermi level $E_{F1}$ of the junction plane near-field region 322-1 is −5.67 eV or less, the Fermi level $E_{Fc}$ of the conductor 321 in contact with the junction plane near-field region 322-1 is allowed to be −5.67 eV or less, relative to the vacuum level. This value of −5.67 eV is the oxidation reduction potential of water. Thus, water is oxidized efficiently on the surface of the counter electrode 130 that is connected electrically with the conductor 321, and therefore oxygen can be generated efficiently.

Further, when the band edge level $E_{CN}$ of the conduction band in the surface near-field region 322-N is −4.44 eV or more, the band edge level $E_{CN}$ of the conduction band in the surface near-field region 322-N is allowed to be −5.67 eV or less, relative to the vacuum level. This value of −5.67 eV is the oxidation reduction potential of hydrogen. Thus, hydrogen is reduced efficiently on the surface of the p-type semiconductor layer 322, and therefore hydrogen can be generated efficiently As described above, when the p-type semiconductor layer 322 is in contact with the electrolyte 140 at a pH of 0 and a temperature of 25° C., water can be decomposed efficiently by setting the Fermi level $E_{F1}$ of the junction plane near-field region 322-1 to −5.67 eV or less, and the band edge level $E_{CN}$ of the conduction band in the surface near-field region 322-N to −4.44 eV or more, relative to the vacuum level.

It should be noted that although the p-type semiconductor layer 322 that satisfies the above-mentioned energy levels is exemplified in the present embodiment, the Fermi level $E_{F1}$ of the junction plane near-field region 322-1 of the p-type semiconductor layer 322 may exceed −5.67 eV, and the band edge level $E_{CN}$ of the conduction band in the surface near-field region 322-N of the n-type semiconductor layer 322 may be less than −4.44 eV, for example. Also in such a case, it is possible to generate hydrogen and oxygen.

Here, the Fermi level and the potential (band edge level) at the top of the valence band in the p-type semiconductor layer 322 can be calculated using the flat band potential and carrier concentration. The flat band potential and carrier concentration of a semiconductor can be determined from the Mott-Schottky plot obtained by measurement using a semiconductor that is the object of the measurement as an electrode.

Further, the Fermi level of the p-type semiconductor layer 322 when in contact with the electrolyte 140 at a pH of 0 and a temperature of 25° C. can be obtained by determining the Mott-Schottky plot using the semiconductor as an electrode in the state where the semiconductor electrode is in contact with an electrolyte at a pH of 0 and a temperature of 25° C.

The potential (band edge level) at the bottom of the conduction band in the p-type semiconductor layer 322 can be calculated using the band gap and the potential at the top of the valence band in the p-type semiconductor layer 322 calculated by the above-mentioned method. Here, the band gap of the p-type semiconductor layer 322 can be obtained from the optical absorption edge to be observed in the measurement of the light absorption spectrum of a semiconductor that is the object of the measurement.

The Fermi level of the conductor 321 can be obtained in the same manner as in Embodiment 1.

Next, the material for the p-type semiconductor layer 322 is described.

In the present embodiment, at least one selected from oxide, sulfide, selenide, telluride, nitride, oxynitride, phosphide and the like can be used for the p-type semiconductor layer 322. Among these, a compound containing at least one element selected from copper, silver, gallium, indium, germanium, tin, antimony and the like as a constituent element can be used suitably. The p-type semiconductor layer 322 includes at least two elements, and at least one of the elements in the p-type semiconductor layer 322 has a concentration increasing or decreasing along the thickness direction of the p-type semiconductor layer 322. For example, in the case where the p-type semiconductor layer 322 is formed of one kind of a compound, at least one element composing the compound has a concentration increasing or decreasing along the thickness direction of the p-type semiconductor layer 322. It should be noted that the elements composing the p-type semiconductor layer 322 may include an element having a concentration of 0 at the surface of the p-type semiconductor layer 322 or the junction plane of the p-type semiconductor layer 322 with the conductor 321.

Particularly, it is preferable to use at least one selected from the group consisting of oxide, nitride and oxynitride. This is because, use of oxide, nitride or oxynitride can prevent the p-type semiconductor layer 322 from being dissolved in the electrolyte 140 even if the p-type semiconductor layer 322 of the semiconductor electrode 320 is irradiated with light in a state where the semiconductor electrode 320 is in contact with the electrolyte 140, so that stable operation of the photoelectrochemical cell 300 is possible. Further, at least one element selected from copper, silver, gallium, indium, germanium, tin and antimony is used particularly preferably as the constituent element of the p-type semiconductor layer 322. The p-type semiconductor layer 322 containing one of these elements allows the Fermi level $E_{F1}$ of the junction plane near-field region 322-1 of the p-type semiconductor layer 322 to be set to −5.67 eV or less, relative to the vacuum level, while the semiconductor electrode 320 is in contact with the electrolyte 140 at a pH of 0 and a temperature of 25° C. Further, the p-type semiconductor layer 322 may be the above-mentioned compound additionally containing alkali metal ions, alkaline earth metal, or the like.

For the conductor 321, electrically conductive materials, such as ITO and FTO, or metals such as Ti, Ni, Ta, Nb, Al and Ag, can be used, for example. One capable of forming an ohmic contact at the junction with the p-type semiconductor layer 322 can be selected appropriately from these.

Next, the operation of the photoelectrochemical cell 300 of the present embodiment is described.

When the p-type semiconductor layer 322 of the semiconductor electrode 320 disposed inside the container 110 is irradiated with sunlight from the light incident portion 112 of the container 110 in the photoelectrochemical cell 300, electrons are generated in the conduction band and holes are generated in the valence band in the portion of the p-type semiconductor layer 322 subjected to the light irradiation (which is the surface near-field region 322-N of the p-type semiconductor layer 322 in the present embodiment). The electrons generated at this time transfer toward the surface near-field region 322-N of the p-type semiconductor layer 322. Thus, hydrogen is generated on the surface of the p-type semiconductor layer 322 according to the above reaction formula (2). On the other hand, the holes transfer to the conductor 321 from the junction plane near-field region 322-1 of the p-type semiconductor layer 322 with the conductor 321 along the bending of the band edge of the valence band caused by the junction between the conductor 321 and the p-type semiconductor layer 322. The holes that have transferred to the conductor 321 transfer toward the side of the counter electrode 130 connected electrically to the conductor 321 through the conducting wire 150. Thus, oxygen is generated on the surface of the counter electrode 130 according to the above reaction formula (1).

At this time, since no Schottky barriers occur inside the p-type semiconductor layer 322, the holes can transfer to the junction plane near-field region 322-1 of the p-type semiconductor layer 322 without being prevented. Accordingly, the probability of the recombination between the electrons and holes generated by photoexcitation inside the p-type semiconductor layer 322 is reduced, and the quantum efficiency of the hydrogen evolution reaction by irradiation with light can be improved.

Embodiment 4

Figure 24:
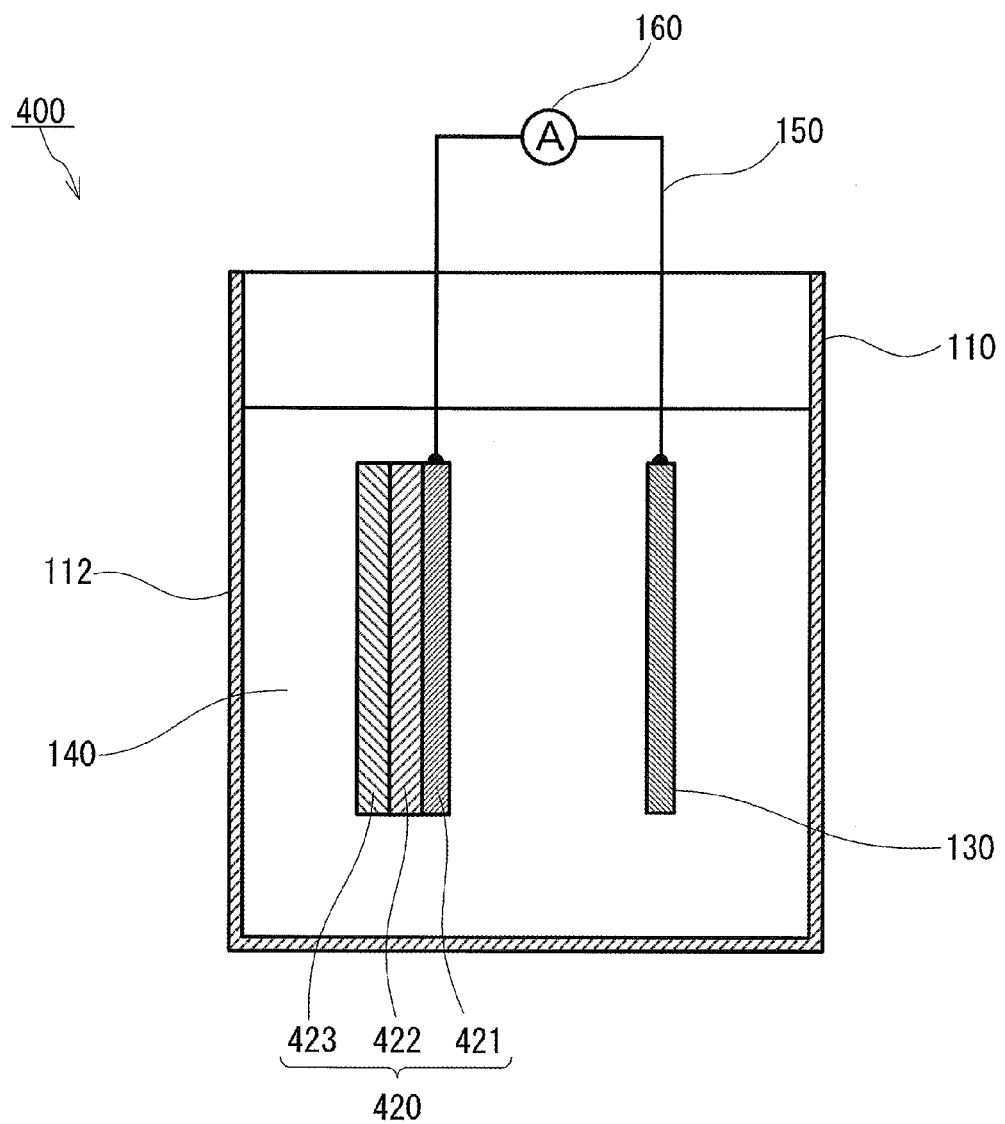
FIG. 24 is a schematic view illustrating a configuration of the photoelectrochemical cell of Embodiment 4 of the present invention.
Figure 25:
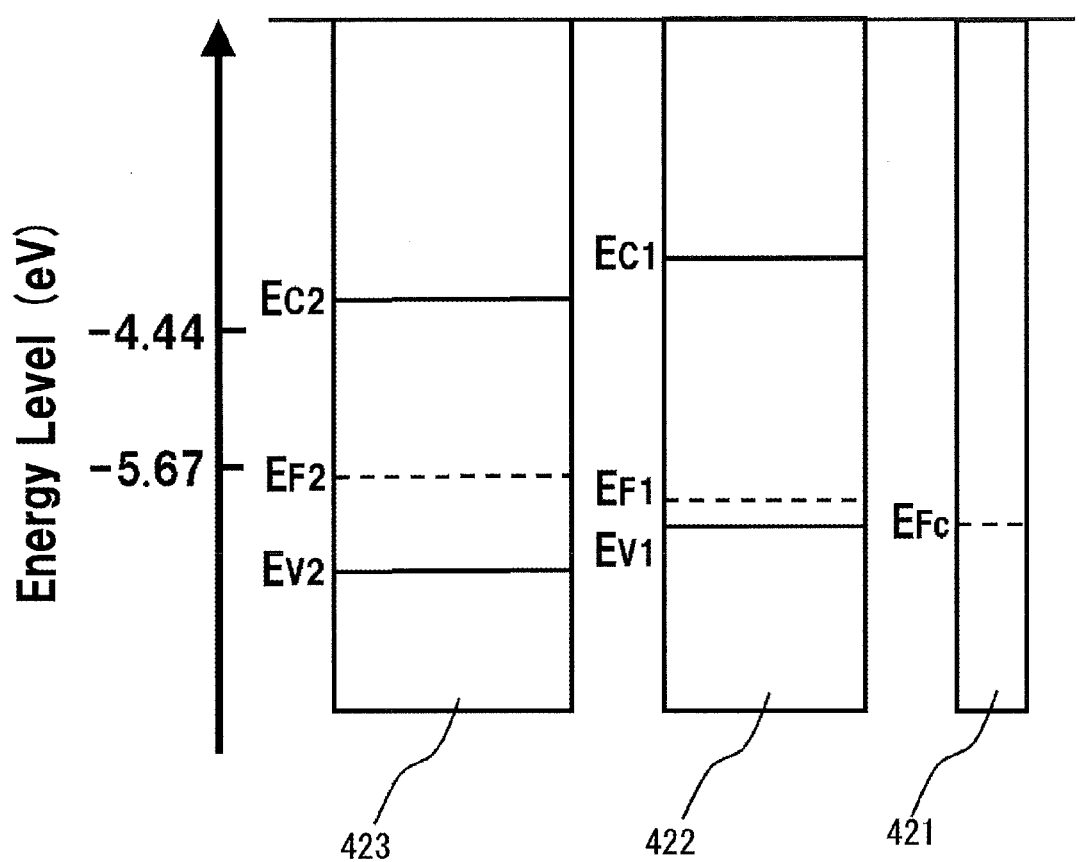
FIG. 25 is a conceptual diagram indicating a band structure of a conductor, a first p-type semiconductor layer and a second p-type semiconductor layer, before being joined, which constitute a semiconductor electrode in the photoelectrochemical cell of Embodiment 4 of the present invention.
Figure 26:
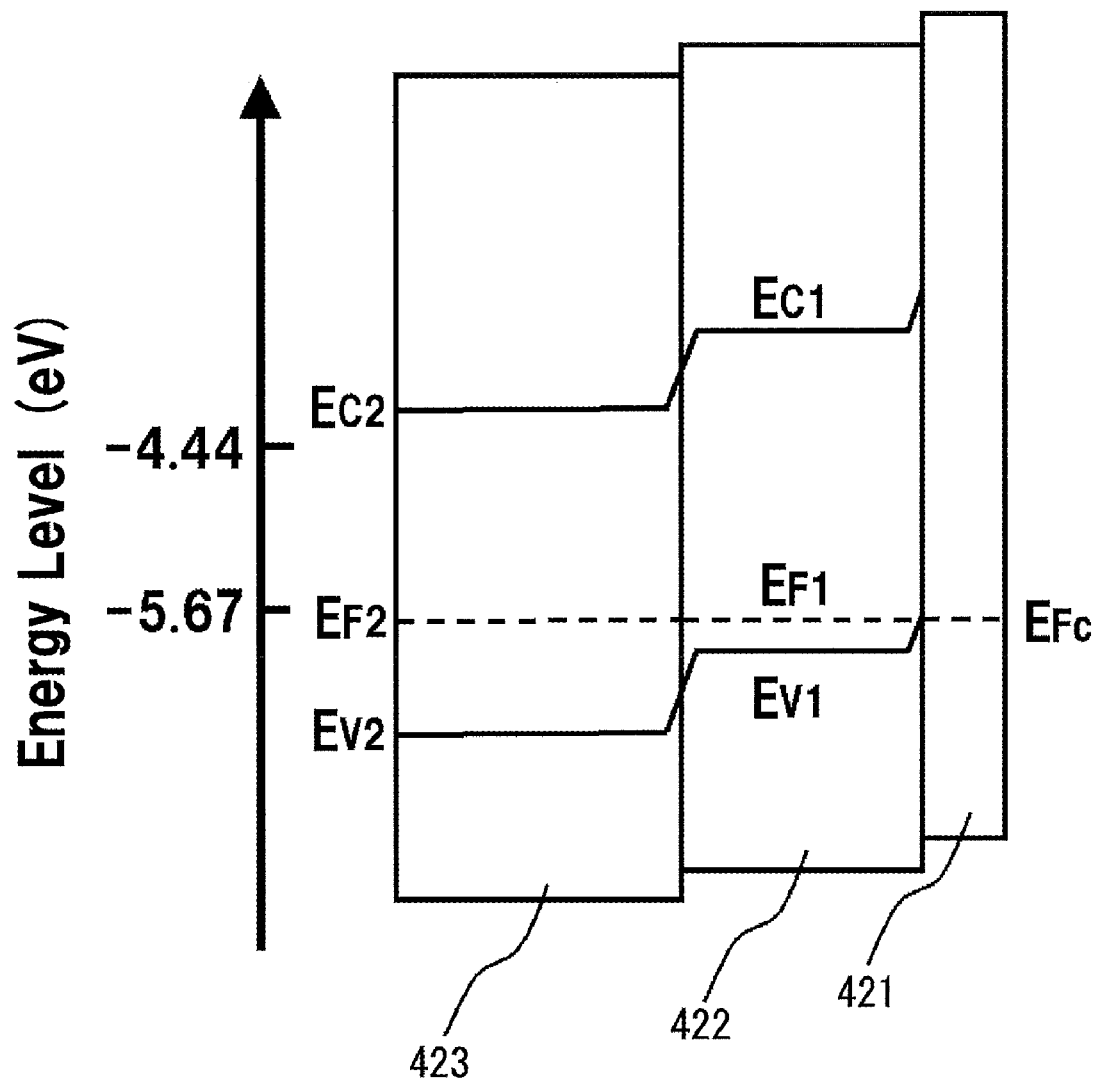
FIG. 26 is a conceptual diagram indicating a band structure of the conductor, the first p-type semiconductor layer and the second p-type semiconductor layer, after being joined, which constitute the semiconductor electrode in the photoelectrochemical cell of Embodiment 4 of the present invention.

The configuration of the photoelectrochemical cell according to Embodiment 4 of the present invention is described, referring to FIG. 24 to FIG. 26. FIG. 24 is a schematic view illustrating the configuration of the photoelectrochemical cell of the present embodiment. FIG. 25 is a conceptual diagram indicating a band structure of a conductor, a first p-type semiconductor layer and a second p-type semiconductor layer, before being joined, which constitute a semiconductor electrode in the photoelectrochemical cell of the present embodiment. FIG. 26 is a conceptual diagram indicating a band structure of the conductor; the first p-type semiconductor layer and the second p-type semiconductor layer, after being joined, which constitute the semiconductor electrode in the photoelectrochemical cell of the present embodiment. In each of FIGS. 25 and 26, the vertical axis indicates energy levels relative to the vacuum level (unit: eV).

As indicated in FIG. 24, a photoelectrochemical cell 400 of the present embodiment has the same configuration as the photoelectrochemical cell 100 of Embodiment 1 except that a semiconductor electrode 420 has a different configuration from the semiconductor electrode 120 of Embodiment 1. Accordingly, only the semiconductor electrode 420 is described in the present embodiment. The same components as in the photoelectrochemical cell 100 of Embodiment 1 are denoted by the same referential numerals, and the descriptions thereof will be omitted.

The semiconductor electrode 420 is disposed in the same manner as in Embodiment 1 so that the surface thereof is in contact with the electrolyte 140. The semiconductor electrode 420 includes a conductor 421, a first p-type semiconductor layer 422 disposed on the conductor 421 and a second p-type semiconductor layer 423 disposed on the first p-type semiconductor layer 422. That is, the p-type semiconductor layer that constitutes the semiconductor electrode 420 includes the first p-type semiconductor layer 422 and the second p-type semiconductor layer 423 in the present embodiment. The second p-type semiconductor layer 423 faces the light incident portion 112 of the container 110.

The conductor 421 of the semiconductor electrode 420 is connected electrically to the counter electrode 130 by the conducting wire 150.

Next, the band structure of the conductor 421, the first p-type semiconductor layer 422 and the second p-type semiconductor layer 423 in the semiconductor electrode 420 is described.

As indicated in FIG. 25, the band edge level $E_{C2}$ of the conduction band and the band edge level $E_{V2}$ of the valence band in the second p-type semiconductor layer 423, respectively, are lower than the band edge level $E_{C1}$ of the conduction band and the band edge level $E_{V1}$ of the valence band in the first p-type semiconductor layer 422, relative to the vacuum level.

The Fermi level $E_{F1}$ of the first p-type semiconductor layer 422 is lower than the Fermi level $E_{F2}$ of the second p-type semiconductor layer 423, relative to the vacuum level. Further, the Fermi level $E_{Fc}$ of the conductor 421 is lower than the Fermi level $E_{F1}$ of the first p-type semiconductor layer 422, relative to the vacuum level.

When the first p-type semiconductor layer 422 and the second p-type semiconductor layer 423 are regarded as one p-type semiconductor layer as a whole, the second p-type semiconductor layer 423 corresponds to the surface near-field region of the p-type semiconductor layer, and the first p-type semiconductor layer 422 corresponds to the junction plane near-field region with the conductor 421. Accordingly, it can be said that the band edge levels of the conduction band and the valence band in the surface near-field region of the p-type semiconductor layer, respectively, are lower than the band edge levels of the conduction band and the valence band in the junction plane near-field region of the p-type semiconductor layer with the conductor 421 in the present embodiment. Furthermore, it also can be said that the Fermi level of the junction plane near-field region of the p-type semiconductor layer with the conductor 421 is lower than the Fermi level of the surface near-field region of the p-type semiconductor layer, and the Fermi level of the conductor 421 is lower than the Fermi level of the junction plane near-field region of the p-type semiconductor layer with the conductor 421.

In the present embodiment, when the semiconductor electrode 420 is in contact with the electrolyte 140 at a pH of 0 and a temperature of 25° C., the Fermi level $E_{F1}$ of the first p-type semiconductor layer 422 is −5.67 eV or less, and the band edge level $E_{C2}$ of the conduction band in the second p-type semiconductor layer 423 is −4.44 eV or more, relative to the vacuum level. When the semiconductor electrode 420 satisfies such energy levels, the Fermi level $E_{Fc}$ of the conductor 421 in contact with the first p-type semiconductor layer 422 is allowed to be −5.67 eV or less, relative to the vacuum level. This value of −5.67 eV is the oxidation reduction potential of water. Thus, water is oxidized efficiently on the surface of the counter electrode 130 that is connected electrically with the conductor 421, and therefore oxygen can be generated efficiently.

Further, when the band edge level $E_{C2}$ of the conduction band in the second p-type semiconductor layer 423 is −4.44 eV or more, the band edge level $E_{C2}$ of the conduction band in the second p-type semiconductor layer 423 is allowed to be −4.44 eV or more, relative to the vacuum level. This value of −4.44 eV is the oxidation reduction potential of hydrogen. Thus, hydrogen ions are reduced efficiently on the surface of the second p-type semiconductor layer 423, and therefore hydrogen can be generated efficiently As described above, when the semiconductor electrode 420 is in contact with the electrolyte 140 at a pH of 0 and a temperature of 25° C., water can be decomposed efficiently by setting the Fermi level $E_{F1}$ of the first p-type semiconductor layer 422 to −5.67 eV or less, and the band edge level $E_{C2}$ of the conduction band in the second p-type semiconductor layer 423 to −4.44 eV or more, relative to the vacuum level.

It should be noted that although the semiconductor electrode 420 that satisfies such energy levels as mentioned above is exemplified in the present embodiment, the Fermi level $E_{F1}$ of the first p-type semiconductor layer 422 may exceed −5.67 eV, and the band edge level $E_{C2}$ of the conduction band in the second p-type semiconductor layer 423 may be less than −4.44 eV, for example. Also in such a case, it is possible to generate hydrogen and oxygen.

Next, when the conductor 421, the first p-type semiconductor layer 422 and the second p-type semiconductor layer 423 are joined to one another, carriers transfer between the first p-type semiconductor layer 422 and the second p-type semiconductor layer 423 so that the Fermi levels match each other, thereby causing bending of the band edge, at the junction plane therebetween, as indicated in FIG. 26. At this time, the band edge level $E_{C2}$ of the conduction band and the band edge level $E_{V2}$ of the valence band in the second p-type semiconductor layer 423, respectively, are lower than the band edge level $E_{C1}$ of the conduction band and the band edge level $E_{V1}$ of the valence band in the first p-type semiconductor layer 422, and the Fermi level $E_{F1}$ of the first p-type semiconductor layer 422 is lower than the Fermi level $E_{F2}$ of the second p-type semiconductor layer 423, relative to the vacuum level. Therefore, no Schottky barriers occur at the junction plane between the first p-type semiconductor layer 422 and the second p-type semiconductor layer 423.

Further, also at the junction plane between the first p-type semiconductor layer 422 and the conductor 421, carriers transfer so that the Fermi levels match each other, thereby causing bending of the band edge around the junction plane of the first p-type semiconductor layer 422. At this time, since the Fermi level $E_{Fc}$ of the conductor 421 is lower than the Fermi level $E_{F1}$ of the first p-type semiconductor layer 422, relative to the vacuum level, the junction between the conductor 421 and the first p-type semiconductor layer 422 is formed by an ohmic contact.

When the above-mentioned semiconductor electrode 420 is made to be in contact with the electrolyte, the band edge level $E_{C2}$ of the conduction band and the band edge level $E_{V2}$ of the valence band around the surface of the second p-type semiconductor layer 423 are decreased at the interface between the second p-type semiconductor layer 423 and the electrolyte. Thus, a space charge layer occurs around the surface of the second p-type semiconductor layer 423.

As a comparative embodiment, an embodiment having a band edge level of the conduction band in the second p-type semiconductor layer higher than the band edge level of the conduction band in the first p-type semiconductor layer, relative to the vacuum level, is assumed. In this case, a square well potential is developed in the band edge level of the conduction band inside the second p-type semiconductor layer due to the bending of the band edge of the conduction band around the surface of the second p-type semiconductor layer and the difference in the band edge levels of the conduction band between the first p-type semiconductor layer and the second p-type semiconductor layer. This square well potential causes the electrons that have been generated inside the second p-type semiconductor layer by photoexcitation to transfer separately in the interface direction with the electrolyte and the interface direction with the first p-type semiconductor layer.

In contrast, in the photoelectrochemical cell 400 of the present embodiment, since the band edge level $E_{C2}$ of the conduction band in the second p-type semiconductor layer 423 is set lower than the band edge level $E_{C1}$ of the conduction band in the first p-type semiconductor layer 422, no square well potential as mentioned above occurs in the band edge level of the conduction band inside the second p-type semiconductor layer 423. Therefore, the electrons inside the second p-type semiconductor layer 423 transfer toward the interface direction with the electrolyte, so that the efficiency of charge separation is improved significantly.

Further, as another comparative embodiment, an embodiment having a band edge level of the valence band in the second p-type semiconductor layer higher than the band edge level of the valence band in the first p-type semiconductor layer 422, relative to the vacuum level, is assumed. In this case, a square well potential is developed in the band edge level of the valence band inside the second p-type semiconductor layer due to the bending of the band edge of the valence band around the surface of the second p-type semiconductor layer and the difference in the band edge levels of the valence band between the first p-type semiconductor layer and the second p-type semiconductor layer. This square well potential causes the holes that have been generated by photoexcitation inside the second p-type semiconductor layer to be accumulated inside the second p-type semiconductor layer.

In contrast, in the photoelectrochemical cell 400 of the present embodiment, since the band edge level $E_{V2}$ of the valence band in the second p-type semiconductor layer 423 is set lower than the band edge level $E_{V1}$ of the valence band in the first p-type semiconductor layer 422, no square well potential as mentioned above occurs in the band edge level of the valence band inside the second p-type semiconductor layer 423. Therefore, the holes are not accumulated inside the second p-type semiconductor layer 423 and can transfer toward the interface direction with the first p-type semiconductor layer 422, so that the efficiency of charge separation is improved significantly Further, in the photoelectrochemical cell 400 of the present embodiment, the Fermi level $E_{F1}$ of the first p-type semiconductor layer 422 is set lower than the Fermi level $E_{F2}$ of the second p-type semiconductor layer 423, relative to the vacuum level, in addition to the band edge levels of the conduction band and the band edge levels of the valence band in the first p-type semiconductor layer 422 and the second p-type semiconductor layer 423 being set as mentioned above. This configuration causes band bending but no Schottky barriers at the interface between the first p-type semiconductor layer 422 and the second p-type semiconductor layer 423. As a result, among the electrons and holes generated by photoexcitation inside the second p-type semiconductor layer 423, the electrons transfer in the conduction band toward the interface direction with the electrolyte, and the holes transfer to the valence band of the first p-type semiconductor layer 422. That is, an efficient charge separation between the electrons and holes is possible without being prevented by Schottky barriers. This reduces the probability of the recombination between the electrons and holes generated by photoexcitation inside the second p-type semiconductor layer 423, therefore improving the quantum efficiency of the hydrogen evolution reaction by irradiation with light.

Further, in the photoelectrochemical cell 400 of the present embodiment, the Fermi level $E_{Fc}$ of the conductor 421 is set lower than the Fermi level $E_{F1}$ of the first p-type semiconductor layer 422, relative to the vacuum level. This configuration causes no Schottky barriers also at the junction plane between the conductor 421 and the first p-type semiconductor layer 422. Therefore, the holes can transfer from the first p-type semiconductor layer 422 to the conductor 421 without being prevented by Schottky barriers. This further reduces the probability of the recombination between the electrons and holes generated by photoexcitation inside the second p-type semiconductor layer 423, therefore further improving the quantum efficiency of the hydrogen evolution reaction by irradiation with light.

It should be noted that the Fermi levels, the potentials (band edge levels) at the bottom of the conduction band and the potentials (band edge levels) at the top of the valence band of the first p-type semiconductor layer 422 and the second p-type semiconductor layer 423 can be obtained in the same manner as in the p-type semiconductor layer 322 described in Embodiment 3. Further, the Fermi level of the conductor 421 can be obtained in the same manner as in Embodiment 1.

Next, the materials of the first p-type semiconductor layer 422 and the second p-type semiconductor layer 423 in the present embodiment each are described.

For the first p-type semiconductor layer 422 and the second p-type semiconductor layer 423, it is possible to use oxide, sulfide, selenide, telluride, nitride, oxynitride, phosphide, and the like, that contain copper, silver, gallium, indium, germanium, tin, antimony, or the like, as a constituent element.

As the first p-type semiconductor layer 422, copper oxide is used preferably In this way the first p-type semiconductor layer 422 is allowed to have a Fermi level $E_{F1}$ of −5.67 eV or less, relative to the vacuum level, while being in contact with the electrolyte 140 at a pH of 0 and a temperature of 25° C. The first p-type semiconductor layer 422 may be formed of copper oxide, or may be formed of a complex compound containing copper oxide. Further, the first p-type semiconductor layer 422 may be the above-mentioned compound additionally containing metal ions other than copper.

The carrier concentration of the second p-type semiconductor layer 423 is preferably lower than the carrier concentration of the first p-type semiconductor layer 422. The second p-type semiconductor layer 423 preferably is one selected from the group consisting of oxide, nitride and oxynitride. In this way the second p-type semiconductor layer 423 is prevented from dissolving in the electrolyte, even if the second p-type semiconductor layer 423 of the semiconductor electrode 420 is irradiated with light in a state where the semiconductor electrode 420 is in contact with the electrolyte 140. Accordingly, stable operation of the photoelectrochemical cell is possible.

In the case of using copper oxide for the first p-type semiconductor layer 422, copper indium sulfide, for example, can be used for the second p-type semiconductor layer 423.

The conductor 421 is joined with the first p-type semiconductor layer 422 by an ohmic contact. The same material as for the conductor 321 in Embodiment 3 can be used for the conductor 421.

Next, the operation of the photoelectrochemical cell 400 of the present embodiment is described.

When the second p-type semiconductor layer 423 of the semiconductor electrode 420 disposed inside the container 110 is irradiated with sunlight from the light incident portion 112 of the container 110 in the photoelectrochemical cell 400, electrons are generated in the conduction band and holes are generated in the valence band in the second p-type semiconductor layer 423. The holes thus generated transfer to the conductor 421 along the bending of the band edge of the valence band at the interface between the second p-type semiconductor layer 423 and the first p-type semiconductor layer 422 and the interface between the first p-type semiconductor layer 422 and the conductor 421. The holes that have transferred to the conductor 421 transfer toward the side of the counter electrode 130 connected electrically to the semiconductor electrode 420 through the conducting wire 150. Thus, oxygen is generated due to decomposition of water on the surface of the counter electrode 130 according to the above reaction formula (1). On the other hand, the electrons transfer toward the surface side of the second p-type semiconductor layer 423 (the side of the interface with the electrolyte 140). Thus, hydrogen is generated on the surface of the second p-type semiconductor layer 423 according to the above reaction formula (2).

At this time, since no Schottky barriers occur at the junction plane between the first p-type semiconductor layer 422 and the second p-type semiconductor layer 423, the holes can transfer from the second p-type semiconductor layer 423 to the first p-type semiconductor layer 422 without being prevented.

Furthermore, since no Schottky barriers occur also at the junction plane between the conductor 421 and the first p-type semiconductor layer 422, the holes can transfer from the first p-type semiconductor layer 422 to the conductor 421 without being prevented. Accordingly, the probability of the recombination between the electrons and holes generated by photoexcitation inside the second p-type semiconductor layer 423 is reduced, and the quantum efficiency of the hydrogen evolution reaction by irradiation with light can be improved further.

Photoelectrochemical cells of Comparative Embodiments 4-1 to 4-7 each having a relationship of the energy levels among a first n-type semiconductor layer, a second n-type semiconductor layer and a conductor different from that in the semiconductor electrode 420 are exemplified below and the differences in the operational effects are described. It should be noted that although the relationship of the energy levels among the first p-type semiconductor layer, the second p-type semiconductor layer and the conductor in each of Comparative Embodiments 4-1 to 4-7 indicated below is different from that in the photoelectrochemical cell 400 of the present embodiment, other configurations are the same as in the photoelectrochemical cell 400, and thus descriptions thereof are omitted.

Comparative Embodiment 4-1

Figure 27:
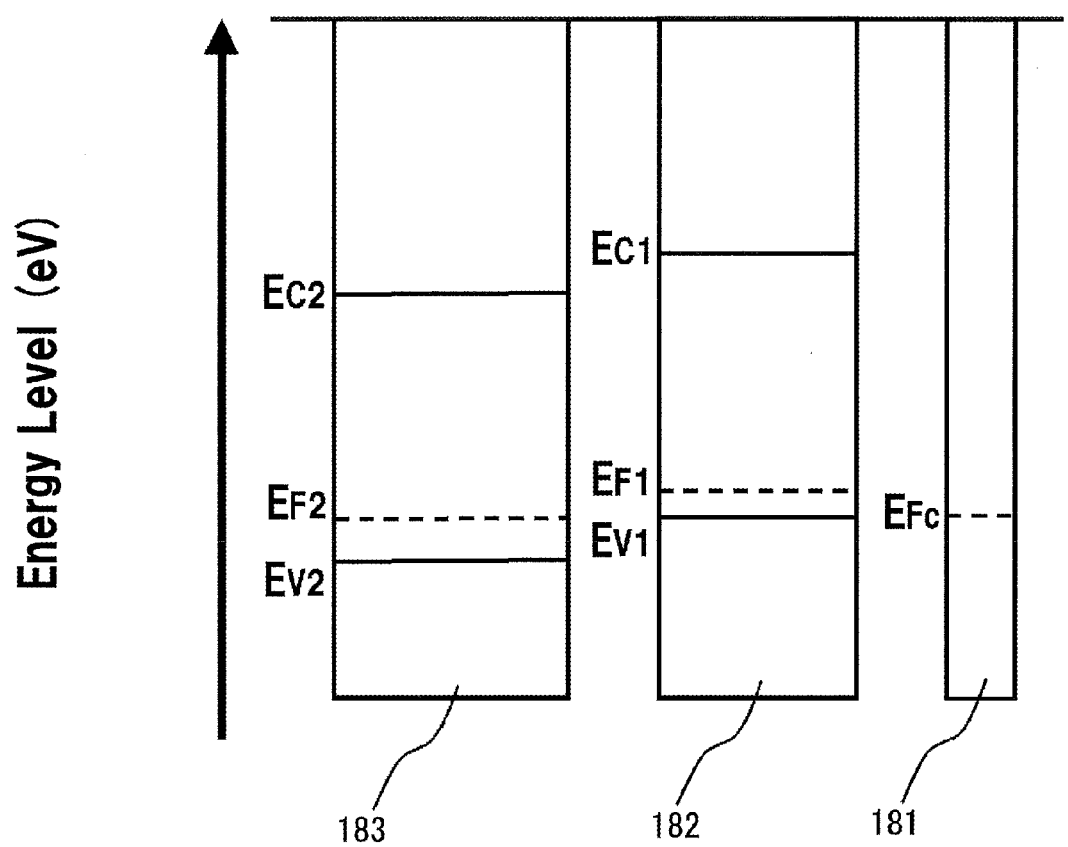
FIG. 27 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-1.
Figure 28:
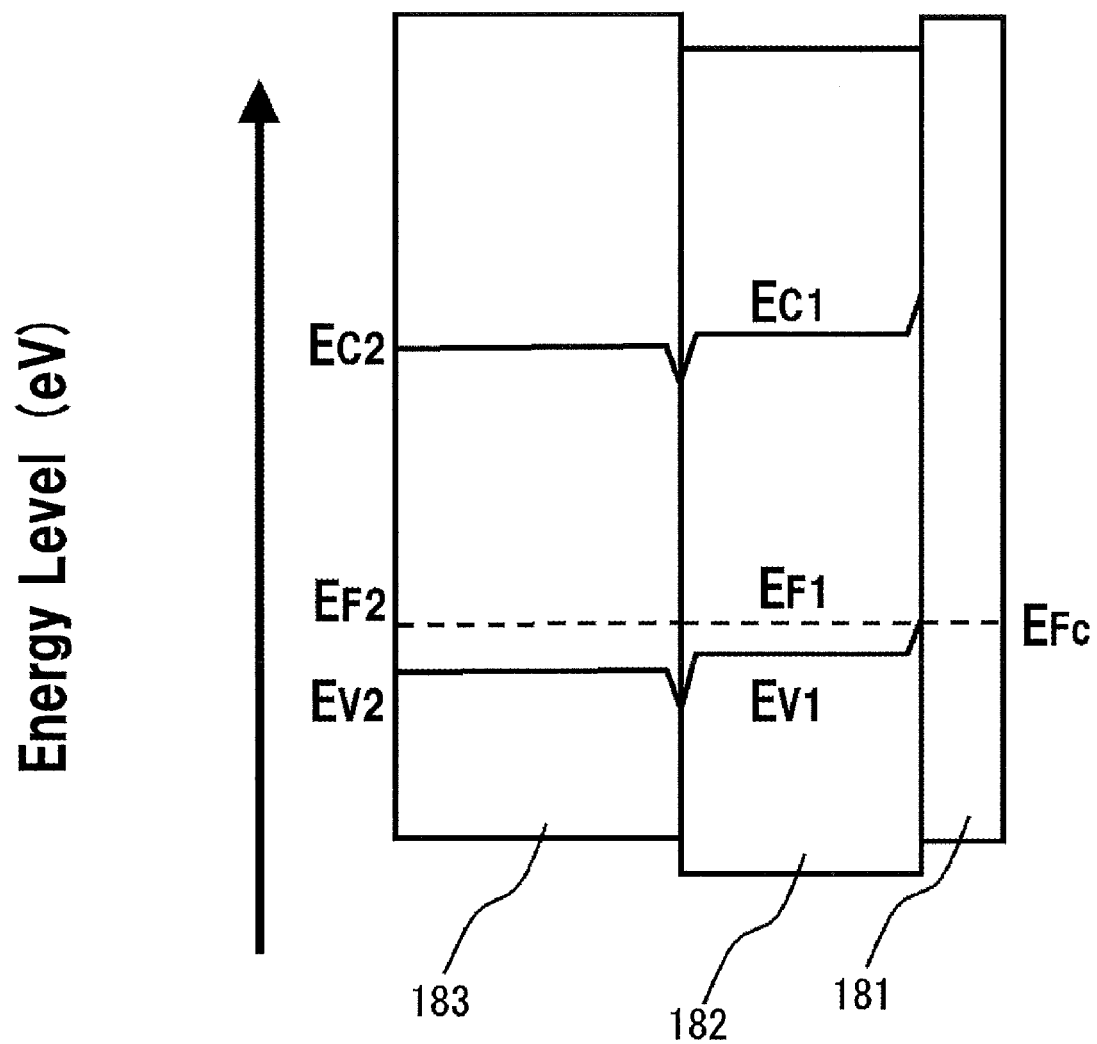
FIG. 28 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-1.

The photoelectrochemical cell according to Comparative Embodiment 4-1 is described, referring to FIGS. 27 and 28. FIG. 27 is a conceptual diagram indicating a band structure of a conductor, a first p-type semiconductor layer and a second p-type semiconductor layer, before being joined, in the present comparative embodiment. FIG. 28 is a conceptual diagram indicating a band structure of the conductor, the first p-type semiconductor layer and the second p-type semiconductor layer, after being joined, in the present comparative embodiment. In each of FIGS. 27 and 28, the vertical axis indicates energy levels relative to the vacuum level (unit: eV).

The semiconductor electrode of this comparative embodiment is constituted by a conductor 181, a first p-type semiconductor layer 182 and a second p-type semiconductor layer 183. The semiconductor electrode of this comparative embodiment is different from the semiconductor electrode 420 of Embodiment 4 in that the Fermi level $E_{F1}$ of the first p-type semiconductor layer 182 is higher than the Fermi level $E_{F2}$ of the second p-type semiconductor layer 183, relative to the vacuum level, as indicated in FIG. 27.

Next, when the conductor 181, the first p-type semiconductor layer 182 and the second p-type semiconductor layer 183 are joined to one another, carriers transfer between the first p-type semiconductor layer 182 and the second p-type semiconductor layer 183 so that the Fermi levels match each other, thereby causing bending of the band edge, at the junction plane therebetween, as indicated in FIG. 28. At this time, the band edge level $E_{C2}$ of the conduction band and the band edge level $E_{V2}$ of the valence band in the second p-type semiconductor layer 183, respectively, are lower than the band edge level $E_{C1}$ of the conduction band and the band edge level $E_{V1}$ of the valence band in the first p-type semiconductor layer 182, but the Fermi level $E_{F1}$ of the first p-type semiconductor layer 182 is higher than the Fermi level $E_{F2}$ of the second p-type semiconductor layer 183, relative to the vacuum level. Therefore, Schottky barriers occur at the junction plane between the first p-type semiconductor layer 182 and the second p-type semiconductor layer 183, which is different from the case of the semiconductor electrode 420 in Embodiment 4.

At the junction plane between the first p-type semiconductor layer 182 and the conductor 181, carriers transfer so that the Fermi levels match each other, thereby causing bending of the band edge around the junction plane of the first p-type semiconductor layer 182. At this time, since the Fermi level $E_{Fc}$ of the conductor 181 is lower than the Fermi level $E_{F1}$ of the first p-type semiconductor layer 182, relative to the vacuum level, the junction between the conductor 181 and the first p-type semiconductor layer 182 is formed by an ohmic contact, as is the case of the semiconductor electrode 420 in Embodiment 4.

In the case of the semiconductor electrode of this comparative embodiment, Schottky barriers occur at the junction plane between the first p-type semiconductor layer 182 and the second p-type semiconductor layer 183, which is different from the case of the semiconductor electrode 420 in Embodiment 4. The Schottky barrier prevents the transfer of the holes from the second p-type semiconductor layer 183 toward the first p-type semiconductor layer 182. Accordingly, in the photoelectrochemical cell of this comparative embodiment, the probability of the recombination between the electrons and holes generated by photoexcitation inside the second p-type semiconductor layer 183 is increased, compared to that in the photoelectrochemical cell 400 of Embodiment 4, and the quantum efficiency of the hydrogen evolution reaction by irradiation with light is decreased.

Comparative Embodiment 4-2

Figure 29:
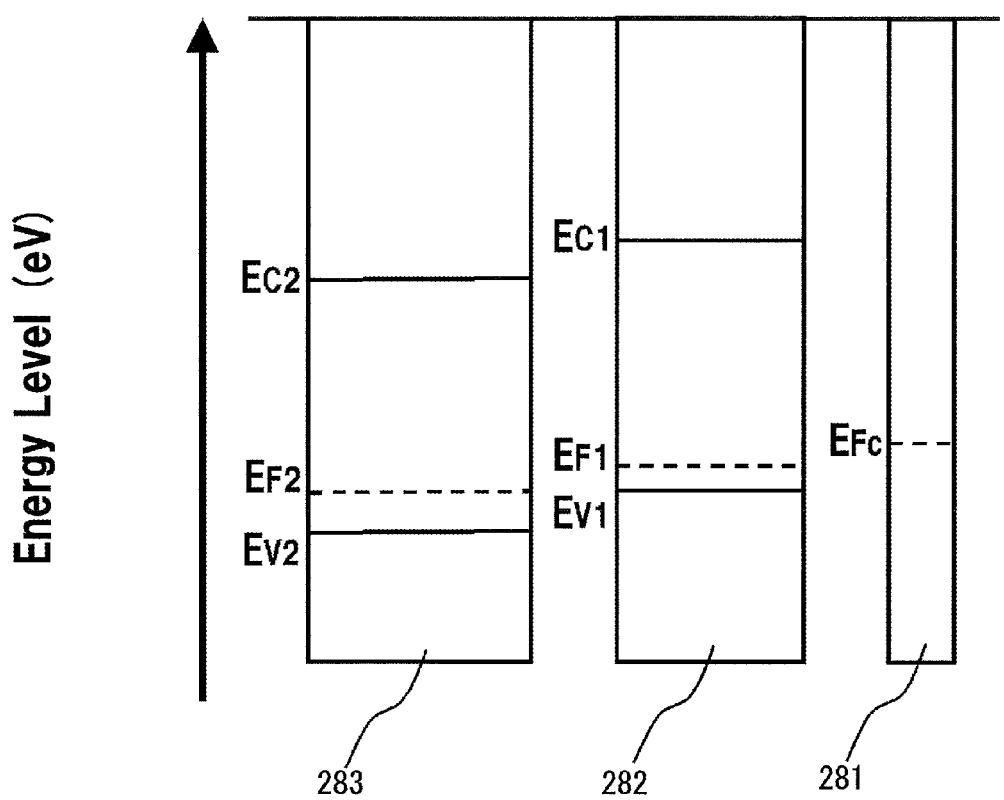
FIG. 29 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-2.
Figure 30:
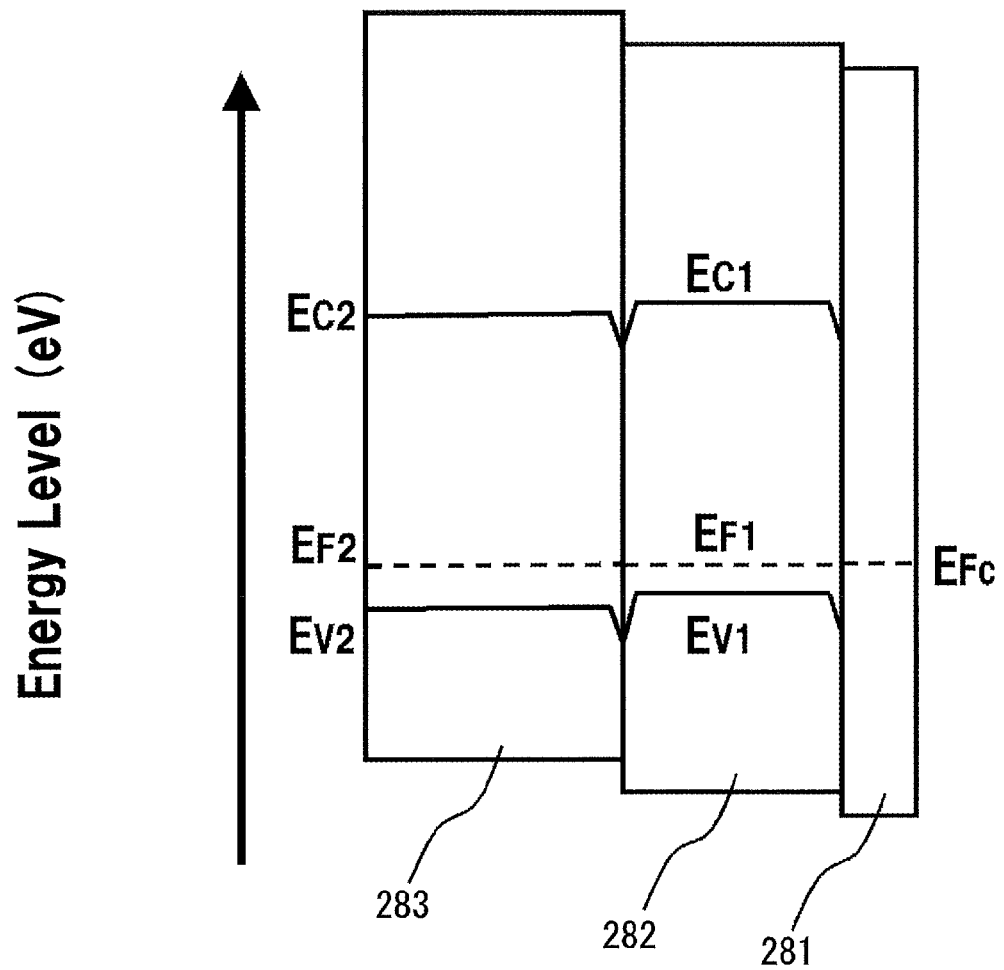
FIG. 30 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-2.

The photoelectrochemical cell according to Comparative Embodiment 4-2 is described, referring to FIGS. 29 and 30. FIG. 29 is a conceptual diagram indicating a band structure of a conductor, a first p-type semiconductor layer and a second p-type semiconductor layer, before being joined, in the present comparative embodiment. FIG. 30 is a conceptual diagram indicating a band structure of the conductor, the first p-type semiconductor layer and the second p-type semiconductor layer, after being joined, in the present comparative embodiment. In each of FIGS. 29 and 30, the vertical axis indicates energy levels relative to the vacuum level (unit: eV).

The semiconductor electrode of this comparative embodiment is constituted by a conductor 281, a first p-type semiconductor layer 282 and a second p-type semiconductor layer 283. The semiconductor electrode of this comparative embodiment is different from the semiconductor electrode 420 of Embodiment 4 in that the Fermi level $E_{F1}$ of the first p-type semiconductor layer 282 is higher than the Fermi level $E_{F2}$ of the second p-type semiconductor layer 283, and the Fermi level $E_{Fc}$ of the conductor 281 is higher than the Fermi level $E_{F1}$ of the first p-type semiconductor layer 282, relative to the vacuum level, as indicated in FIG. 29.

Next, when the conductor 281, the first p-type semiconductor layer 282 and the second p-type semiconductor layer 283 are joined to one another, carriers transfer between the first p-type semiconductor layer 282 and the second p-type semiconductor layer 283 so that the Fermi levels match each other, thereby causing bending of the band edge, at the junction plane therebetween, as indicated in FIG. 30. At this time, the band edge level $E_{C2}$ of the conduction band and the band edge level $E_{V2}$ of the valence band in the second p-type semiconductor layer 283, respectively, are lower than the band edge level $E_{C1}$ of the conduction band and the band edge level $E_{V1}$ of the valence band in the first p-type semiconductor layer 282, but the Fermi level $E_{F1}$ of the first p-type semiconductor layer 282 is higher than the Fermi level $E_{F2}$ of the second p-type semiconductor layer 283, relative to the vacuum level. Therefore, Schottky barriers occur at the junction plane between the first p-type semiconductor layer 282 and the second p-type semiconductor layer 283, which is different from the case of the semiconductor electrode 420 of Embodiment 4.

Further, also at the junction plane between the first p-type semiconductor layer 282 and the conductor 281, carriers transfer so that the Fermi levels match each other, thereby causing bending of the band edge around the junction plane of the first p-type semiconductor layer 282. At this time, since the Fermi level $E_{Fc}$ of the conductor 281 is higher than the Fermi level $E_{F1}$ of the first p-type semiconductor layer 282, relative to the vacuum level, the junction between the conductor 281 and the first p-type semiconductor layer 282 is formed by a Schottky contact.

In the case of the semiconductor electrode of this comparative embodiment, Schottky barriers occur at the junction plane between the first p-type semiconductor layer 282 and the second p-type semiconductor layer 283, which is different from the case of the semiconductor electrode 420 in Embodiment 4. The Schottky barrier prevents the transfer of the holes from the second p-type semiconductor layer 283 toward the first p-type semiconductor layer 282. Furthermore, in this comparative embodiment, Schottky barriers occur also at the junction plane between the conductor 281 and the first p-type semiconductor layer 282. The Schottky barrier prevents the transfer of the holes from the first p-type semiconductor layer 282 toward the conductor 281. Accordingly, in the photoelectrochemical cell of this comparative embodiment, the probability of the recombination between the electrons and holes generated by photoexcitation inside the second p-type semiconductor layer 283 is increased, compared to that in the photoelectrochemical cell 400 of Embodiment 4, and the quantum efficiency of the hydrogen evolution reaction by irradiation with light is decreased.

Comparative Embodiment 4-3

Figure 31:
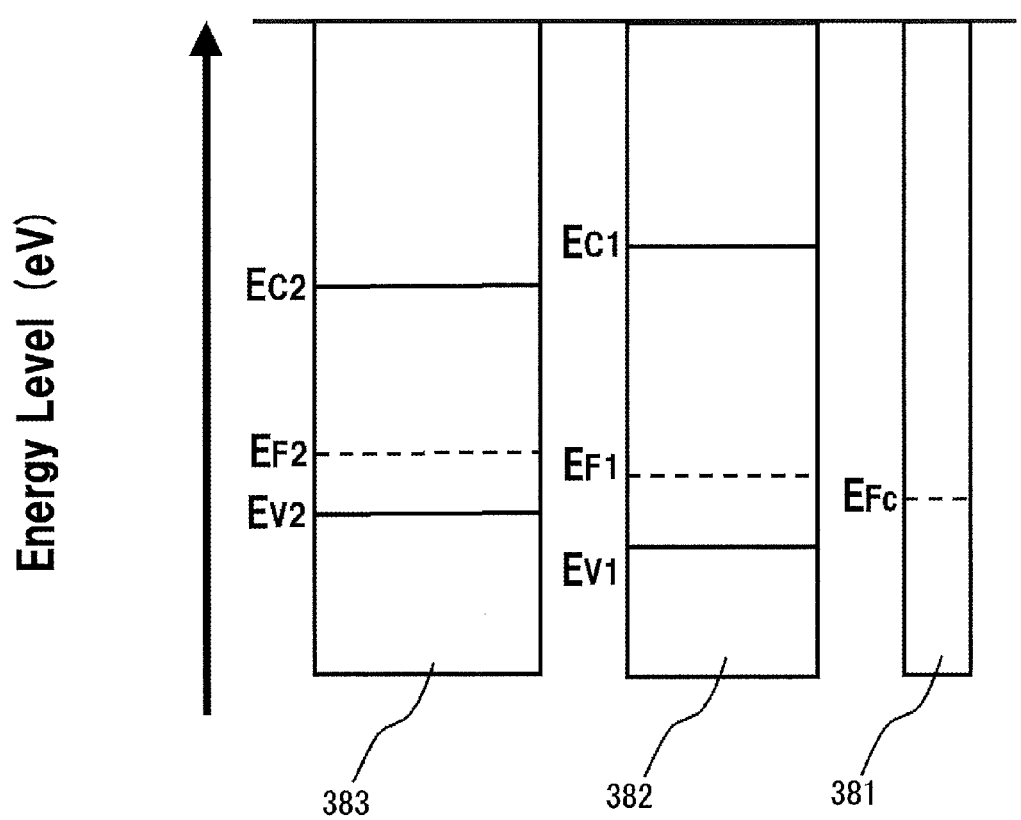
FIG. 31 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-3.
Figure 32:
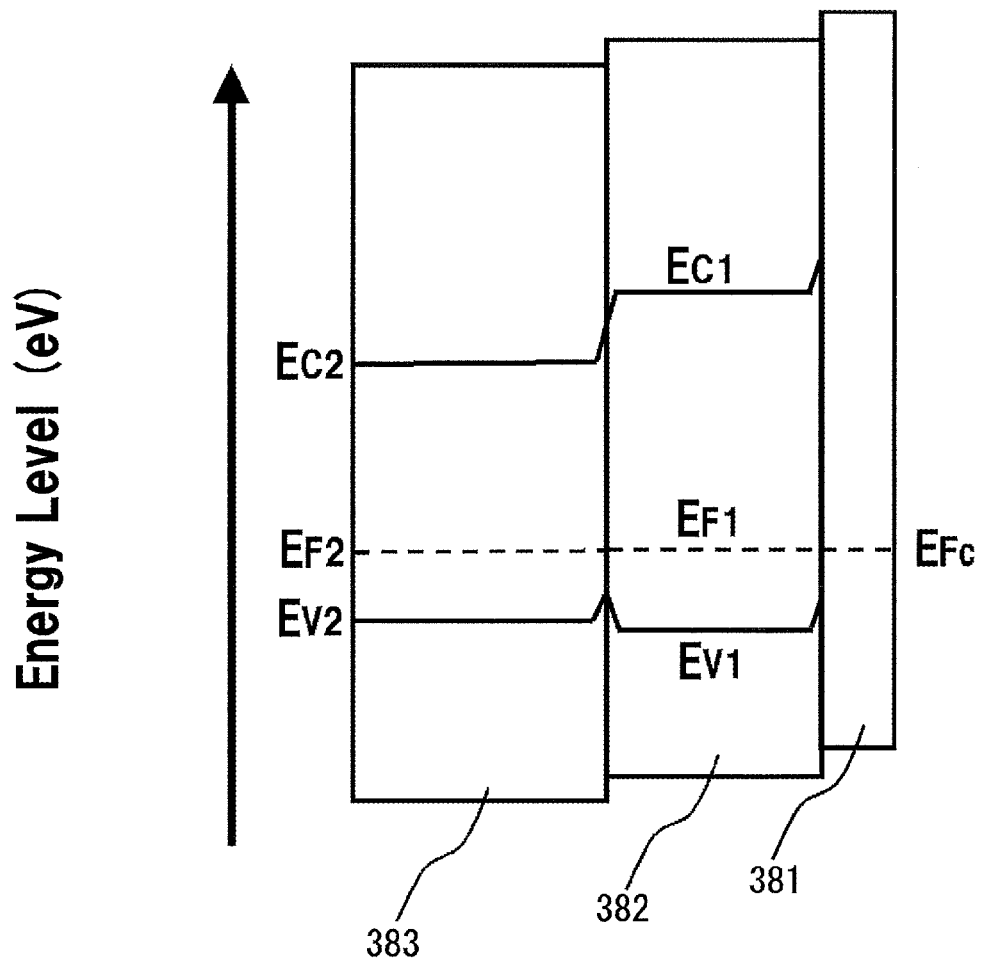
FIG. 32 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-3.

The photoelectrochemical cell according to Comparative Embodiment 4-3 is described, referring to FIGS. 31 and 32. FIG. 31 is a conceptual diagram indicating a band structure of a conductor, a first p-type semiconductor layer and a second p-type semiconductor layer, before being joined, in the present comparative embodiment. FIG. 32 is a conceptual diagram indicating a band structure of the conductor, the first p-type semiconductor layer and the second p-type semiconductor layer, after being joined, in the present comparative embodiment. In each of FIGS. 31 and 32, the vertical axis indicates energy levels relative to the vacuum level (unit: eV).

The semiconductor electrode of this comparative embodiment is constituted by a conductor 381, a first p-type semiconductor layer 382 and a second p-type semiconductor layer 383. The semiconductor electrode of this comparative embodiment is different from the semiconductor electrode 420 of Embodiment 4 in that the band edge level $E_{V2}$ of the valence band in the second p-type semiconductor layer 383 is higher than the band edge level $E_{V1}$ of the valence band in the first p-type semiconductor layer 382, relative to the vacuum level, as indicated in FIG. 31.

Next, when the conductor 381, the first p-type semiconductor layer 382 and the second p-type semiconductor layer 383 are joined to one another, carriers transfer between the first p-type semiconductor layer 382 and the second p-type semiconductor layer 383 so that the Fermi levels match each other, thereby causing bending of the band edge, at the junction plane therebetween, as indicated in FIG. 32. At this time, the band edge level $E_{V2}$ of the valence band in the second p-type semiconductor layer 383 is higher than the band edge level $E_{V1}$ of the valence band in the first p-type semiconductor layer 382, and the Fermi level $E_{F1}$ of the first p-type semiconductor layer 382 is lower than the Fermi level $E_{F2}$ of the second p-type semiconductor layer 383, relative to the vacuum level. Therefore, the band edge of the valence band increases from the side of the second p-type semiconductor layer 383 toward the junction plane with the first p-type semiconductor layer 382, but decreases from the junction plane toward the side of the first p-type semiconductor layer 382.

Further, also at the junction plane between the first p-type semiconductor layer 382 and the conductor 381, carriers transfer so that the Fermi levels match each other, thereby causing bending of the band edge around the junction plane of the first p-type semiconductor layer 382. At this time, since the Fermi level $E_{Fc}$ of the conductor 381 is lower than the Fermi level $E_{F1}$ of the first p-type semiconductor layer 382, relative to the vacuum level, the junction between the conductor 381 and the first p-type semiconductor layer 382 is formed by an ohmic contact, as is the case of the semiconductor electrode 420 in Embodiment 4.

In the case of the semiconductor electrode of this comparative embodiment, the band edge of the valence band decreases from the junction plane between the first p-type semiconductor layer 382 and the second p-type semiconductor layer 383 toward the side of the first p-type semiconductor layer 382, which is different from the case of the semiconductor electrode 420 in Embodiment 4. Therefore, the transfer of the holes from the second p-type semiconductor layer 383 toward the first p-type semiconductor layer 382 is prevented. Accordingly, in the photoelectrochemical cell of this comparative embodiment, the probability of the recombination between the electrons and holes generated by photoexcitation inside the second p-type semiconductor layer 383 is increased, compared to that in the photoelectrochemical cell 400 of Embodiment 4, and the quantum efficiency of the hydrogen evolution reaction by irradiation with light is decreased.

Comparative Embodiment 4-4

Figure 33:
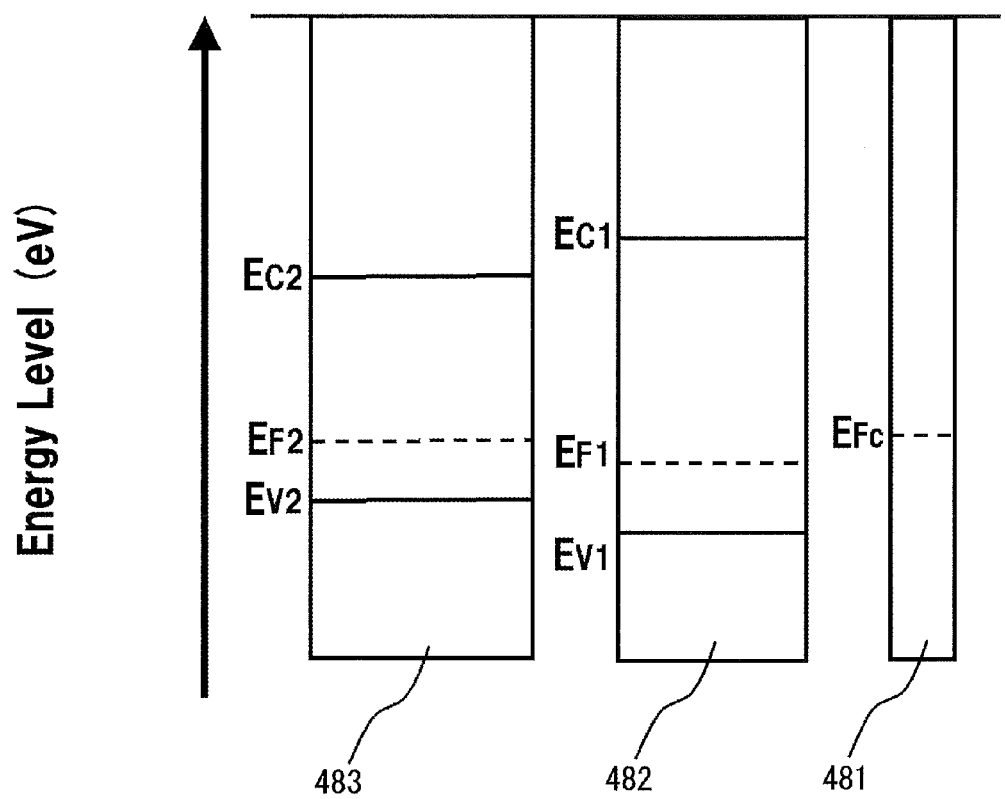
FIG. 33 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-4.
Figure 34:
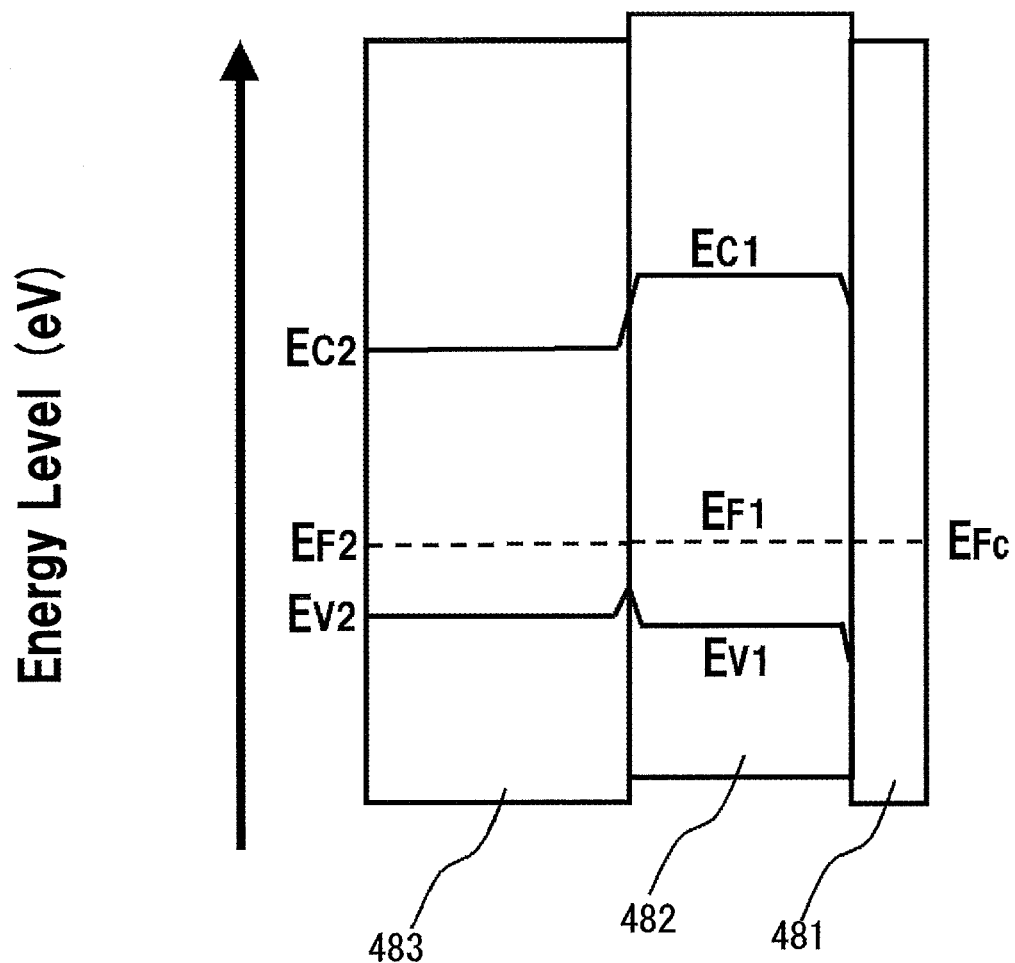
FIG. 34 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-4.

The photoelectrochemical cell according to Comparative Embodiment 4-4 is described, referring to FIGS. 33 and 34. FIG. 33 is a conceptual diagram indicating a band structure of a conductor, a first p-type semiconductor layer and a second p-type semiconductor layer, before being joined, in the present comparative embodiment. FIG. 34 is a conceptual diagram indicating a band structure of the conductor, the first p-type semiconductor layer and the second p-type semiconductor layer, after being joined, in the present comparative embodiment. In each of FIGS. 33 and 34, the vertical axis indicates energy levels relative to the vacuum level (unit: eV).

The semiconductor electrode of this comparative embodiment is constituted by a conductor 481, a first p-type semiconductor layer 482 and a second p-type semiconductor layer 483. The semiconductor electrode of this comparative embodiment is different from the semiconductor electrode 420 of Embodiment 4 in that the band edge level $E_{V2}$ of the valence band in the second p-type semiconductor layer 483 is higher than the band edge level $E_{V1}$ of the valence band in the first p-type semiconductor layer 482, and the Fermi level $E_{Fc}$ of the conductor 481 is higher than the Fermi level $E_{F1}$ of the first p-type semiconductor layer 482, relative to the vacuum level, as indicated in FIG. 33.

Next, when the conductor 481, the first p-type semiconductor layer 482 and the second p-type semiconductor layer 483 are joined to one another, carriers transfer between the first p-type semiconductor layer 482 and the second p-type semiconductor layer 483 so that the Fermi levels match each other, thereby causing bending of the band edge, at the junction plane therebetween, as indicated in FIG. 34. At this time, the band edge level $E_{V2}$ of the valence band in the second p-type semiconductor layer 483 is higher than the band edge level $E_{V1}$ of the valence band in the first p-type semiconductor layer 482, and the Fermi level $E_{F1}$ of the first p-type semiconductor layer 482 is lower than the Fermi level $E_{F2}$ of the second p-type semiconductor layer 483, relative to the vacuum level. Therefore, the band edge of the valence band increases from the side of the second p-type semiconductor layer 483 toward the junction plane with the first p-type semiconductor layer 482, but decreases from the junction plane toward the side of the first p-type semiconductor layer 482.

Further, also at the junction plane between the first p-type semiconductor layer 482 and the conductor 481, carriers transfer so that the Fermi levels match each other, thereby causing bending of the band edge around the junction plane of the first p-type semiconductor layer 482. At this time, since the Fermi level $E_{Fc}$ of the conductor 481 is higher than the Fermi level $E_{F1}$ of the first p-type semiconductor layer 482, relative to the vacuum level, the junction between the conductor 481 and the first p-type semiconductor layer 482 is formed by a Schottky contact.

In the case of the semiconductor electrode of this comparative embodiment, the band edge of the valence band decreases from the junction plane between the first p-type semiconductor layer 482 and the second p-type semiconductor layer 483 toward the side of the first p-type semiconductor layer 482, which is different from the case of the semiconductor electrode 420 in Embodiment 4. Therefore, the transfer of the holes from the second p-type semiconductor layer 483 toward the first p-type semiconductor layer 482 is prevented. Furthermore, in this comparative embodiment, Schottky barriers occur at the junction plane between the conductor 481 and the first p-type semiconductor layer 482. The Schottky barrier prevents the transfer of the holes from the first p-type semiconductor layer 482 toward the conductor 481. Accordingly, in the photoelectrochemical cell of this comparative embodiment, the probability of the recombination between the electrons and holes generated by photoexcitation inside the second p-type semiconductor layer is increased, compared to that in the photoelectrochemical cell 400 of Embodiment 4, and the quantum efficiency of the hydrogen evolution reaction by irradiation with light is decreased.

Comparative Embodiment 4-5

Figure 35:
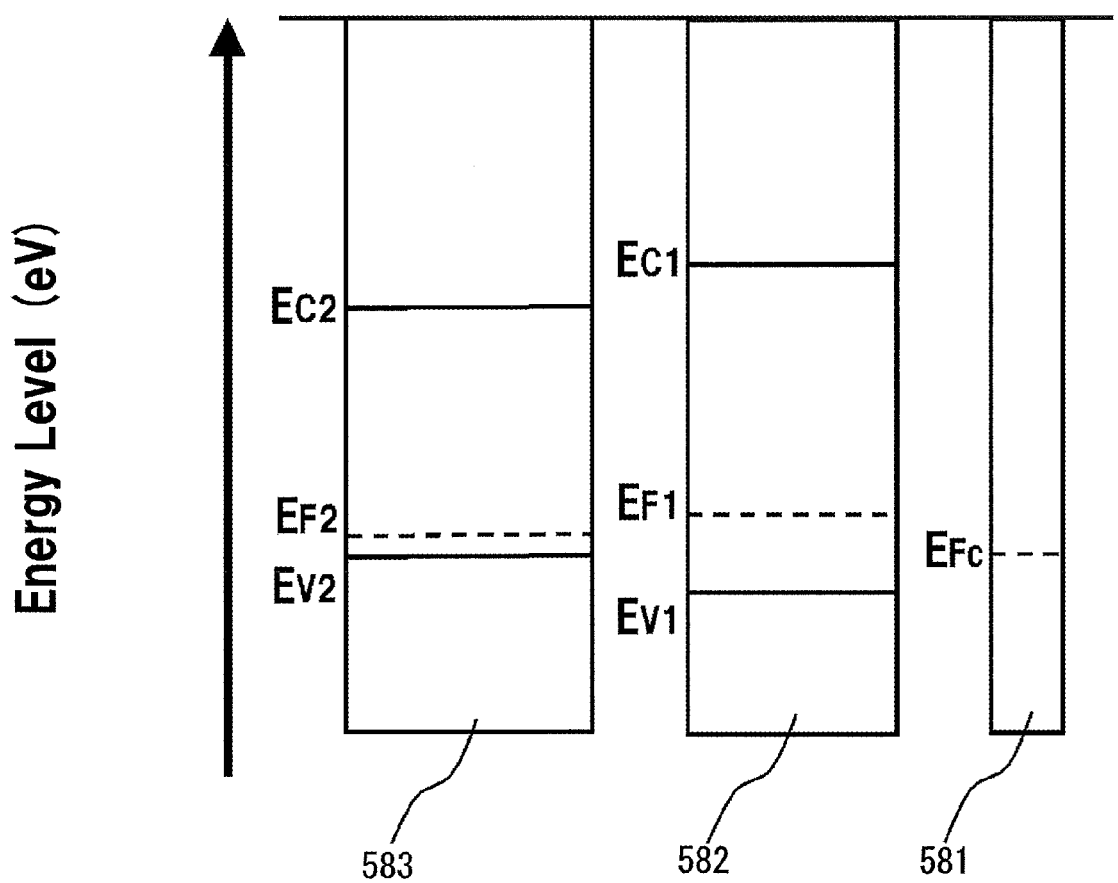
FIG. 35 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-5.
Figure 36:
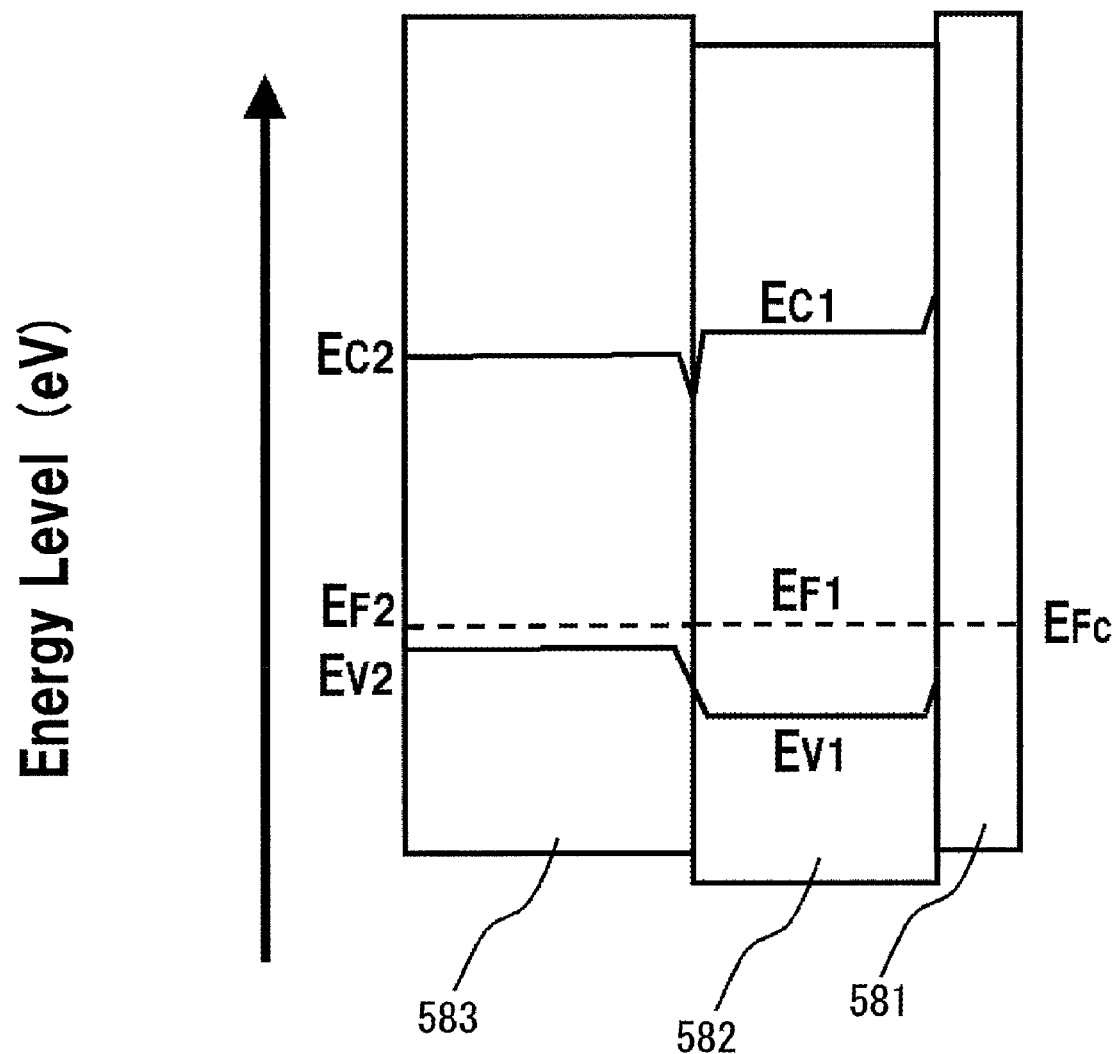
FIG. 36 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-5.

The photoelectrochemical cell according to Comparative Embodiment 4-5 is described, referring to FIGS. 35 and 36. FIG. 35 is a conceptual diagram indicating a band structure of a conductor, a first p-type semiconductor layer and a second p-type semiconductor layer, before being joined, in the present comparative embodiment. FIG. 36 is a conceptual diagram indicating a band structure of the conductor, the first p-type semiconductor layer and the second p-type semiconductor layer, after being joined, in the present comparative embodiment. In each of FIGS. 35 and 36, the vertical axis indicates energy levels relative to the vacuum level (unit: eV).

The semiconductor electrode of this comparative embodiment is constituted by a conductor 581, a first p-type semiconductor layer 582 and a second p-type semiconductor layer 583. The semiconductor electrode of this comparative embodiment is different from the semiconductor electrode 420 of Embodiment 4 in that the band edge level $E_{V2}$ of the valence band in the second p-type semiconductor layer 583 is higher than the band edge level $E_{V1}$ of the valence band in the first p-type semiconductor layer 582, and the Fermi level $E_{F1}$ of the first p-type semiconductor layer 582 is higher than the Fermi level $E_{F2}$ of the second p-type semiconductor layer 583, relative to the vacuum level, as indicated in FIG. 35.

Next, when the conductor 581, the first p-type semiconductor layer 582 and the second p-type semiconductor layer 583 are joined to one another, carriers transfer between the first p-type semiconductor layer 582 and the second p-type semiconductor layer 583 so that the Fermi levels match each other, thereby causing bending of the band edge, at the junction plane therebetween, as indicated in FIG. 36. At this time, the band edge level $E_{V2}$ of the valence band in the second p-type semiconductor layer 583 is higher than the band edge level $E_{V1}$ of the valence band in the first p-type semiconductor layer 582, and the Fermi level $E_{F1}$ of the first p-type semiconductor layer 582 is higher than the Fermi level $E_{F2}$ of the second p-type semiconductor layer 583, relative to the vacuum level. Therefore, no Schottky barriers occur at the junction plane between the first p-type semiconductor layer 582 and the second p-type semiconductor layer 583 in the band edge of the valence band, as is the case of the semiconductor electrode 420 in Embodiment 4. However, the band edge level $E_{V1}$ of the valence band in the first p-type semiconductor layer 582 is lower than the band edge level $E_{V2}$ of the valence band in the second p-type semiconductor layer 583, as indicated in FIG. 36.

Further, also at the junction plane between the first p-type semiconductor layer 582 and the conductor 581, carriers transfer so that the Fermi levels match each other, thereby causing bending of the band edge around the junction plane of the first p-type semiconductor layer 582. At this time, since the Fermi level $E_{Fc}$ of the conductor 581 is lower than the Fermi level $E_{F1}$ of the first p-type semiconductor layer 582, relative to the vacuum level, the junction between the conductor 581 and the first p-type semiconductor layer 582 is formed by an ohmic contact, as is the case of the semiconductor electrode 420 in Embodiment 4.

In the case of the semiconductor electrode of this comparative embodiment, the band edge level $E_{V1}$ of the valence band in the first p-type semiconductor layer 582 is lower than the band edge level $E_{V2}$ of the valence band in the second p-type semiconductor layer 583, which is different from the case of the semiconductor electrode 420 in Embodiment 4. Therefore, the transfer of the holes from the second p-type semiconductor layer 583 to the first p-type semiconductor layer 582 is prevented. Accordingly, in the photoelectrochemical cell of this comparative embodiment, the probability of the recombination between the electrons and holes generated by photoexcitation inside the second p-type semiconductor layer 583 is increased, compared to that in the photoelectrochemical cell 400 of Embodiment 4, and the quantum efficiency of the hydrogen evolution reaction by irradiation with light is decreased.

Comparative Embodiment 4-6

Figure 37:
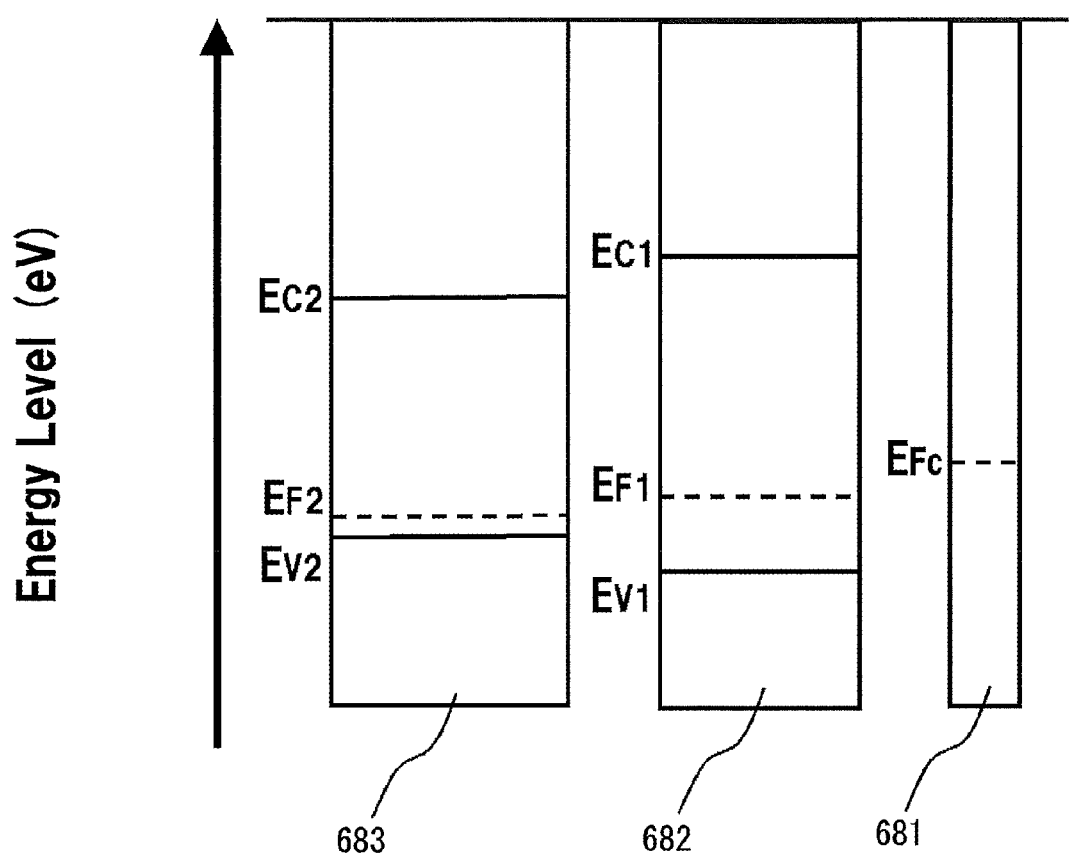
FIG. 37 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-6.
Figure 38:
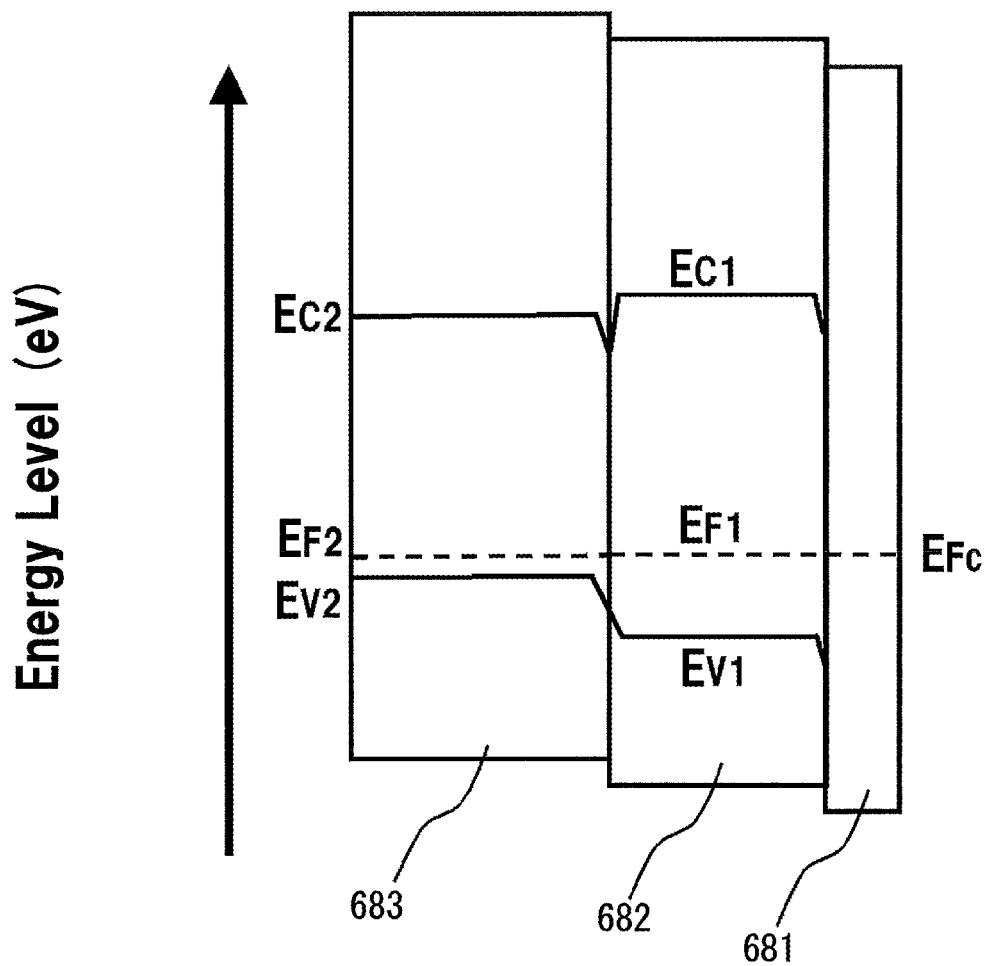
FIG. 38 is a conceptual diagram indicating a band structure of the conductor, a first p-type semiconductor layer and the second p-type semiconductor layer, after being joined, which constitute the semiconductor electrode in the photoelectrochemical cell of Comparative Embodiment 4-6.

The photoelectrochemical cell according to Comparative Embodiment 4-6 is described, referring to FIGS. 37 and 38. FIG. 37 is a conceptual diagram indicating a band structure of a conductor, a first p-type semiconductor layer and a second p-type semiconductor layer, before being joined, in the present comparative embodiment. FIG. 38 is a conceptual diagram indicating a band structure of the conductor, the first p-type semiconductor layer and the second p-type semiconductor layer, after being joined, in the present comparative embodiment. In each of FIGS. 37 and 38, the vertical axis indicates energy levels relative to the vacuum level (unit: eV).

The semiconductor electrode of this comparative embodiment is constituted by a conductor 681, a first p-type semiconductor layer 682 and a second p-type semiconductor layer 683. The semiconductor electrode of this comparative embodiment is different from the semiconductor electrode 420 of Embodiment 4 in that the band edge level $E_{V2}$ of the valence band in the second p-type semiconductor layer 683 is higher than the band edge level $E_{V1}$ of the valence band in the first p-type semiconductor layer 682, the Fermi level $E_{F1}$ of the first p-type semiconductor layer 682 is higher than the Fermi level $E_{F2}$ of the second p-type semiconductor layer 683, and the Fermi level $E_{Fc}$ of the conductor 681 is higher than the Fermi level $E_{F1}$ of the first p-type semiconductor layer 682, relative to the vacuum level, as indicated in FIG. 37.

Next, when the conductor 681, the first p-type semiconductor layer 682 and the second p-type semiconductor layer 683 are joined to one another, carriers transfer between the first p-type semiconductor layer 682 and the second p-type semiconductor layer 683 so that the Fermi levels match each other, thereby causing bending of the band edge, at the junction plane therebetween, as indicated in FIG. 38. At this time, the band edge level $E_{V2}$ of the valence band in the second p-type semiconductor layer 683 is higher than the band edge level $E_{V1}$ of the valence band in the first p-type semiconductor layer 682, and the Fermi level $E_{F1}$ of the first p-type semiconductor layer 682 is higher than the Fermi level $E_{F2}$ of the second p-type semiconductor layer 683, relative to the vacuum level. Therefore, no Schottky barriers occur at the junction plane between the first p-type semiconductor layer 682 and the second p-type semiconductor layer 683 in the band edge of the valence band, as is the case of the semiconductor electrode 420 in Embodiment 4. However, the band edge level $E_{V1}$ of the valence band in the first p-type semiconductor layer 682 is lower than the band edge level $E_{V2}$ of the valence band in the second p-type semiconductor layer 683, as indicated in FIG. 38.

At the junction plane between the first p-type semiconductor layer 682 and the conductor 681, carriers transfer so that the Fermi levels match each other, thereby causing bending of the band edge around the junction plane of the first p-type semiconductor layer 682. At this time, since the Fermi level $E_{Fc}$ of the conductor 681 is higher than the Fermi level $E_{F1}$ of the first p-type semiconductor layer 682, relative to the vacuum level, the junction between the conductor 681 and the first p-type semiconductor layer 682 is formed by a Schottky contact.

In the case of the semiconductor electrode of this comparative embodiment, the band edge level $E_{V1}$ of the valence band in the first p-type semiconductor layer 682 is lower than the band edge level $E_{V2}$ of the valence band in the second p-type semiconductor layer 683, which is different from the case of the semiconductor electrode 420 in Embodiment 4. Therefore, the transfer of the holes from the second p-type semiconductor layer 683 to the first p-type semiconductor layer 682 is prevented. Furthermore, in this comparative embodiment, Schottky barriers occur at the junction plane between the conductor 681 and the first p-type semiconductor layer 682. The Schottky barrier prevents the transfer of the holes from the first p-type semiconductor layer 682 to the conductor 681. Accordingly, in the photoelectrochemical cell of this comparative embodiment, the probability of the recombination between the electrons and holes generated by photoexcitation inside the second p-type semiconductor layer 683 is increased, compared to that in the photoelectrochemical cell 400 of Embodiment 4, and the quantum efficiency of the hydrogen evolution reaction by irradiation with light is decreased.

Comparative Embodiment 4-7

Figure 39:
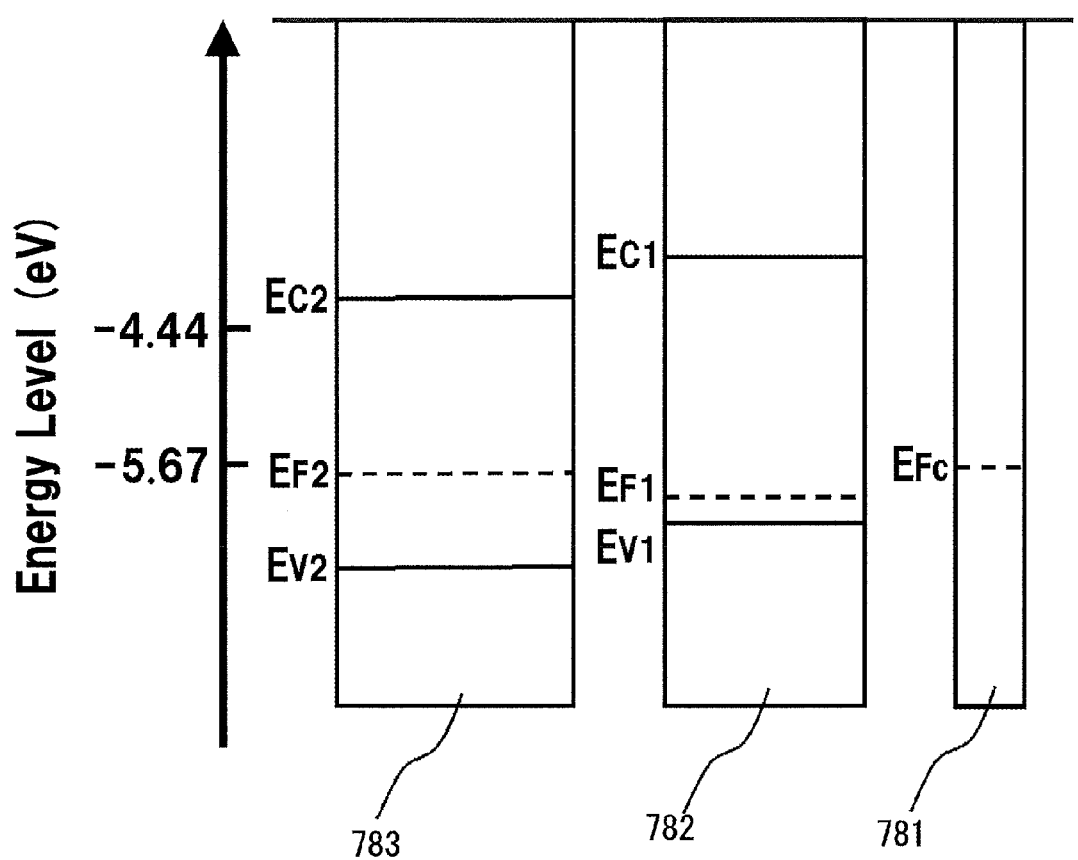
FIG. 39 is a conceptual diagram indicating a band structure of a conductor, a first p-type semiconductor layer and a second p-type semiconductor layer, before being joined, which constitute a semiconductor electrode in the photoelectrochemical cell of Comparative Embodiment 4-7.
Figure 40:
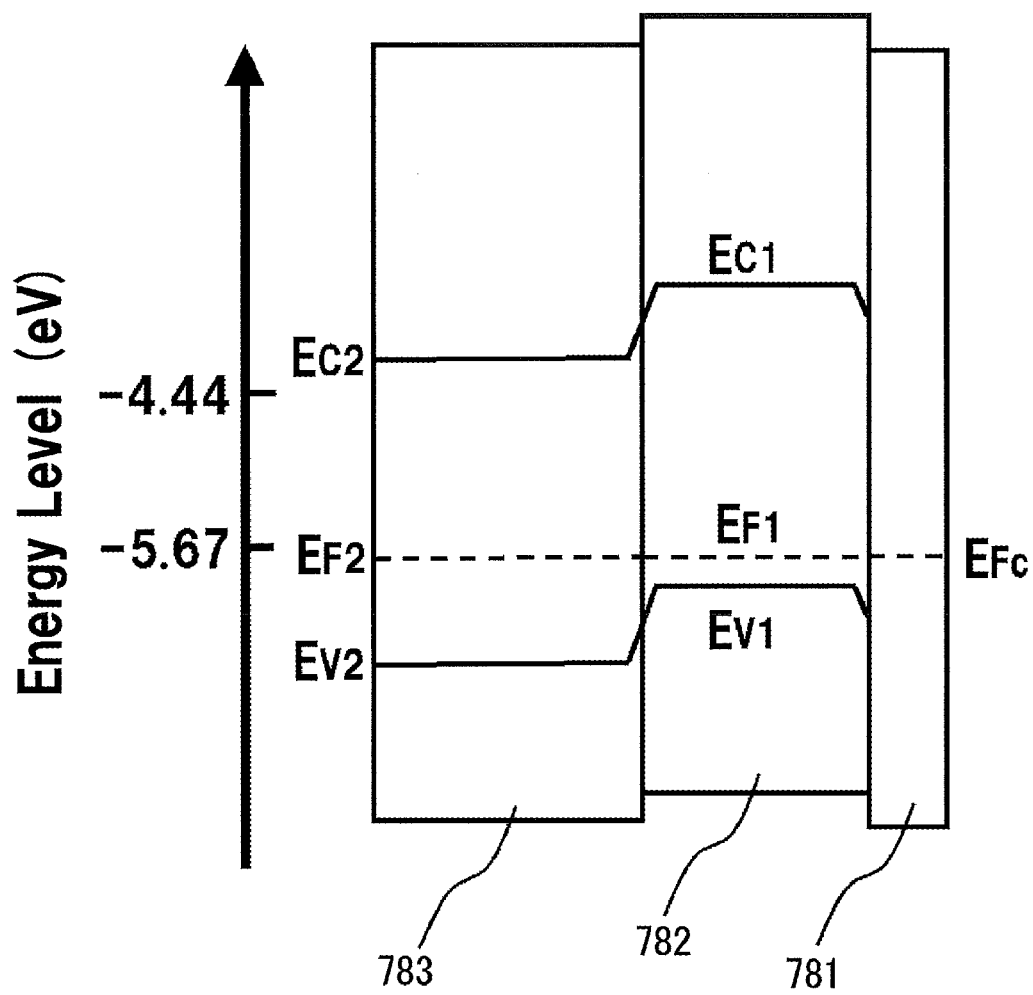
FIG. 40 is a conceptual diagram indicating a band structure of the conductor, the first p-type semiconductor layer and the second p-type semiconductor layer, after being joined, which constitute the semiconductor electrode in the photoelectrochemical cell of Comparative Embodiment 4-7.

The photoelectrochemical cell according to Comparative Embodiment 4-7 is described, referring to FIGS. 39 and 40. FIG. 39 is a conceptual diagram indicating a band structure of a conductor, a first p-type semiconductor layer and a second p-type semiconductor layer, before being joined, in the present comparative embodiment. FIG. 40 is a conceptual diagram indicating a band structure of the conductor, the first p-type semiconductor layer and the second p-type semiconductor layer, after being joined, in the present comparative embodiment. In each of FIGS. 39 and 40, the vertical axis indicates energy levels relative to the vacuum level (unit: eV).

The semiconductor electrode of this comparative embodiment is constituted by a conductor 781, a first p-type semiconductor layer 782 and a second p-type semiconductor layer 783. The semiconductor electrode of this comparative embodiment is different from the semiconductor electrode 420 of Embodiment 4 in that the Fermi level $E_{Fc}$ of the conductor 781 is higher than the Fermi level $E_{F1}$ of the first p-type semiconductor layer 782, relative to the vacuum level, as indicated in FIG. 39.

Next, when the conductor 781, the first p-type semiconductor layer 782 and the second p-type semiconductor layer 783 are joined to one another, carriers transfer between the first p-type semiconductor layer 782 and the second p-type semiconductor layer 783 so that the Fermi levels match each other, thereby causing bending of the band edge, at the junction plane therebetween, as indicated in FIG. 40. At this time, the band edge level $E_{C2}$ of the conduction band and the band edge level $E_{V2}$ of the valence band in the second p-type semiconductor layer 783, respectively, are lower than the band edge level $E_{C1}$ of the conduction band and the band edge level $E_{V1}$ of the valence band in the first p-type semiconductor layer 782, and the Fermi level $E_{F1}$ of the first p-type semiconductor layer 782 is lower than the Fermi level $E_{F2}$ of the second p-type semiconductor layer 783, relative to the vacuum level. Therefore, no Schottky barriers occur at the junction plane between the first p-type semiconductor layer 782 and the second p-type semiconductor layer 783.

Further, also at the junction plane between the first p-type semiconductor layer 782 and the conductor 781, carriers transfer so that the Fermi levels match each other, thereby causing bending of the band edge around the junction plane of the first p-type semiconductor layer 782. At this time, since the Fermi level $E_{Fc}$ of the conductor 781 is higher than the Fermi level $E_{F1}$ of the first p-type semiconductor layer 782, relative to the vacuum level, the junction between the conductor 781 and the first p-type semiconductor layer 782 is formed by a Schottky contact.

In the case of the semiconductor electrode of this comparative embodiment, Schottky barriers occur at the junction plane between the conductor 781 and the first p-type semiconductor layer 782, which is different from the semiconductor electrode 420 in Embodiment 4. The Schottky barrier prevents the transfer of the holes from the first p-type semiconductor layer 782 to the conductor 781. Accordingly, in the photoelectrochemical cell of this comparative embodiment, the probability of the recombination between the electrons and holes generated by photoexcitation inside the second p-type semiconductor layer 783 is increased, compared to that in the photoelectrochemical cell 400 of Embodiment 4, and the quantum efficiency of the hydrogen evolution reaction by irradiation with light is decreased.

Embodiment 5

Figure 41:
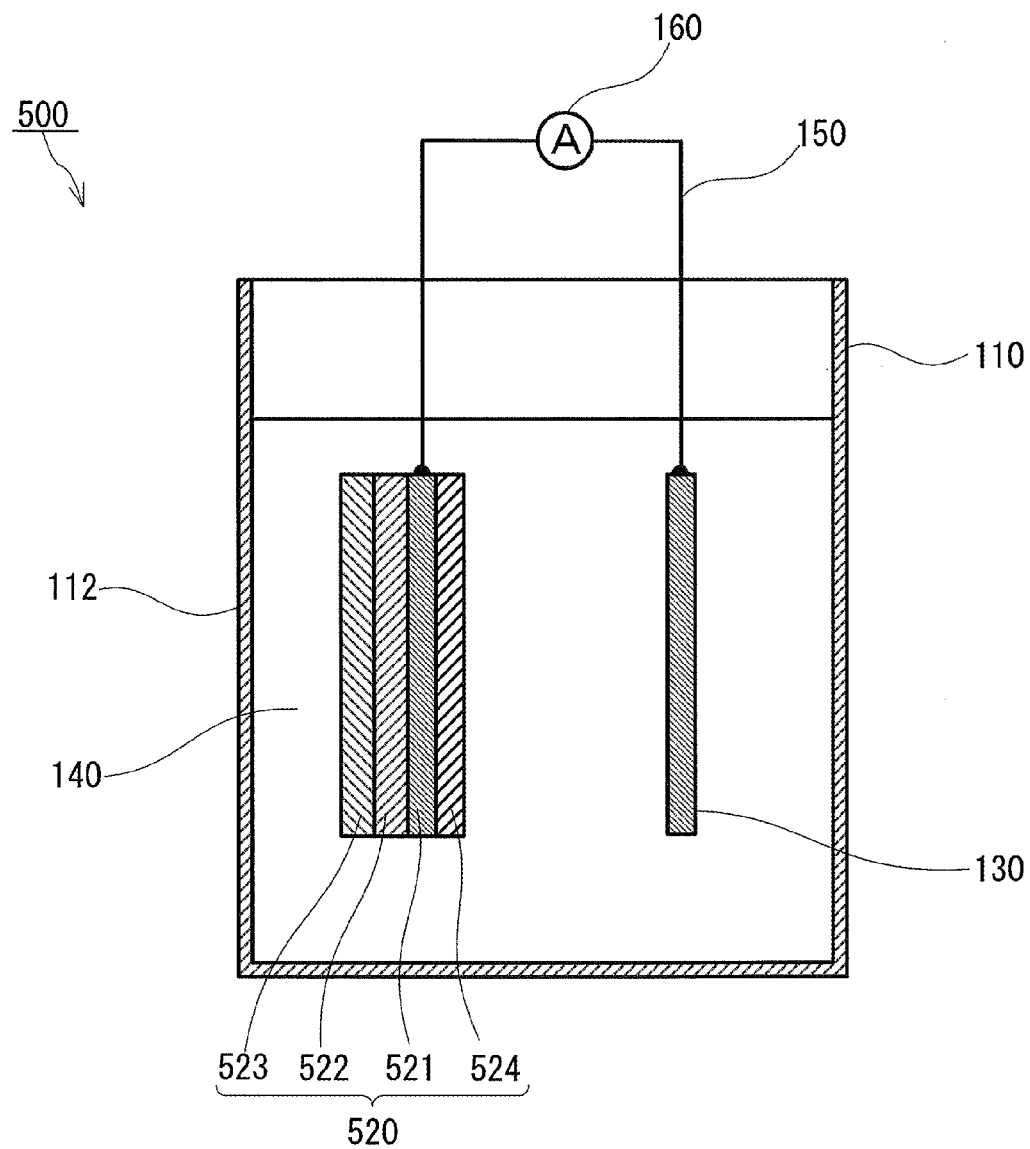
FIG. 41 is a schematic view illustrating a configuration of the photoelectrochemical cell of Embodiment 5 of the present invention.

The configuration of the photoelectrochemical cell according to Embodiment 5 of the present invention is described, referring to FIG. 41. FIG. 41 is a schematic view illustrating the configuration of the photoelectrochemical cell of the present embodiment.

In a photoelectrochemical cell 500 of the present embodiment, a semiconductor electrode 520 includes a conductor 521, a first n-type semiconductor layer 522 disposed on the conductor 521, and a second n-type semiconductor layer 523 disposed on the first n-type semiconductor layer 522. Furthermore, the semiconductor electrode 520 includes an insulation layer 524 disposed on the surface of the conductor 521 opposite to the surface on which the first n-type semiconductor layer 522 is disposed. The conductor 521, the first n-type semiconductor layer 522 and the second n-type semiconductor layer 523, respectively, have the same configuration as the conductor 221, the first n-type semiconductor layer 222 and the second n-type semiconductor layer 223 in Embodiment 2. The insulation layer 524 is formed, for example, of a resin or glass. This insulation layer 524 can prevent the conductor 521 from dissolving in the electrolyte 140. It should be noted that although the present embodiment has a configuration in which a semiconductor electrode that includes two n-type semiconductor layers as indicated in Embodiment 2 is provided with an insulation layer as mentioned above further thereon, such an insulation layer can be employed also for each semiconductor electrode of Embodiments 1, 3 and 4.

Embodiment 6

Figure 42:
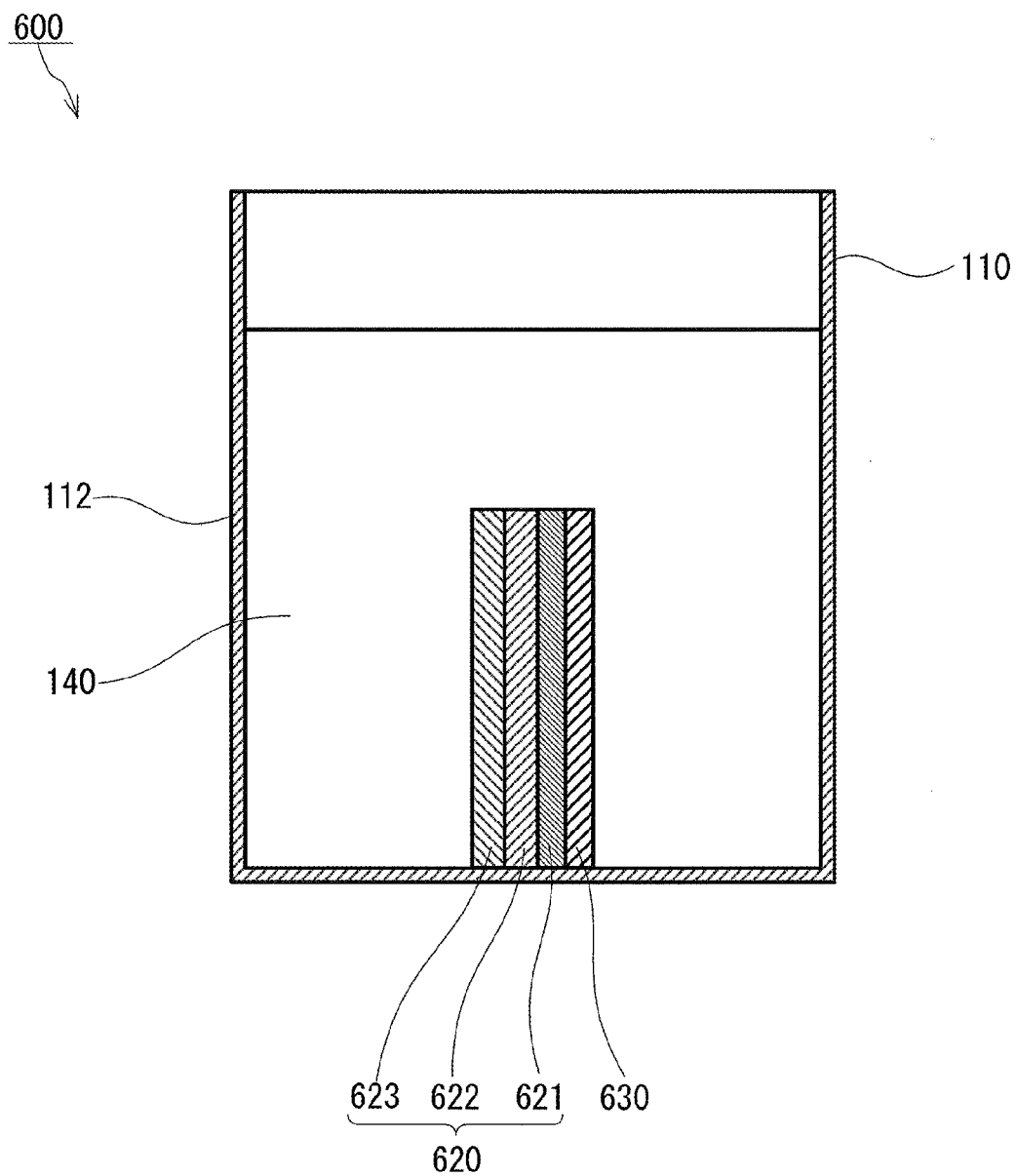
FIG. 42 is a schematic view illustrating a configuration of the photoelectrochemical cell of Embodiment 6 of the present invention.

The configuration of the photoelectrochemical cell according to Embodiment 6 of the present invention is described, referring to FIG. 42. FIG. 42 is a schematic view illustrating the configuration of the photoelectrochemical cell of the present embodiment.

In a photoelectrochemical cell 600 of the present embodiment, a semiconductor electrode 620 includes a conductor 621, a first n-type semiconductor layer 622 disposed on the conductor 621, and a second n-type semiconductor layer 623 disposed on the first n-type semiconductor layer 622. On the other hand, a counter electrode 630 is disposed on the conductor 621 (on the surface of the conductor 621 opposite to the surface on which the first n-type semiconductor layer 622 is disposed). The conductor 621, the first n-type semiconductor layer 622 and the second n-type semiconductor layer 623, respectively, have the same configuration as the conductor 221, the first n-type semiconductor layer 222 and the second n-type semiconductor layer 223 in Embodiment 2.

As is the case of the present embodiment, the configuration in which the counter electrode 630 is disposed on the conductor 621 can eliminate the need for a conducting wire for connecting the semiconductor electrode 620 electrically to the counter electrode 630. This can eliminate the ohmic loss derived from the conducting wire, therefore further improving the quantum efficiency of the hydrogen evolution reaction by irradiation with light. Further, with such a configuration, the semiconductor electrode 620 can be connected electrically to the counter electrode 630 by a simple and easy process. It should be noted that although the present embodiment has a configuration in which the counter electrode 630 is disposed on the surface of the conductor 621 opposite to the surface on which the first n-type semiconductor layer 622 is disposed, the counter electrode 630 can be disposed also on the same surface on which the first n-type semiconductor layer 622 is disposed. Further, although the above-mentioned configuration in which a counter electrode is disposed on a conductor in a photoelectrochemical cell provided with two n-type semiconductor layers as described in Embodiment 2 is employed in the present embodiment, such a configuration can be applied also in each photoelectrochemical cell as described in Embodiments 1, 3 and 4.

Embodiment 7

Figure 43:
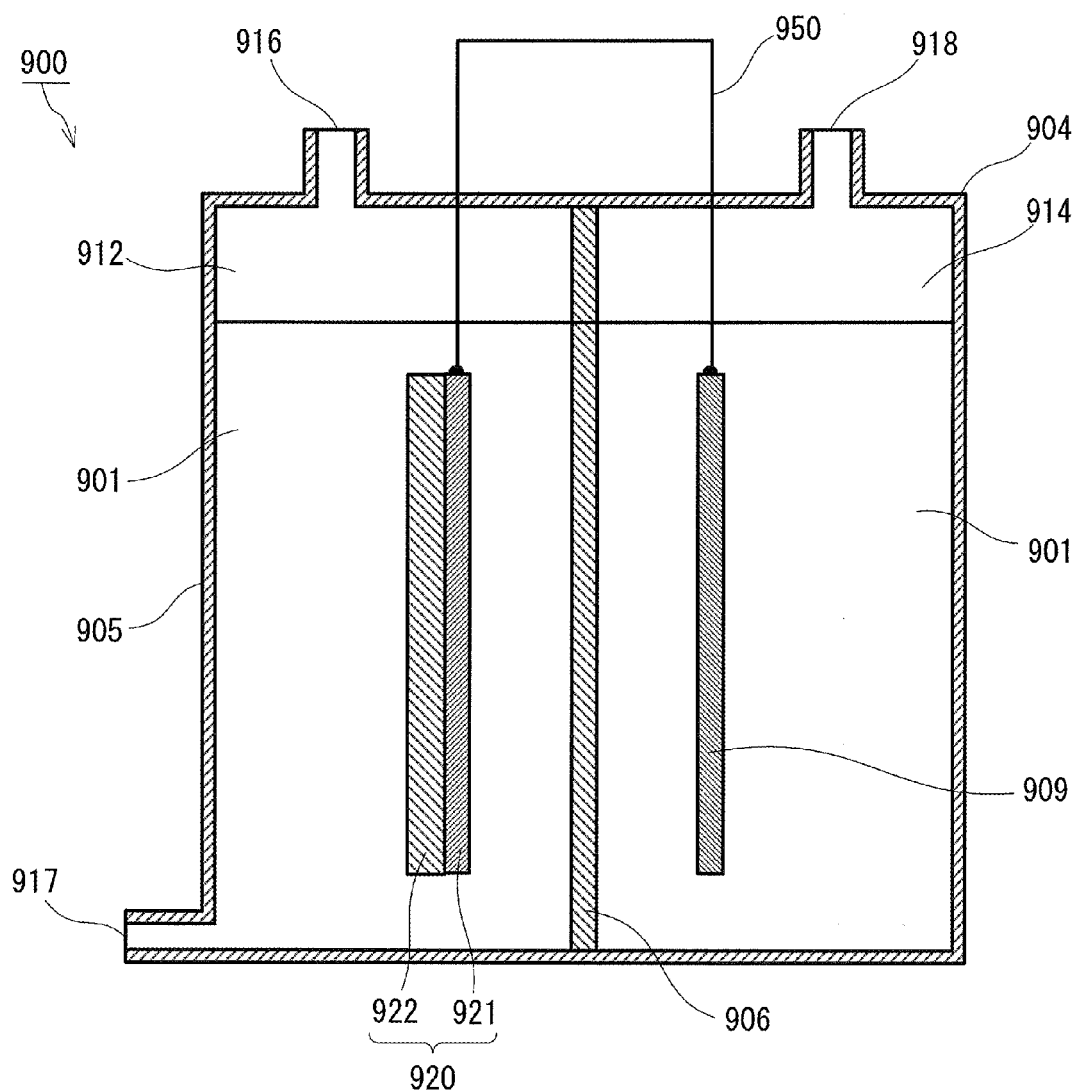
FIG. 43 is a schematic view illustrating a configuration of the photoelectrochemical cell of Embodiment 7 of the present invention.

The configuration of the photoelectrochemical cell according to Embodiment 7 of the present invention is described, referring to FIG. 43. FIG. 43 is a schematic view illustrating the configuration of the photoelectrochemical cell of the present embodiment.

As indicated in FIG. 43, a photoelectrochemical cell 900 of the present embodiment includes a housing (container) 904, a separator 906, a semiconductor electrode 920, and a counter electrode 909. The inside of the housing 904 is separated into two chambers of a first chamber 912 and a second chamber 914 by the separator 906. The first chamber 912 and the second chamber 914 each accommodates an electrolyte 901 containing water.

The semiconductor electrode 920 is disposed at a position in contact with the electrolyte 901 inside the first chamber 912. The semiconductor electrode 920 includes a conductor 921 and an n-type semiconductor layer 922 disposed on the conductor 921. Further, the first chamber 912 includes a first gas outlet 916 for discharging oxygen generated inside the first chamber 912 and a water supply opening 917 for supplying water into the first chamber 912. A portion of the housing 904 that faces the n-type semiconductor layer 922 of the semiconductor electrode 920 disposed inside the first chamber 912 (hereinafter, abbreviated as a light incident portion 905) is made of a material that transmits light such as sunlight.

On the other hand, the counter electrode 909 is disposed inside the second chamber 914 at a position in contact with the electrolyte 901. Further, the second chamber 914 includes a second gas outlet 918 for discharging hydrogen generated inside the second chamber 914.

The conductor 921 of the semiconductor electrode 920 is connected electrically to the counter electrode 909 by a conducting wire 950.

The n-type semiconductor layer 922 and the conductor 921 of the semiconductor electrode 920 in the present embodiment respectively have the same configurations as the n-type semiconductor layer 122 and the conductor 121 of the semiconductor electrode 120 in Embodiment 1. That is, the n-type semiconductor layer 922 has a gradient composition in the thickness direction, similarly to the n-type semiconductor layer 122 in Embodiment 1. Furthermore, the n-type semiconductor layer 922 and the conductor 921 have the same band structures as the n-type semiconductor layer 122 and the conductor 121. Accordingly, the semiconductor electrode 920 has the same operational effects as the semiconductor electrode 120 of Embodiment 1. Further, the counter electrode 909 and electrolyte 901 respectively are the same as the counter electrode 130 and electrode 140 in Embodiment 1.

The separator 906 is formed of a material that allows the electrolyte 901 to permeate itself and has a function of blocking gas generated inside each of the first chamber 912 and the second chamber 914. Examples of the material of the separator 906 include a solid electrolyte such as polymeric solid electrolyte. As the polymeric solid electrolyte, an ion exchange membrane such as Nafion (registered trademark) can be mentioned, for example. Oxygen and hydrogen generated inside the container can be separated easily with a configuration in which, after the internal space of the container is separated into two areas using such a separator, the electrolyte and the surface of the semiconductor electrode (semiconductor layer) are made in contact in one of the areas while the electrolyte and the surface of the counter electrode are made in contact in the other area.

Figure 44:
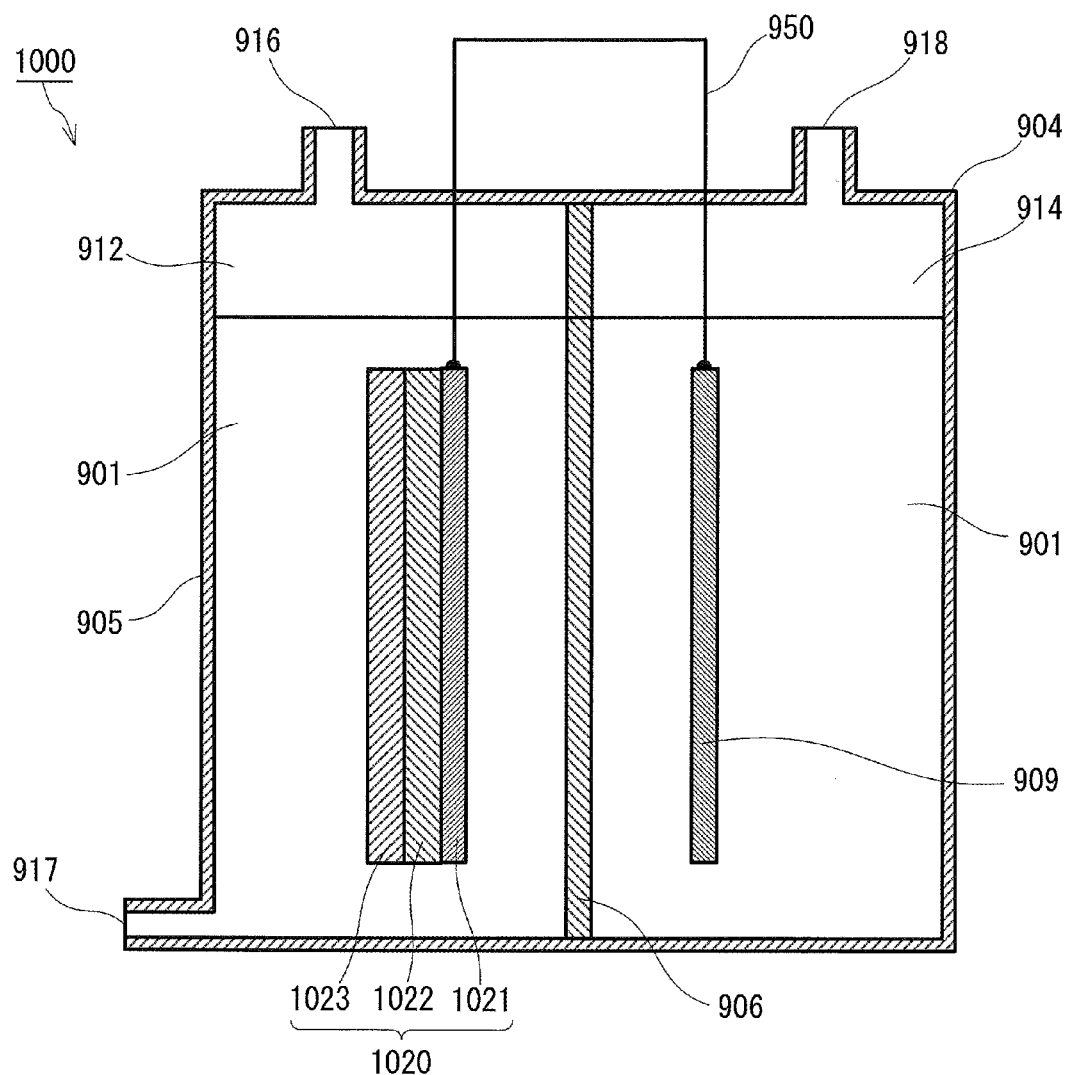
FIG. 44 is a schematic view illustrating another configuration of the photoelectrochemical cell of Embodiment 7 of the present invention.

It should be noted that although the photoelectrochemical cell 900 using the semiconductor electrode 920 that has the same configuration as the semiconductor electrode 120 in Embodiment 1 is described in the present embodiment, a semiconductor electrode 1020 in which a first n-type semiconductor layer 1022 and a second n-type semiconductor layer 1023 are disposed on a conductor 1021 may be used, as is the case of a photoelectrochemical cell 1000 indicated in FIG. 44, instead of the semiconductor electrode 920. It should be noted that the conductor 1021, the first n-type semiconductor layer 1022 and the second n-type semiconductor layer 1023 respectively have the same configurations as the conductor 221, the first n-type semiconductor layer 222 and the second n-type semiconductor layer 223 in Embodiment 2. Further, it also is possible to use the semiconductor electrode 320 in Embodiment 3 or the semiconductor electrode 420 in Embodiment 4 instead of the semiconductor electrode 920.

Embodiment 8

Figure 45:
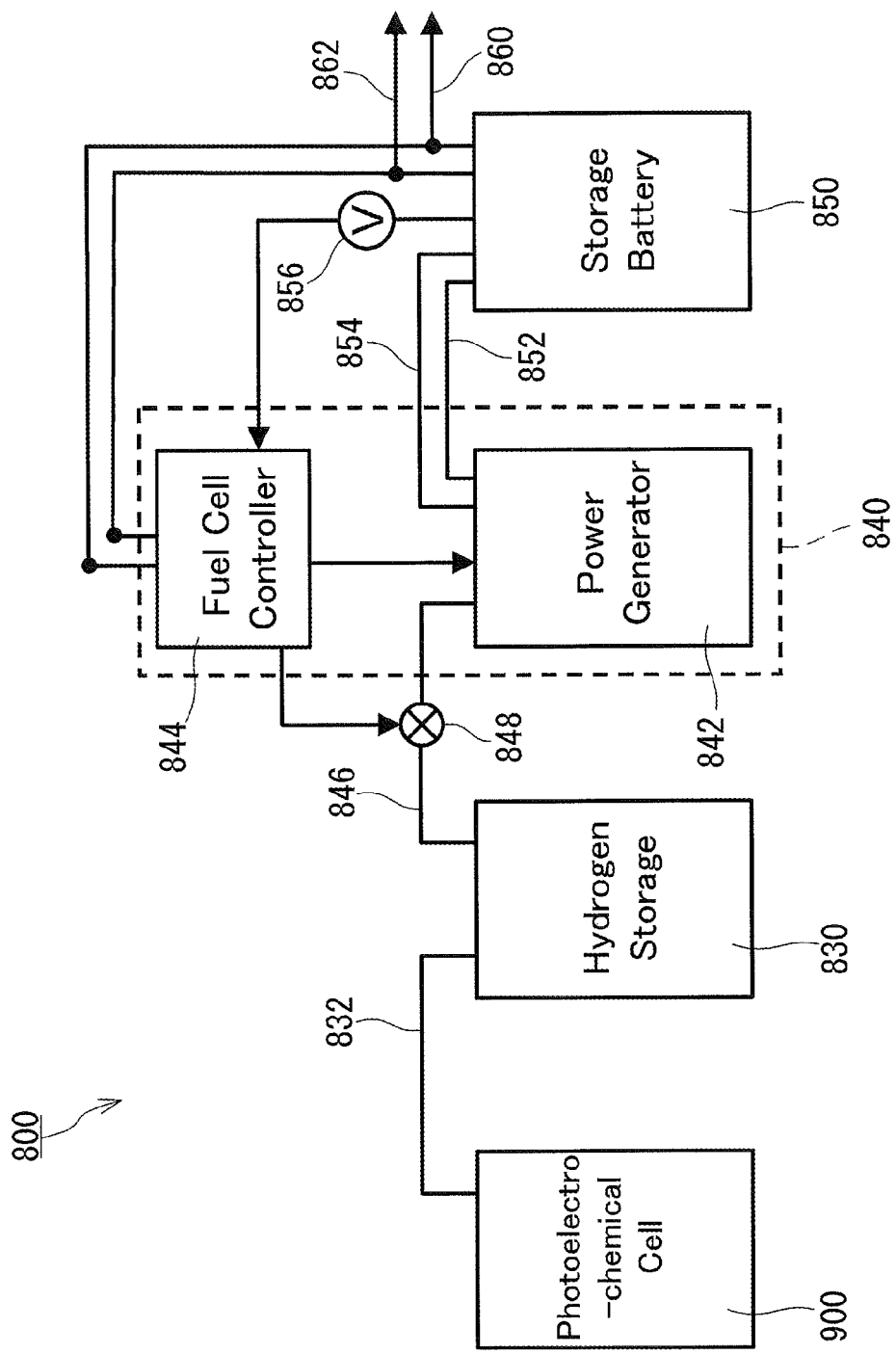
FIG. 45 is a schematic view illustrating a configuration of the energy system of Embodiment 8 of the present invention.

The configuration of the energy system according to Embodiment 8 of the present invention is described, referring to FIG. 45. FIG. 45 is a schematic view illustrating the configuration of the energy system of the present embodiment.

As indicated in FIG. 45, an energy system 800 of the present embodiment includes the photoelectrochemical cell 900, a hydrogen storage 830, a fuel cell 840, and a storage battery 850.

The photoelectrochemical cell 900 is the photoelectrochemical cell described in Embodiment 7 and the specific configuration thereof is as illustrated in FIG. 43. Therefore, detailed descriptions thereof are omitted.

The hydrogen storage 830 is connected to the second chamber 914 of the photoelectrochemical cell 900 (see FIG. 43) by a first pipe 832. The hydrogen storage 830 can be constituted, for example, by a compressor for compressing the hydrogen generated in the photoelectrochemical cell 900 and a high-pressure hydrogen tank for storing the hydrogen compressed by the compressor.

The fuel cell 840 includes a power generator 842 and a fuel cell controller 844 for controlling the power generator 842. The fuel cell 840 is connected to the hydrogen storage 830 by a second pipe 846. The second pipe 846 is provided with a block valve 848. For example, a fuel cell of the polymeric solid electrolyte type can be used for the fuel cell 840.

The positive electrode and the negative electrode of the storage battery 850 respectively are connected electrically to the positive electrode and the negative electrode of the power generator 842 in the fuel cell 840 by a first line 852 and a second line 854. The storage battery 850 is provided with a capacity counter 856 for counting the remaining capacity of the storage battery 850. A lithium ion battery can be used as the storage battery 850, for example.

Next, the operation of the energy system 800 according to the present embodiment is described, referring to FIG. 43 and FIG. 45.

When the surface of the n-type semiconductor layer 922 of the semiconductor electrode 920 disposed inside the first chamber 912 is irradiated with sunlight through the light incident portion 905 of the photoelectrochemical cell 900, electrons and holes occur inside the n-type semiconductor layer 922. The holes generated at this time transfer toward the surface near-field region of the n-type semiconductor layer 922. Thus, water is decomposed on the surface of the n-type semiconductor layer 922 according to the above reaction formula (1), so that oxygen is generated.

On the other hand, the electrons transfer to the conductor 921 from the junction plane near-field region of the n-type semiconductor layer 922 with the conductor 921 along the bending of the band edge of the conduction band caused by the junction between the conductor 921 and the n-type semiconductor layer 922. The electrons that have transferred to the conductor 921 transfer toward the side of the counter electrode 909 connected electrically to the conductor 921 through the conducting wire 950. Thus, hydrogen is generated on the surface of the counter electrode 909 according to the above reaction formula (2).

At this time, since no Schottky barriers occur from the surface near-field region of the n-type semiconductor layer 922 to the junction plane near-field region of the n-type semiconductor layer 922 with the conductor 921 as is the case of the semiconductor electrode 120 in Embodiment 1, the electrons can transfer from the surface near-field region of the n-type semiconductor layer 922 to the junction plane near-field region of the n-type semiconductor layer 922 with the conductor without being prevented.

Further, since no Schottky barriers occur also at the junction plane between the n-type semiconductor layer 922 and the conductor 921, as is the case of the semiconductor electrode 120 in Embodiment 1, the electrons can transfer from the n-type semiconductor 922 having a gradient composition to the conductor 921 without being prevented. Accordingly, the probability of the recombination between the electrons and holes generated by photoexcitation inside the n-type semiconductor layer 922 is reduced, and the quantum efficiency of the hydrogen evolution reaction by irradiation with light can be improved.

Oxygen generated inside the first chamber 912 is discharged from the first gas outlet 916 to the outside of the photoelectrochemical cell 900. On the other hand, hydrogen generated inside the second chamber 914 is supplied into the hydrogen storage 830 through the second gas outlet 918 and the first pipe 832.

In generating power in the fuel cell 840, the block valve 848 is opened according to signals from the fuel cell controller 844, so that the hydrogen stored inside the hydrogen storage 830 is supplied to the power generator 842 of the fuel cell 840 through the second pipe 846.

The electricity generated in the power generator 842 of the fuel cell 840 is stored in the storage battery 850 through the first line 852 and the second line 854. The electricity stored inside the storage battery 850 is supplied to households, enterprises, and the like through a third line 860 and a fourth line 862.

According to the photoelectrochemical cell 900 in the present embodiment, it is possible to improve the quantum efficiency of the hydrogen evolution reaction by irradiation with light. Thus, the energy system 800 of the present embodiment provided with such the photoelectrochemical cell 900 can provide an efficient power supply.

EXAMPLES

Hereinafter, examples of the present invention are described specifically

Example 1

As Example 1, a photoelectrochemical cell having the same configuration as the photoelectrochemical cell 100 indicated in FIG. 1 was produced. The photoelectrochemical cell of Example 1 is described below, referring to FIG. 1.

The photoelectrochemical cell 100 of Example 1 was provided with a rectangular glass container (container 110) with an opening in the upper part, the semiconductor electrode 120 and the counter electrode 130. The glass container 110 accommodated 1 mol/L of an $H_2SO_4$ aqueous solution as the electrolyte 140.

The semiconductor electrode 120 was produced according to the following procedure.

A 150 nm-thick ITO film (sheet resistance 10 Ω/sq.) was formed on a 1 cm-square glass substrate by sputtering, as the conductor 121. Next, titanium oxide (anatase crystal) in which the oxygen content was in a gradient was formed on the conductor 121, as the n-type semiconductor layer 122. The titanium oxide in which the oxygen content was in a gradient was produced by reactive sputtering using titanium as a target, while the partial pressure of oxygen and the partial pressure of argon inside the chamber were varied linearly respectively to be 0.20 Pa and 0.80 Pa at the start of film formation and respectively to be 0.10 Pa and 0.9 Pa at the completion of film formation (after forming a 500 nm-thick film). It should be noted that the semiconductor electrode 120 was disposed so that the surface of the n-type semiconductor layer 122 faces the light incident surface 112 of the glass container 110.

A platinum plate was used as the counter electrode 130. The conductor 121 of the semiconductor electrode 120 was connected electrically to the counter electrode 130 by the conducting wire 150.

An irradiation experiment with simulated sunlight was conducted on the thus produced photoelectrochemical cell 100 of Example 1. In the irradiation experiment with simulated sunlight, the surface of the n-type semiconductor layer 122 in the semiconductor electrode 120 of the photoelectrochemical cell 100 was irradiated with light at an intensity of 1 kW/m$^2$ through the light incident portion 112 using a solar simulator manufactured by SERIC LTD. as the simulated sunlight. The gas generated on the surface of the counter electrode 130 was collected for 30 minutes, and the components were analyzed and the amount generated was determined for the collected gas by gas chromatography. Furthermore, the density of the photocurrent flowing between the semiconductor electrode 120 and the counter electrode 130 was measured with an ammeter 160. The apparent quantum efficiency was calculated using the amount of gas generated in the counter electrode 130.

As a result of the analysis of the gas collected in the photoelectrochemical cell of the Example 1, it was confirmed that hydrogen was generated on the counter electrode. The rate of hydrogen generation was $1.4 \times 10^{-7}$ L/s. Further, since the density of the photocurrent flowing between the semiconductor electrode and the counter electrode was 1.1 mA/cm$^2$, it was confirmed that the electrical decomposition of water was performed quantitatively. The apparent quantum efficiency was about 46%, as calculated using the following formula.

Apparent quantum efficiency={(measured photocurrent density [mA/cm$^2$])/(photocurrent density that can occur due to the sunlight to be possibly absorbed in the band gap of the semiconductor material used for the surface near-field region of the $n$-type semiconductor layer [mA/cm$^2$])}×100

It should be noted that, in Example 1, the photocurrent density measured was 1.1 mA/cm$^2$, and the photocurrent density that can occur due to sunlight to be possibly absorbed in the band gap (2.9 eV) of the semiconductor material (TiO$_x$) used for the surface near-field region of the n-type semiconductor layer was 2.4 mA/cm$^2$.

Example 2

As Example 2, a photoelectrochemical cell in which only the configuration of the semiconductor electrode was different from that in Example 1 was produced. It should be noted that the photoelectrochemical cell of Example 2 had the same configuration as the photoelectrochemical cell 200 illustrated in FIG. 4. The photoelectrochemical cell of Example 2 is described below, referring to FIG. 4.

The semiconductor electrode 220 of Example 2 was produced as follows.

First, a 150 nm-thick ITO film (sheet resistance 10 Ω/sq.) was formed on a 1 cm-square glass substrate by sputtering, as the conductor 221. Next, a 250 nm-thick titanium oxide (anatase crystal) was formed on the conductor 221, as the first n-type semiconductor layer 222, by reactive sputtering, while the partial pressure of oxygen and the partial pressure of argon inside the chamber were maintained respectively at 0.20 Pa and 0.80 Pa at any time until the completion of film formation. Next, a 500 nm-thick oxygen deficient titanium oxide (anatase crystal) was formed on the first n-type semiconductor layer 222, as the second n-type semiconductor layer 223, by reactive sputtering, while the partial pressure of oxygen and the partial pressure of argon inside the chamber were maintained respectively at 0.1 Pa and 0.9 Pa at any time until the completion of film formation.

The irradiation experiment with simulated sunlight was conducted on the thus produced photoelectrochemical cell 200 of Example 2, in the same manner as in Example 1. As a result of the analysis of the gas collected in the photoelectrochemical cell of the Example 2, it was confirmed that hydrogen was generated on the counter electrode. The rate of hydrogen generation was $1.2 \times 10^{-7}$ L/s. Further, the density of the photocurrent flowing between the semiconductor electrode and the counter electrode was 0.96 mA/cm$^2$. The apparent quantum efficiency was about 40%, as calculated in the same manner as in Example 1. Table 1 indicates the results.

Comparative Example 1

Figure 46:
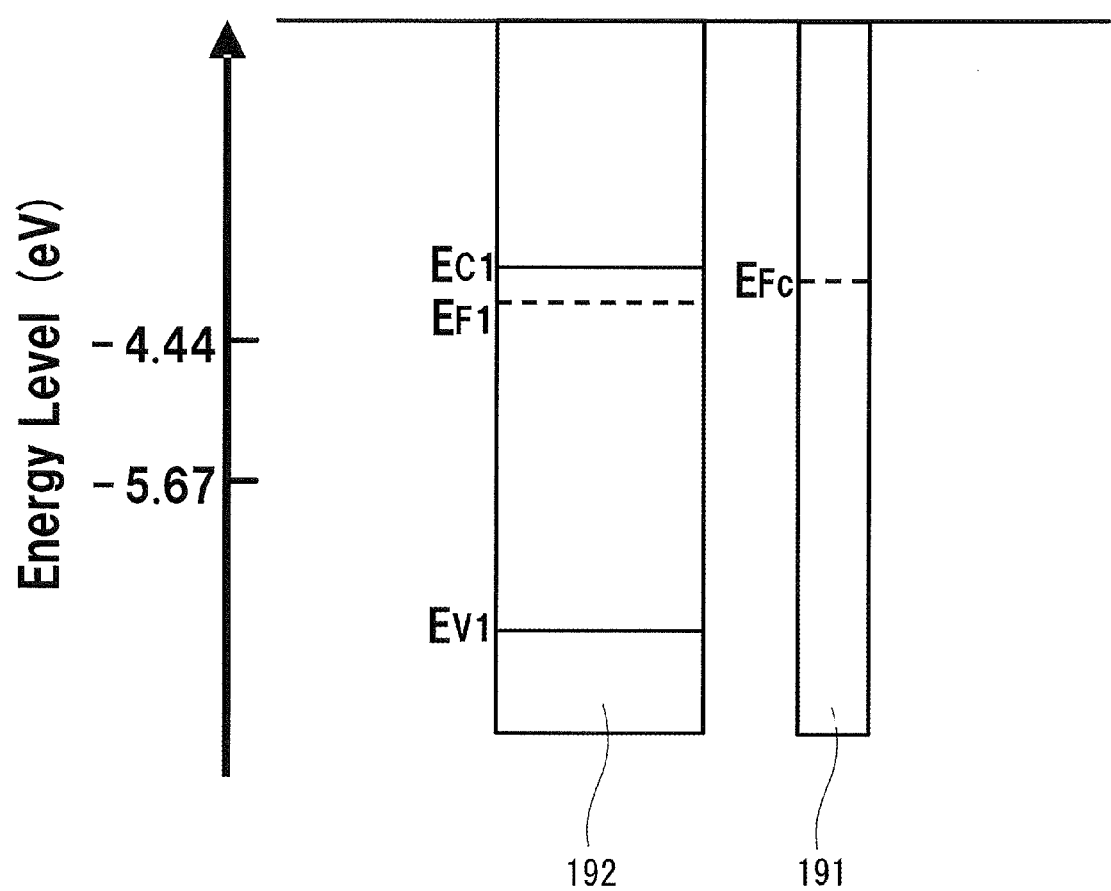
FIG. 46 is a conceptual diagram indicating a band structure of a conductor and an n-type semiconductor layer, before being joined, which constitute a semiconductor electrode in the photoelectrochemical cell of Comparative Example 1.

As Comparative Example 1, a photoelectrochemical cell in which only the configuration of the semiconductor electrode was different from that in Example 1 was produced. The semiconductor electrode of Comparative Example 1 includes an n-type semiconductor layer 192 disposed on a conductor 191, and the band structures of the conductor 191 and the n-type semiconductor layer 192 were as indicated in FIG. 46 (before junction) and FIG. 47 (after junction). The semiconductor electrode of Comparative Example 1 was produced as follows.

First, a 150 nm-thick ITO film (sheet resistance 10 Ω/sq.) was formed on a 1 cm-square glass substrate by sputtering, as the conductor 191. Next, a 500 nm-thick titanium oxide (anatase crystal) was formed on the conductor 191, as the n-type semiconductor layer 192, by reactive sputtering using titanium as a target, while the partial pressure of oxygen and the partial pressure of argon inside the chamber were maintained respectively at 0.20 Pa and 0.80 Pa at any time until the completion of film formation.

The irradiation experiment with simulated sunlight was conducted on the thus produced photoelectrochemical cell of Comparative Example 1, in the same manner as in Example 1. As a result of the analysis of the gas collected in the photoelectrochemical cell of the Comparative Example 1, it was confirmed that hydrogen was generated on the counter electrode. The rate of hydrogen generation was $3.8 \times 10^{-8}$ L/s. Further, the density of the photocurrent flowing between the semiconductor electrode and the counter electrode was 0.30 mA/cm$^2$. The apparent quantum efficiency was about 25%, as calculated using the calculation formula indicated in Example 1. It should be noted that, in Comparative Example 1, the photocurrent density that can occur due to sunlight to be possibly absorbed in the band gap (3.2 eV) of the semiconductor material (TiO$_2$) used for the surface near-field region was 1.2 mA/cm$^2$. Table 1 indicates the results.

Comparative Example 2

Figure 48:
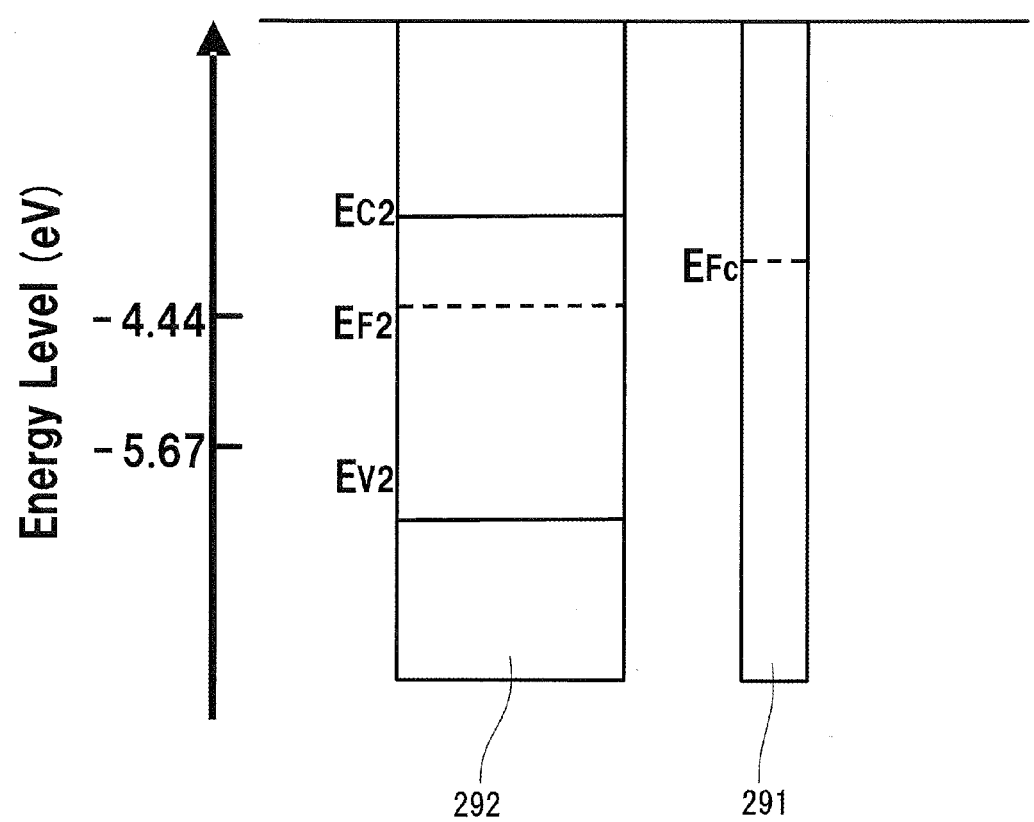
FIG. 48 is a conceptual diagram indicating a band structure of a conductor and an n-type semiconductor layer, before being joined, which constitute a semiconductor electrode in the photoelectrochemical cell of Comparative Example 2.

As Comparative Example 2, a photoelectrochemical cell in which only the configuration of the semiconductor electrode was different from that in Example 1 was produced. The semiconductor electrode of Comparative Example 2 includes an n-type semiconductor layer 292 disposed on a conductor 291, and the band structures of the conductor 291 and the n-type semiconductor layer 292 were as indicated in FIG. 48 (before junction) and FIG. 49 (after junction). The semiconductor electrode of Comparative Example 2 was produced as follows.

First, a 150 nm-thick ITO film (sheet resistance 10 Ω/sq.) was formed on a 1 cm-square glass substrate by sputtering, as the conductor 291. Next, a 500 nm-thick oxygen deficient titanium oxide (anatase crystal) was formed on the conductor 291, as the n-type semiconductor layer 292, by reactive sputtering using titanium as a target, while the partial pressure of oxygen and the partial pressure of argon inside the chamber were maintained respectively at 0.1 Pa and 0.9 Pa at any time until the completion of film formation.

The irradiation experiment with simulated sunlight was conducted on the thus produced photoelectrochemical cell of Comparative Example 2, in the same manner as in Example 1. As a result of the analysis of the gas collected in the photoelectrochemical cell of the Comparative Example 2, it was confirmed that hydrogen was generated on the counter electrode. The rate of hydrogen generation was $8.2 \times 10^{-8}$ L/s. Further, the density of the photocurrent flowing between the semiconductor electrode and the counter electrode was 0.65 mA/cm$^2$. The apparent quantum efficiency was about 27%, as calculated in the same manner as in Example 1. Table 1 indicates the results.

Comparative Example 3

Figure 50:
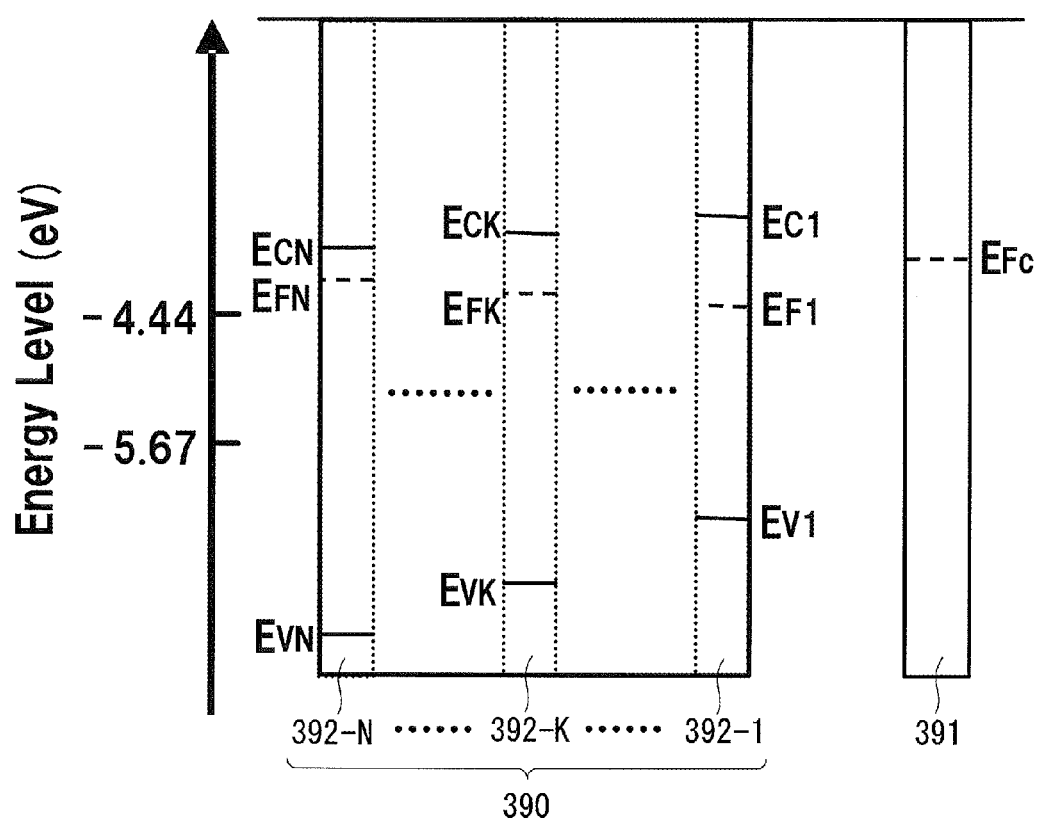
FIG. 50 is a conceptual diagram indicating a band structure of a conductor and an n-type semiconductor layer, before being joined, which constitute a semiconductor electrode in the photoelectrochemical cell of Comparative Example 3.

As Comparative Example 3, a photoelectrochemical cell in which only the configuration of the semiconductor electrode was different from that in Example 1 was produced. The semiconductor electrode of Comparative Example 3 includes an n-type semiconductor layer 392 disposed on a conductor 391, and the band structures of the conductor 391 and the n-type semiconductor layer 392 were as indicated in FIG. 50 (before junction) and FIG. 51 (after junction). The semiconductor electrode of Comparative Example 3 was produced as follows.

First, a 150 nm-thick ITO film (sheet resistance 10 Ω/sq.) was formed on a 1 cm-square glass substrate by sputtering, as the conductor 391. Next, titanium oxide (anatase crystal) in which the oxygen content was in a gradient was formed on the conductor 391, as the n-type semiconductor layer 392. The titanium oxide in which the oxygen content was in a gradient was produced by reactive sputtering using titanium as a target, while the partial pressure of oxygen and the partial pressure of argon inside the chamber were varied linearly respectively to be 0.01 Pa and 0.99 Pa at the start of film formation and respectively to be 0.20 Pa and 0.80 Pa at the completion of film formation.

The irradiation experiment with simulated sunlight was conducted on the thus produced photoelectrochemical cell of Comparative Example 3, in the same manner as in Example 1. As a result of the analysis of the gas collected in the photoelectrochemical cell of the Comparative Example 3, it was confirmed that hydrogen was generated on the counter electrode. The rate of hydrogen generation was $1.8 \times 10^{-8}$ L/s. Further, the density of the photocurrent flowing between the semiconductor electrode and the counter electrode was 0.14 mA/cm$^2$. The apparent quantum efficiency was about 12%, as calculated in the same manner as in Comparative Example 1. Table 1 indicates the results.

Table 1 below also indicates the Fermi levels, the band edge levels of the conduction band and the band edge levels of the valence band in the junction plane near-field region and the surface near-field region of the n-type semiconductor layer, and the Fermi level of the conductor, in the semiconductor electrode in each photoelectrochemical cell of Examples 1 and 2, and Comparative Examples 1 to 3. It should be noted that the values of the Fermi levels, the band edge levels of the conduction band, and the band edge levels of the valence band are indicated herein relative to the vacuum level, in the state where the semiconductor is in contact with an electrolyte at a pH of 0 and a temperature of 25° C. As to the single substances (conductors and n-type semiconductor layers having no gradient composition), those values were cited from literature. As to the substances with a gradient composition (the n-type semiconductor layers of Example 1 and Comparative Example 3), those values of each of a single substance in the surface near-field region and a single substance in the junction plane near-field region with the conductor were cited from literatures.

As seen from Table 1, the semiconductor electrode in each photoelectrochemical cell of Example 1 and Example 2 had the band edge level of the conduction band and the band edge level of the valence band in the surface near-field region of the n-type semiconductor layer respectively higher than the band edge level of the conduction band and the band edge level of the valence band in the junction plane near-field region of the n-type semiconductor layer with the conductor. Furthermore, in the semiconductor electrode in each photoelectrochemical cell of Example 1 and Example 2, the Fermi levels of the conductor, the junction plane near-field region of the n-type semiconductor layer with the conductor and the surface near-field region of the n-type semiconductor layer increased in the order of the surface near-field region of the n-type semiconductor layer, the junction plane near-field region of the n-type semiconductor layer with the conductor, and the conductor. Furthermore, in each semiconductor electrode of Example 1 and Example 2, the Fermi level of the junction plane near-field region of the n-type semiconductor layer with the conductor was −4.44 eV or more, and the band edge level of the valence band in the surface near-field region of the n-type semiconductor layer was −5.67 eV or less, relative to the vacuum level, while being in contact with an electrolyte at a pH of 0 and a temperature of 25° C.

As described above, the conductor and the n-type semiconductor layer of Example 1 had the same band structures as the

TABLE 1

| | | N-TYPE SEMICONDUCTOR LAYER | | | |
| --- | --- | --- | --- | --- | --- |
| | | SURFACE NEAR-FIELD REGION | JUNCTION PLANE NEAR-FIELD REGION | CONDUCTOR | QUANTUM EFFICIENCY (%) |
| EX. 1 | MATERIAL COMPOSITION | TiO$_x$ | TiO$_2$ | ITO | 46 |
| | FERMI LEVEL | −4.44 eV | −4.34 eV | −4.24 eV | |
| | CONDUCTION BAND | −4.14 eV | −4.24 eV | — | |
| | VALENCE BAND | −7.04 eV | −7.44 eV | — | |
| EX. 2 | MATERIAL COMPOSITION | TiO$_x$ | TiO$_2$ | ITO | 40 |
| | FERMI LEVEL | −4.44 eV | −4.34 eV | −4.24 eV | |
| | CONDUCTION BAND | −4.14 eV | −4.24 eV | — | |
| | VALENCE BAND | −7.04 eV | −7.44 eV | — | |
| C. EX. 1 | MATERIAL COMPOSITION | TiO$_2$ | TiO$_2$ | ITO | 25 |
| | FERMI LEVEL | −4.34 eV | −4.34 eV | −4.24 eV | |
| | CONDUCTION BAND | −4.24 eV | −4.24 eV | — | |
| | VALENCE BAND | −7.44 eV | −7.44 eV | — | |
| C. EX. 2 | MATERIAL COMPOSITION | TiO$_x$ | TiO$_x$ | ITO | 27 |
| | FERMI LEVEL | −4.44 eV | −4.44 eV | −4.24 eV | |
| | CONDUCTION BAND | −4.14 eV | −4.14 eV | — | |
| | VALENCE BAND | −7.04 eV | −7.04 eV | — | |
| C. EX. 3 | MATERIAL COMPOSITION | TiO$_2$ | TiO$_x$ | ITO | 12 |
| | FERMI LEVEL | −4.34 eV | −4.44 eV | −4.24 eV | |
| | CONDUCTION BAND | −4.24 eV | −4.14 eV | — | |
| | VALENCE BAND | −7.44 eV | −7.04 eV | — | | conductor 121 and the n-type semiconductor layer 122 in Embodiment 1 (see FIG. 2 and FIG. 3).

The semiconductor electrode of Example 2 included two kinds of n-type semiconductor layers that had been joined to each other, and had the same band structure of the conductor, the first n-type semiconductor layer and the second n-type semiconductor layer as that of the conductor 221, the first n-type semiconductor layer 222 and the second n-type semiconductor layer 223 in Embodiment 2 (see FIG. 5 and FIG. 6). It should be noted that, in Table 1, the junction plane near-field region corresponds to the first n-type semiconductor layer, and the surface near-field region corresponds to the second n-type semiconductor layer.

Figure 47:
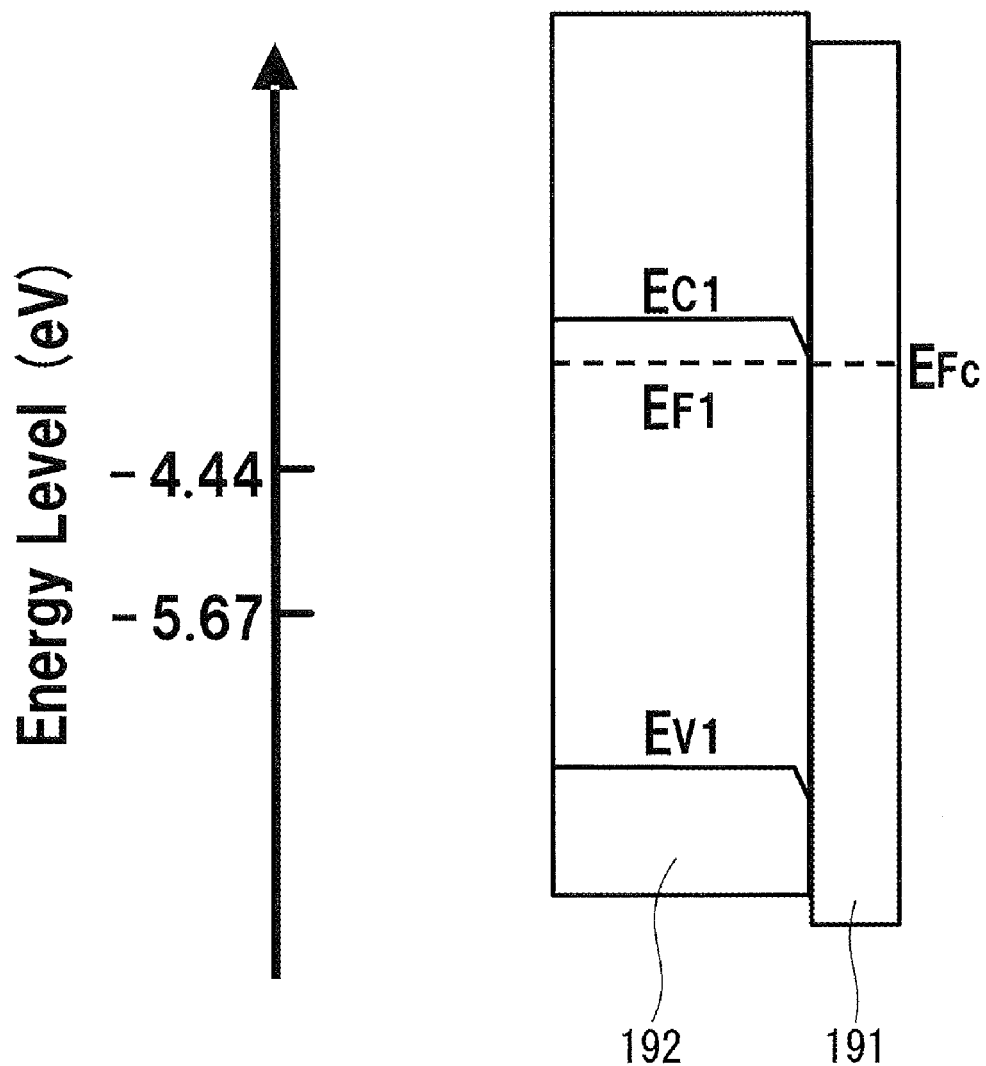
FIG. 47 is a conceptual diagram indicating a band structure of the conductor and the n-type semiconductor layer, after being joined, which constitute the semiconductor electrode in the photoelectrochemical cell of Comparative Example 1.

The band structure of the conductor 191 and the n-type semiconductor layer 192 in Comparative Example 1 was as indicated in FIG. 46 and FIG. 47.

Figure 49:
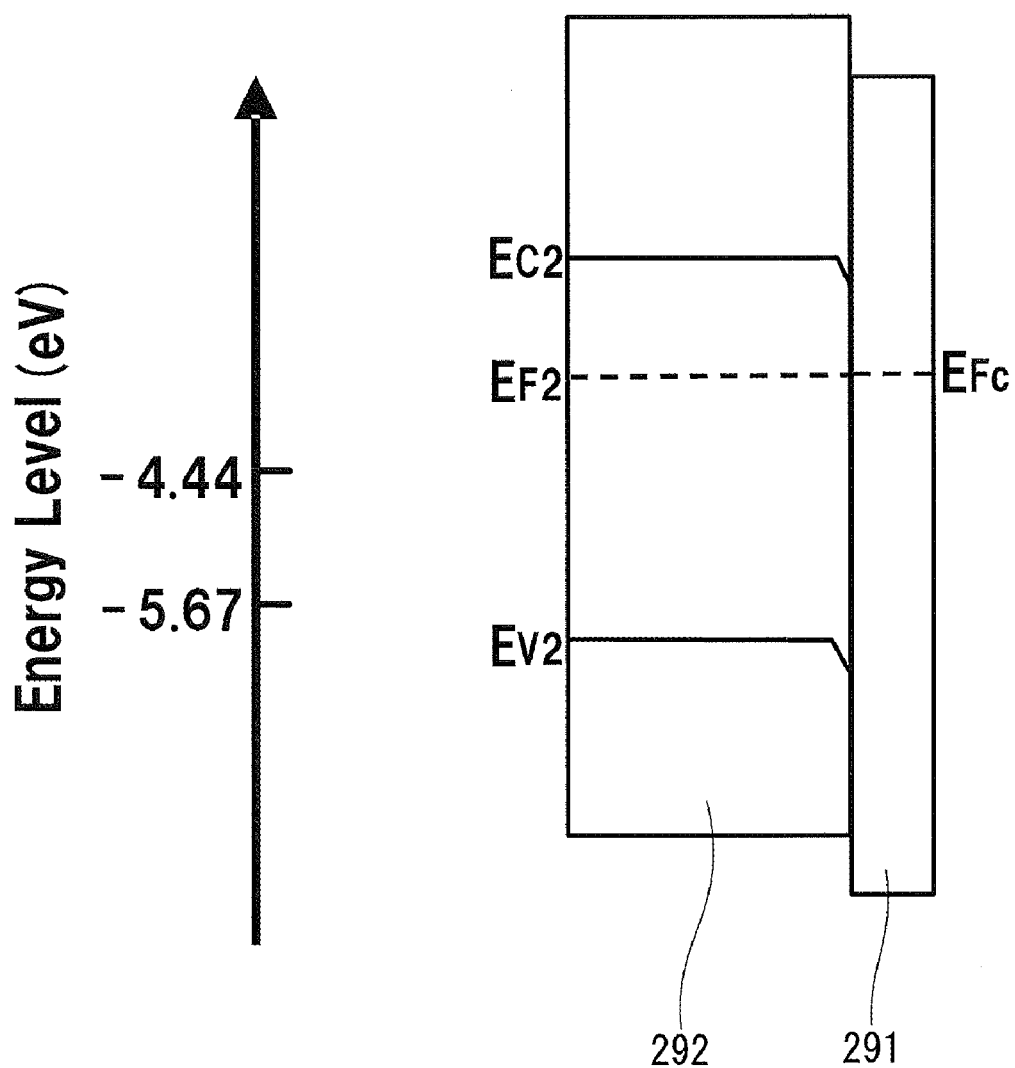
FIG. 49 is a conceptual diagram indicating a band structure of the conductor and the n-type semiconductor layer, after being joined, which constitute the semiconductor electrode in the photoelectrochemical cell of Comparative Example 2.

The band structure of the conductor 291 and the n-type semiconductor layer 292 in Comparative Example 2 was as indicated in FIG. 48 and FIG. 49.

Figure 51:
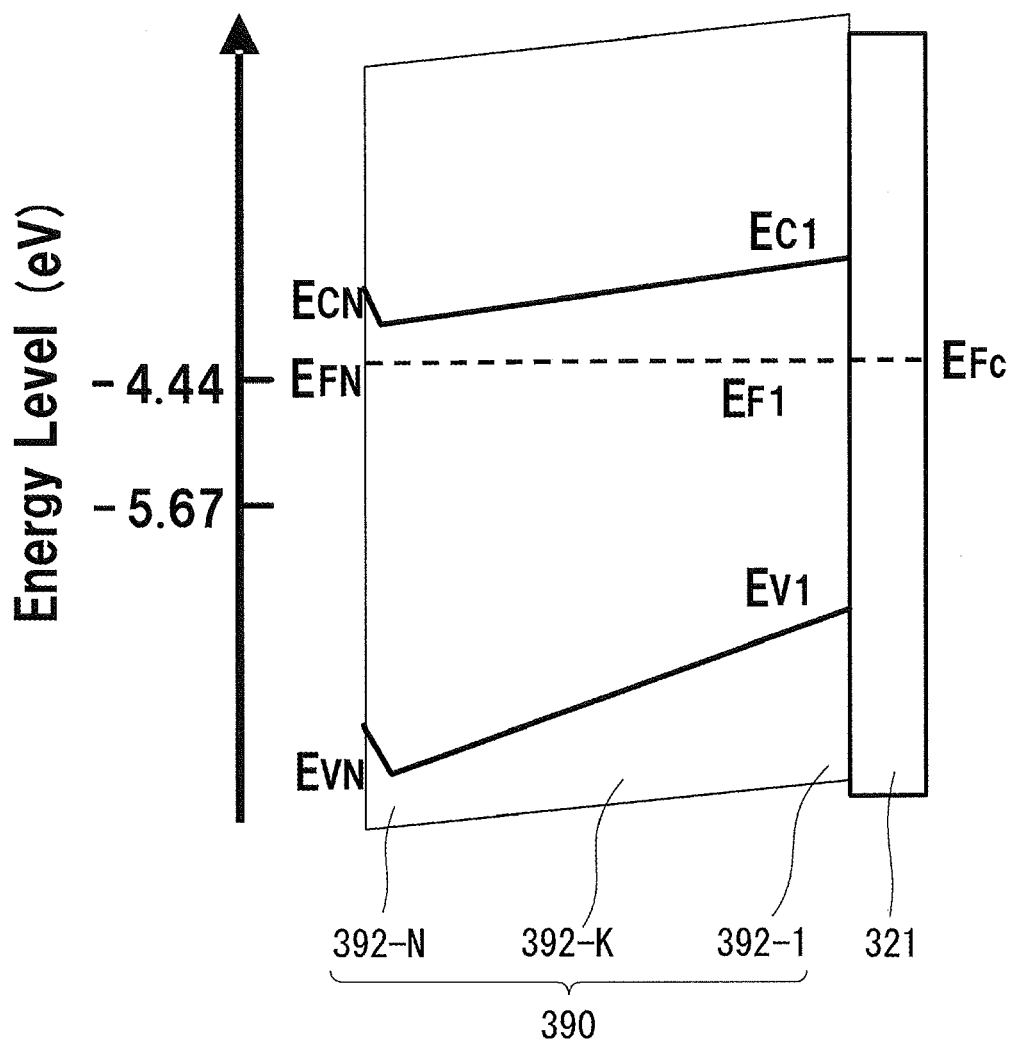
FIG. 51 is a conceptual diagram indicating a band structure of the conductor and the n-type semiconductor layer, after being joined, which constitute the semiconductor electrode in the photoelectrochemical cell of Comparative Example 3.

The semiconductor electrode of Comparative Example 3 included an n-type semiconductor layer 392 with a gradient composition, and the band edge level $E_{C1}$ of the conduction band and the band edge level $E_{V1}$ of the valence band in a junction plane near-field region 392-1 of the n-type semiconductor layer 392 respectively were higher than the band edge level $E_{CN}$ of the conduction band and the band edge level $E_{VN}$ of the valence band in a surface near-field region 392-N of the n-type semiconductor layer 392, as indicated in FIGS. 50 and 51. Furthermore, the Fermi level $E_{FN}$ of the surface near-field region 392-N of the n-type semiconductor layer 392 was lower than the Fermi level $E_{F1}$ of the junction plane near-field region 392-1, and the Fermi level $E_{Fc}$ of the conductor 391 was higher than the Fermi level $E_{F1}$ of the junction plane near-field region 392-1 of the n-type semiconductor layer 392. Furthermore, in the semiconductor electrode of Comparative Example 3, the Fermi level $E_{F1}$ of the junction plane near-field region 392-1 of the n-type semiconductor layer 392 was −4.44 eV, and the band edge level $E_{VN}$ of the valence band in the surface near-field region 392-N of the n-type semiconductor layer 392 was −5.67 eV or less, relative to the vacuum level, while being in contact with an electrolyte at a pH of 0 and a temperature of 25° C.

The apparent quantum efficiency measured for each photoelectrochemical cell of Examples 1 and 2, and Comparative Examples 1 to 3 is as indicated above in Table 1. As seen from these results, the photoelectrochemical cells of Examples 1 and 2 as the present invention had higher quantum efficiencies, compared to those of Comparative Examples 1 to 3. Further, the photoelectrochemical cell of Example 1 using an n-type semiconductor layer with a gradient composition had a quantum efficiency higher than the photoelectrochemical cell of Example 2 using two kinds of n-type semiconductor layers as a semiconductor layer.

Example 3

As Example 3, a photoelectrochemical cell in which only the configuration of the semiconductor electrode was different from that in Example 1 was produced. It should be noted that the photoelectrochemical cell of Example 3 had the same configuration as the photoelectrochemical cell 100 illustrated in FIG. 1. The photoelectrochemical cell of Example 3 is described below, referring to FIG. 1.

The semiconductor electrode 120 of Example 3 was produced as follows.

As the conductor 121, a 1 cm-square tantalum plate (0.1 mm-thick) was used. A 2 μm-thick oxidation tantalum film was formed on the conductor 121 by heat oxidation at 500° C. Thereafter, it was subjected to nitriding treatment for 1 hour in ammonia stream at 850° C. Thus, the semiconductor electrode 120 was produced. It should be noted that the semiconductor electrode 120 was disposed so that the surface near-field region 122-N of the n-type semiconductor layer 122 faces the light incident surface 112 of the glass container 110.

The irradiation experiment with simulated sunlight was conducted on the thus produced photoelectrochemical cell 100 of Example 3, in the same manner as in Example 1. As a result of the analysis of the gas collected in the photoelectrochemical cell of the Example 3, it was confirmed that hydrogen was generated on the counter electrode. The rate of hydrogen generation was $8.3 \times 10^{-7}$ L/s. Further, the density of the photocurrent flowing between the semiconductor electrode and the counter electrode was 6.5 mA/cm². The apparent quantum efficiency was about 37%, as calculated using the calculation formula indicated in Example 1. It should be noted that, in Example 3, the photocurrent density that can occur due to sunlight to be possibly absorbed in the band gap (2.0 eV) of the semiconductor material ($Ta_3N_5$) used for the surface near-field region was 17.6 mA/cm². Table 2 indicates the results. Further, Table 2 below also indicates the Fermi levels, the band edge levels of the conduction band and the band edge levels of the valence band in the junction plane near-field region and the surface near-field region of the n-type semiconductor layer, and the Fermi level of the conductor, as obtained in the same manner as in Examples 1 and 2, and Comparative Examples 1 to 3.

Comparative Example 4

A semiconductor electrode was produced in the same manner as in Example 3 except that nitriding treatment was performed for 4 hours. The irradiation experiment with simulated sunlight was conducted also on the produced photoelectrochemical cell of Comparative Example 4, in the same manner as in Example 1. As a result of the analysis of the gas collected in the photoelectrochemical cell of the Comparative Example 4, it was confirmed that hydrogen was generated on the counter electrode. The rate of hydrogen generation was $2.7 \times 10^{-7}$ L/s. Further, the density of the photocurrent flowing between the semiconductor electrode and the counter electrode was 2.1 mA/cm². The apparent quantum efficiency was about 12%, as calculated in the same manner as in Example 3. Further, Table 2 below also indicates the Fermi levels, the band edge levels of the conduction band and the band edge levels of the valence band in the junction plane near-field region and the surface near-field region of the n-type semiconductor layer, and the Fermi level of the conductor, as obtained in the same manner as in Examples 1 and 2, and Comparative Examples 1 to 3.

Comparative Example 5

A semiconductor electrode was produced in the same manner as in Example 3 except that no nitriding treatment was performed. The irradiation experiment with simulated sunlight was conducted also on the produced photoelectrochemical cell of Comparative Example 5, in the same manner as in Example 1. As a result of the analysis of the gas collected in the photoelectrochemical cell of the Comparative Example 5, it was confirmed that hydrogen was generated on the counter electrode. The rate of hydrogen generation was $1.1 \times 10^{-8}$ L/s. Further, the density of the photocurrent flowing between the semiconductor electrode and the counter electrode was 0.092 mA/cm². The apparent quantum efficiency was about 15%, as calculated using the calculation formula indicated in Example 1. It should be noted that, in Example 5, the photocurrent density that can occur due to sunlight to be possibly absorbed in the band gap (3.4 eV) of the semiconductor material ($Ta_2O_5$) used for the surface near-field region was 0.61 mA/cm². Further, Table 2 below also indicates the Fermi levels, the band edge levels of the conduction band and the band edge levels of the valence band in the junction plane near-field region and the surface near-field region of the n-type semiconductor layer, and the Fermi level of the conductor, as obtained in the same manner as in Examples 1 and 2, and Comparative Examples 1 to 3.

composition with no gradient, and the band structure of the conductor and the n-type semiconductor layer thereof had a tendency similar to the band structures in Comparative Example 1 and Comparative Example 2 (see FIGS. 46 to 49).

The apparent quantum efficiency measured for each photoelectrochemical cell of Example 3 and Comparative Examples 4 and 5 is as indicated above in Table 2. As seen from these results, the photoelectrochemical cell of Example 3 as the present invention had a higher quantum efficiency, compared to the photoelectrochemical cell of Comparative Examples 4 or 5.

TABLE 2

| | | N-TYPE SEMICONDUCTOR LAYER | | | |
|---|---|---|---|---|---|
| | | SURFACE NEAR-FIELD REGION | JUNCTION PLANE NEAR-FIELD REGION | CONDUCTOR | QUANTUM EFFICIENCY (%) |
| EX. 3 | MATERIAL COMPOSITION | $Ta_3N_5$ | $Ta_2O_5$ | Ta | 37 |
| | FERMI LEVEL | −4.44 eV | −4.34 eV | −4.14 eV | |
| | CONDUCTION BAND | −4.14 eV | −4.24 eV | — | |
| | VALENCE BAND | −6.14 eV | −7.64 eV | — | |
| C. EX. 4 | MATERIAL COMPOSITION | $Ta_3N_5$ | $Ta_3N_5$ | Ta | 12 |
| | FERMI LEVEL | −4.44 eV | −4.44 eV | −4.14 eV | |
| | CONDUCTION BAND | −4.14 eV | −4.14 eV | — | |
| | VALENCE BAND | −6.14 eV | −6.14 eV | — | |
| C. EX. 5 | MATERIAL COMPOSITION | $Ta_2O_5$ | $Ta_2O_5$ | Ta | 15 |
| | FERMI LEVEL | −4.34 eV | −4.34 eV | −4.14 eV | |
| | CONDUCTION BAND | −4.24 eV | −4.24 eV | — | |
| | VALENCE BAND | −7.64 eV | −7.64 eV | — | |

As seen from Table 2, the semiconductor electrode in the photoelectrochemical cell of Example 3 had the band edge level of the conduction band and the band edge level of the valence band in the surface near-field region of the n-type semiconductor layer respectively higher than the band edge level of the conduction band and the band edge level of the valence band in the junction plane near-field region of the n-type semiconductor layer. Further, the Fermi levels of the conductor, the junction plane near-field region of the n-type semiconductor layer and the surface near-field region of the n-type semiconductor layer increased in the order of the surface near-field region of the n-type semiconductor layer, the junction plane near-field region of the n-type semiconductor layer, and the conductor. The Fermi level of the junction plane near-field region of the n-type semiconductor layer was −4.44 eV or more, and the band edge level of the valence band in the surface near-field region of the n-type semiconductor layer was −5.67 eV or less, relative to the vacuum level, while being in contact with an electrolyte at a pH of 0 and a temperature of 25° C.

As described above, the conductor and the n-type semiconductor layer of Example 3 had the same band structure as the conductor 121 and the n-type semiconductor layer 122 in Embodiment 1 (see FIG. 2 and FIG. 3).

The semiconductor electrodes of Comparative Examples 4 and 5 each included an n-type semiconductor layer having a Example 4

As Example 4, a photoelectrochemical cell having the same configuration as the photoelectrochemical cell 500 indicated in FIG. 41 was produced. The photoelectrochemical cell of Example 4 is described below, referring to FIG. 41.

The photoelectrochemical cell 500 of Example 1 was provided with a rectangular glass container (container 110) with an opening in the upper part, the semiconductor electrode 120 and the counter electrode 130. The glass container 110 accommodated 0.01 mol/L of an $Na_2SO_3$ aqueous solution containing 0.01 mol/L of $Na_2S$ as the electrolyte 140.

The semiconductor electrode 520 was produced according to the following procedure.

First, a 150 nm-thick ITO film (sheet resistance 10 Ω/sq.) was formed on a 1 cm-square glass substrate that serves as an insulation layer 524 by sputtering, as the conductor 521. Next, a 500 nm-thick titanium oxide film (anatase polycrystal) was formed on the conductor 521 by sputtering, as the first n-type semiconductor layer 522. Finally, a 1 μm-thick cadmium sulfide film was formed on the first n-type semiconductor layer 522 by chemical precipitation using cadmium acetate and thiourea, as the second n-type semiconductor layer 523. The semiconductor electrode 520 was disposed so that the surface of the second n-type semiconductor layer 523 faces the light incident surface 112 of the glass container 510.

A platinum plate was used as the counter electrode 130. A portion of the conductor 522 of the semiconductor electrode 520 was connected electrically to the counter electrode 130 by the conducting wire 550. The current flowing between the semiconductor electrode 520 and the counter electrode 130 was measured with the ammeter 160.

The irradiation experiment with simulated sunlight was conducted on the thus produced photoelectrochemical cell 500 of Example 4, in the same manner as in Example 1. As a result of the analysis of the gas collected in the photoelectrochemical cell of the Example 4, it was confirmed that hydrogen was generated on the counter electrode. The rate of hydrogen generation was $2.3 \times 10^{-7}$ L/s. Further, since the photocurrent flowing between the semiconductor electrode and the counter electrode was 1.8 mA/cm², it was confirmed that the electrical decomposition of water was performed quantitatively. The apparent quantum efficiency was about 28%, as calculated using the calculation formula indicated in Example 1. Here, the calculation was performed, assuming that the photocurrent density that can occur due to sunlight to be possibly absorbed in the band gap (2.5 eV) of the semiconductor material (CdS) used for the second n-type semiconductor layer was 6.5 mA/cm². Table 3 indicates the results. Further, Table 3 below also indicates the Fermi levels $E_F$, the band edge levels $E_C$ of the conduction band and the band edge levels $E_V$ of the valence band in the first and second n-type semiconductor layers, and the Fermi level $E_F$ of the conductor, as obtained in the same manner as in Examples 1 and 2, and Comparative Examples 1 to 3.

Example 5

As Example 5, a photoelectrochemical cell in which only the configuration of the semiconductor electrode was different from that in Example 4 was produced. It should be noted that the photoelectrochemical cell of Example 5 had the same configuration as the photoelectrochemical cell 500 illustrated in FIG. 41. The photoelectrochemical cell of Example 5 is described below, referring to FIG. 41.

Using a Ti substrate as the conductor 521, a 500 nm-thick titanium oxide film (anatase polycrystal) was formed on the Ti substrate by sputtering, as the first n-type semiconductor layer 522. Next, a 1 μm-thick cadmium sulfide film was formed on the first n-type semiconductor layer 522 by chemical precipitation using cadmium acetate and thiourea, as the second n-type semiconductor layer 523. It should be noted that the back surface of the Ti substrate was coated with a fluororesin that serves as the insulation layer 524.

The irradiation experiment with simulated sunlight was conducted on the thus produced photoelectrochemical cell 500 of Example 5, in the same manner as in Example 1. As a result of the analysis of the gas collected in the photoelectrochemical cell of the Example 5, it was confirmed that hydrogen was generated on the counter electrode. The rate of hydrogen generation was $2.7 \times 10^{-7}$ L/s. Further, since the photocurrent flowing between the semiconductor electrode and the counter electrode was 2.1 mA/cm², it was confirmed that the electrical decomposition of water was performed quantitatively. The apparent quantum efficiency was about 32%, as calculated in the same manner as in Example 4. Table 3 indicates the results. Table 3 below also indicates the Fermi levels, the band edge levels of the conduction band and the band edge levels of the valence band of the first and second n-type semiconductor layers, and the Fermi level of the conductor, as obtained in the same manner as in Examples 1 and 2, and Comparative Examples 1 to 3.

Example 6

As Example 6, a photoelectrochemical cell having the same configuration as the photoelectrochemical cell 600 indicated in FIG. 42 was produced. The photoelectrochemical cell of Example 6 is described below, referring to FIG. 42.

The semiconductor electrode 620 and the counter electrode 630 were produced according to the following procedures.

As the conductor 621, a 1 cm-square Ti substrate was used. Next, a 500 nm-thick titanium oxide film (anatase polycrystal) was formed on the Ti substrate by sputtering, as the first n-type semiconductor layer 622. Next, in the same manner as in Example 4, a 1 μm-thick cadmium sulfide film was formed on the first n-type semiconductor layer 622 by chemical precipitation using cadmium acetate and thiourea, as the second n-type semiconductor layer 623. Finally, a 10 nm-thick Pt film was formed, as the counter electrode 630, by sputtering on the back surface of the Ti substrate that serves as the conductor 621. The semiconductor electrode 620 was disposed so that the surface of the second n-type semiconductor layer 623 faces the light incident surface 112 of the glass container 110.

The irradiation experiment with simulated sunlight was conducted on the thus produced photoelectrochemical cell 600 of Example 6, in the same manner as in Example 1. As a result of the analysis of the gas collected in the photoelectrochemical cell of the Example 6, it was confirmed that hydrogen was generated on the counter electrode. The rate of hydrogen generation was $2.9 \times 10^{-7}$ L/s. Further, since the photocurrent flowing between the semiconductor electrode and the counter electrode was 2.3 mA/cm², it was confirmed that the electrical decomposition of water was performed quantitatively. The apparent quantum efficiency was about 35%, as calculated in the same manner as in Example 4. Table 3 indicates the results. Table 3 below also indicates the Fermi levels, the band edge levels of the conduction band and the band edge levels of the valence band of the first and second n-type semiconductor layers, and the Fermi level of the conductor, as obtained in the same manner as in Examples 1 and 2, and Comparative Examples 1 to 3.

Comparative Example 6

A photoelectrochemical cell was produced as Comparative Example 6 according to the same procedure as in Example 4 except that in the semiconductor electrode, the titanium oxide film to serve as the first n-type semiconductor layer was not provided on the conductor, and a cadmium sulfide film to serve as a second n-type semiconductor layer was provided directly on the conductor.

The irradiation experiment with simulated sunlight was conducted on the thus produced photoelectrochemical cell of Comparative Example 6, in the same manner as in Example 1. As a result of the analysis of the gas collected in the photoelectrochemical cell of the Comparative Example 6, it was confirmed that hydrogen was generated on the counter electrode. The rate of hydrogen generation was $8.3 \times 10^{-8}$ L/s. Further, since the photocurrent flowing between the semiconductor electrode and the counter electrode was 0.52 mA/cm², it was confirmed that the electrical decomposition of water was performed quantitatively. The apparent quantum efficiency was about 8%, as calculated in the same manner as in Example 4. Table 3 indicates the results. Further, Table 3 below also indicates the Fermi level, the band edge level of the conduction band and the band edge level of the valence band in the second n-type semiconductor layer, and the Fermi level of the conductor, as obtained in the same manner as in Examples 1 and 2, and Comparative Examples 1 to 3.

Comparative Example 7

A photoelectrochemical cell was produced as Comparative Example 7 according to the same procedure as in Example 4 except that in the semiconductor electrode, a 1 μm-thick strontium titanate film was provided on the first n-type semiconductor layer as a second n-type semiconductor layer instead of the cadmium sulfide film.

The irradiation experiment with simulated sunlight was conducted on the thus produced photoelectrochemical cell of Comparative Example 7, in the same manner as in Example 1. When the photoelectrochemical cell of Comparative Example 7 was irradiated with light, although it was recognized that gas was generated on the surface of the counter electrode, the generation amount was too small to be detected. Table 3 indicates the results. Table 3 below also indicates the Fermi levels, the band edge levels of the conduction band and the band edge levels of the valence band of the first and second n-type semiconductor layers, and the Fermi level of the conductor, as obtained in the same manner as in Examples 1 and 2, and Comparative Examples 1 to 3.

Comparative Example 8

A photoelectrochemical cell was produced as Comparative Example 8 according to the same procedure as in Example 4 except that in the semiconductor electrode, the titanium oxide film that serves as the first n-type semiconductor layer was not provided on the conductor, and a 1 μm-thick strontium titanate film was provided on the conductor as a second n-type semiconductor layer.

The irradiation experiment with simulated sunlight was conducted on the thus produced photoelectrochemical cell of Comparative Example 8, in the same manner as in Example 1. As a result of the analysis of the gas collected in the photoelectrochemical cell of the Comparative Example 8, it was confirmed that hydrogen was generated on the counter electrode. The rate of hydrogen generation was $1.6 \times 10^{-8}$ L/s. Further, since the photocurrent flowing between the semiconductor electrode and the counter electrode was 0.12 mA/cm$^2$, it was confirmed that the electrical decomposition of water was performed quantitatively. The apparent quantum efficiency was about 10%, as calculated using the calculation formula indicated in Example 1. Here, the calculation was performed, assuming that the photocurrent density that can occur due to sunlight to be possibly absorbed in the band gap (3.2 eV) of the semiconductor material (SrTiO$_3$) used for the second n-type semiconductor layer was 1.2 mA/cm$^2$. Table 3 indicates the results. Table 3 below also indicates the Fermi level, the band edge level of the conduction band and the band edge level of the valence band in the second n-type semiconductor layer, and the Fermi level of the conductor, as obtained in the same manner as in Examples 1 and 2, and Comparative Examples 1 to 3.

TABLE 3

|  |  | SECOND N-TYPE SEMICONDUCTOR LAYER | FIRST N-TYPE SEMICONDUCTOR LAYER | CONDUCTOR | QUANTUM EFFICIENCY (%) |
|---|---|---|---|---|---|
| EX. 4 | MATERIAL COMPOSITION | CdS | TiO$_2$ | ITO | 28 |
|  | FERMI LEVEL | −5.24 eV | −4.34 eV | −4.24 eV |  |
|  | CONDUCTION BAND | −4.04 eV | −4.24 eV | — |  |
|  | VALENCE BAND | −6.54 eV | −7.44 eV | — |  |
| EX. 5 | MATERIAL COMPOSITION | CdS | TiO$_2$ | Ti | 32 |
|  | FERMI LEVEL | −5.24 eV | −4.34 eV | −4.33 eV |  |
|  | CONDUCTION BAND | −4.04 eV | −4.24 eV | — |  |
|  | VALENCE BAND | −6.54 eV | −7.44 eV | — |  |
| EX. 6 | MATERIAL COMPOSITION | CdS | TiO$_2$ | Ti | 35 |
|  | FERMI LEVEL | −5.24 eV | −4.34 eV | −4.33 eV |  |
|  | CONDUCTION BAND | −4.04 eV | −4.24 eV | — |  |
|  | VALENCE BAND | −6.54 eV | −7.44 eV | — |  |
| C. EX. 6 | MATERIAL COMPOSITION | CdS | — | ITO | 8 |
|  | FERMI LEVEL | −5.24 eV | — | −4.24 eV |  |
|  | CONDUCTION BAND | −4.04 eV | — | — |  |
|  | VALENCE BAND | −6.54 eV | — | — |  |
| C. EX. 7 | MATERIAL COMPOSITION | SrTiO$_3$ | TiO$_2$ | ITO | — |
|  | FERMI LEVEL | −4.24 eV | −4.34 eV | −4.24 eV |  |
|  | CONDUCTION BAND | −4.14 eV | −4.24 eV | — |  |
|  | VALENCE BAND | −7.34 eV | −7.44 eV | — |  |
| C. EX. 8 | MATERIAL COMPOSITION | SrTiO$_3$ | — | ITO | 10 |
|  | FERMI LEVEL | −4.24 eV | — | −4.24 eV |  |

TABLE 3-continued

|  | SECOND N-TYPE SEMICONDUCTOR LAYER | FIRST N-TYPE SEMICONDUCTOR LAYER | CONDUCTOR | QUANTUM EFFICIENCY (%) |
|---|---|---|---|---|
| CONDUCTION BAND | −4.14 eV | — | — | |
| VALENCE BAND | −7.34 eV | — | — | |

As seen from Table 3, the semiconductor electrodes of Examples 4 to 6 each had the band edge level of the conduction band and the band edge level of the valence band in the second n-type semiconductor layer respectively higher than the band edge level of the conduction band and the band edge level of the valence band in the first n-type semiconductor layer. Furthermore, the Fermi levels of the conductor, the first n-type semiconductor layer and the second n-type semiconductor layer increased in the order of the second n-type semiconductor layer, the first n-type semiconductor layer and the conductor. The Fermi level $E_{F1}$ of the first n-type semiconductor layer was −4.44 eV or more, and the band edge level $E_{V2}$ of the valence band in the second n-type semiconductor layer was −5.67 eV or less, relative to the vacuum level, while the semiconductor electrode was in contact with an electrolyte at a pH of 0 and a temperature of 25° C.

As described above, the conductor, the first n-type semiconductor layer and the second n-type semiconductor layer in each of Examples 4 to 6 had the same band structure as the conductor 221, the first n-type semiconductor layer 222 and the second n-type semiconductor layer 223 in Embodiment 2 (see FIG. 5 and FIG. 6).

Further, the semiconductor electrode in Comparative Example 7 had the band edge level of the conduction band and the band edge level of the valence band in the second n-type semiconductor layer respectively higher than the band edge level of the conduction band and the band edge level of the valence band in the first n-type semiconductor layer. Furthermore, the Fermi level of the first n-type semiconductor layer was lower than the Fermi level of the second n-type semiconductor layer, and the Fermi level of the conductor was higher than the Fermi level of the first n-type semiconductor layer. Furthermore, the Fermi level of the first n-type semiconductor layer was −4.44 eV or more, and the band edge level of the valence band in the second n-type semiconductor layer was −5.67 eV or less, relative to the vacuum level, while the semiconductor electrode was in contact with an electrolyte at a pH of 0 and a temperature of 25° C.

As described above, the conductor, the first n-type semiconductor layer and the second n-type semiconductor layer of Comparative Example 7 had the same band structure as the conductor 171, the first n-type semiconductor layer 172 and the second n-type semiconductor layer 173 in Comparative Embodiment 2-1 of Embodiment 2 (see FIG. 7 and FIG. 8).

In view of the above results, it was confirmed that, in the semiconductor electrode of each photoelectrochemical cell of Examples 4 to 6, efficient charge separation between the electrons and holes generated by photoexcitation inside the second n-type semiconductor layer allows the probability of the recombination between the generated electrons and holes to be reduced, resulting in a higher apparent quantum efficiency than in Comparative Examples 6 and 8.

As described above, in the photoelectrochemical cell of Comparative Example 7, although it was recognized that gas was generated on the surface of the counter electrode, the generation amount was too small to be detected.

In view of these results, it was confirmed that, in the semiconductor electrode of the photoelectrochemical cell of Comparative Example 7, since the Fermi level of the first n-type semiconductor layer was lower than the Fermi level of the second n-type semiconductor layer as indicated in Table 3, Schottky barriers occur at the junction plane between the first n-type semiconductor layer and the second n-type semiconductor layer, which renders charge separation between the electrons and holes generated by photoexcitation inside the second n-type semiconductor layer impossible, thus resulting in a high probability of the recombination between the generated electrons and holes.

The same experiment was conducted for each photoelectrochemical cell of Examples 5 and 6. As a result, the apparent quantum efficiency in Example 5 was 32%, and in Example 6 was 35%, as indicated in Table 3.

It could be confirmed from these results that since the ohmic loss derived from the conducting wire was eliminated in the photoelectrochemical cell of Example 3, the quantum efficiency was further improved, compared to the photoelectrochemical cell of Example 1 or 2.

It should be noted that an $Na_2SO_3$ aqueous solution containing $Na_2S$ was used as an electrolyte in each photoelectrochemical cell of Examples 4 to 6 and Comparative Examples 6 to 8. In view of this, it is conceivable that when the semiconductor electrode was irradiated with light, the reaction that proceeded in the semiconductor electrode was not an oxygen evolution reaction according to the above-indicated reaction formula (1) but a reaction according to the below-indicated reaction formula (3). Further, it is conceivable that the reaction expressed by the aforementioned reaction formula (2) proceeded in the counter electrode.

Formula (3):

$$2h^+ + S^{2-} \rightarrow S \quad (3)$$

It should be noted that although Examples 1 to 6 using an n-type semiconductor layer were shown, similar results can be obtained also by using a p-type semiconductor layer instead of the n-type semiconductor layer. For example, it also is possible to use a p-type semiconductor layer with a gradient composition of $Ga_2O_3$—GaN to be obtained by forming a $Ga_2O_3$ film by reaction sputtering and further nitriding it in the same manner as in Example 3. Also in this case, the apparent quantum efficiency is expected to be improved, as is the case of Example 1. Further, as another example, it also is possible to use a semiconductor electrode to be obtained by forming, as a first p-type semiconductor layer, a copper oxide (I) ($Cu_2O$) film on a conductor by reaction sputtering, and further forming, as a second p-type semiconductor layer, a $CuInS_2$ film on the first p-type semiconductor layer by sputtering. Also in this case, the apparent quantum efficiency is expected to be improved, as is the case of Example 2, for example.

INDUSTRIAL APPLICABILITY

The photoelectrochemical cell and the energy system of the present invention can improve the quantum efficiency of the hydrogen evolution reaction by irradiation with light, and thus are useful as a domestic power generation system and the like.

The invention claimed is:

1. A photoelectrochemical cell comprising:
a semiconductor electrode including a conductor and an n-type semiconductor layer disposed on the conductor;
a counter electrode connected electrically to the conductor;
an electrolyte in contact with surfaces of the n-type semiconductor layer and the counter electrode; and
a container accommodating the semiconductor electrode, the counter electrode and the electrolyte, wherein
the photoelectrochemical cell generates hydrogen by irradiation of the n-type semiconductor layer with light, and
relative to a vacuum level,
(I) band edge levels of a conduction band and a valence band in a surface near-field region of the n-type semiconductor layer, respectively, are equal to or higher than band edge levels of a conduction band and a valence band in a junction plane near-field region of the n-type semiconductor layer with the conductor,
(II) a Fermi level of the junction plane near-field region of the n-type semiconductor layer is higher than a Fermi level of the surface near-field region of the n-type semiconductor layer, and
(III) a Fermi level of the conductor is higher than the Fermi level of the junction plane near-field region of the n-type semiconductor layer.

2. The photoelectrochemical cell according to claim 1, wherein
the n-type semiconductor layer includes at least two elements, and
at least one of the elements in the n-type semiconductor layer has a concentration increasing or decreasing along a thickness direction of the n-type semiconductor layer.

3. The photoelectrochemical cell according to claim 2, wherein
in the case of the electrolyte at a pH of 0 and a temperature of 25° C., relative to the vacuum level,
the Fermi level of the junction plane near-field region of the n-type semiconductor layer is −4.44 eV or more, and
the band edge level of the valence band in the surface near-field region of the n-type semiconductor layer is −5.67 eV or less.

4. The photoelectrochemical cell according to claim 1, wherein
the n-type semiconductor layer includes at least one selected from the group consisting of oxide, nitride and oxynitride.

5. The photoelectrochemical cell according to claim 1, wherein
the n-type semiconductor layer contains anatase-type titanium oxide and rutile-type titanium oxide,
the present ratio of the anatase-type titanium oxide is higher than the present ratio of the rutile-type titanium oxide in the surface near-field region of the n-type semiconductor layer, and
the present ratio of the rutile-type titanium oxide is higher than the present ratio of the anatase-type titanium oxide in the junction plane near-field region of the n-type semiconductor layer.

6. The photoelectrochemical cell according to claim 5, wherein
in the n-type semiconductor layer, the present ratio of the anatase-type titanium oxide increases from the junction plane with the conductor toward the surface, and in the n-type semiconductor layer, the present ratio of the rutile-type titanium oxide increases from the surface toward the junction plane with the conductor.

7. The photoelectrochemical cell according to claim 1, wherein
the n-type semiconductor layer includes a first n-type semiconductor layer disposed on the conductor and a second n-type semiconductor layer disposed on the first n-type semiconductor layer, and
relative to the vacuum level,
(i) band edge levels of a conduction band and a valence band in the second n-type semiconductor layer, respectively, are equal to or higher than band edge levels of a conduction band and a valence band in the first n-type semiconductor layer,
(ii) a Fermi level of the first n-type semiconductor layer is higher than a Fermi level of the second n-type semiconductor layer, and
(iii) a Fermi level of the conductor is higher than the Fermi level of the first n-type semiconductor layer.

8. The photoelectrochemical cell according to claim 7, wherein
in the case of the electrolyte at a pH of 0 and a temperature of 25° C., relative to the vacuum level,
the Fermi level of the first n-type semiconductor layer is −4.44 eV or more, and
the band edge level of the valence band in the second n-type semiconductor layer is −5.67 eV or less.

9. The photoelectrochemical cell according to claim 7, wherein
the second n-type semiconductor layer includes one selected from the group consisting of oxide, nitride and oxynitride.

10. The photoelectrochemical cell according to claim 7, wherein
the first n-type semiconductor layer is composed of rutile-type titanium oxide, and
the second n-type semiconductor layer is composed of anatase-type titanium oxide.

11. A photoelectrochemical cell comprising:
a semiconductor electrode including a conductor and a p-type semiconductor layer disposed on the conductor;
a counter electrode connected electrically to the conductor;
an electrolyte in contact with surfaces of the p-type semiconductor layer and the counter electrode; and
a container accommodating the semiconductor electrode, the counter electrode and the electrolyte, wherein
the photoelectrochemical cell generates hydrogen by irradiation of the p-type semiconductor layer with light, and
relative to the vacuum level,
(I) band edge levels of a conduction band and a valence band in a surface near-field region of the p-type semiconductor layer, respectively, are lower than band edge levels of a conduction band and a valence band in a junction plane near-field region of the p-type semiconductor layer with the conductor,
(II) a Fermi level of the junction plane near-field region of the p-type semiconductor layer is lower than a Fermi level of the surface near-field region of the p-type semiconductor layer, and
(III) a Fermi level of the conductor is lower than the Fermi level of the junction plane near-field region of the p-type semiconductor layer.

12. The photoelectrochemical cell according to claim 11, wherein the p-type semiconductor layer includes at least two elements, and at least one of the elements in the p-type semiconductor layer has a concentration increasing or decreasing along a thickness direction of the p-type semiconductor layer.

13. The photoelectrochemical cell according to claim 12, wherein in the case of the electrolyte at a pH of 0 and a temperature of 25° C., relative to the vacuum level, the Fermi level of the junction plane near-field region of the p-type semiconductor layer is −5.67 eV or less, and the band edge level of the conduction band in the surface near-field region of the p-type semiconductor layer is −4.44 eV or more.

14. The photoelectrochemical cell according to claim 11, wherein the p-type semiconductor layer is composed of at least one selected from the group consisting of oxide, nitride and oxynitride.

15. The photoelectrochemical cell according to claim 11, wherein the p-type semiconductor layer includes a first p-type semiconductor layer disposed on the conductor, and a second p-type semiconductor layer disposed on the first p-type semiconductor layer, and relative to the vacuum level, (i) band edge levels of a conduction band and a valence band in the second p-type semiconductor layer, respectively, are lower than band edge levels of a conduction band and a valence band in the first p-type semiconductor layer, (ii) a Fermi level of the first p-type semiconductor layer is lower than a Fermi level of the second p-type semiconductor layer, and (iii) a Fermi level of the conductor is lower than the Fermi level of the first p-type semiconductor layer.

16. The photoelectrochemical cell according to claim 15, wherein in the case of the electrolyte at a pH of 0 and a temperature of 25° C., relative to the vacuum level, the Fermi level of the first p-type semiconductor layer is −5.67 eV or less, and the band edge level of the conduction band in the second p-type semiconductor layer is −4.44 eV or more.

17. The photoelectrochemical cell according to claim 15, wherein the second p-type semiconductor layer includes one selected from the group consisting of oxide, nitride and oxynitride.

18. The photoelectrochemical cell according to claim 1, wherein the counter electrode is disposed on the conductor.

19. An energy system comprising:

the photoelectrochemical cell according to claim 1;

a hydrogen storage for storing hydrogen generated inside the photoelectrochemical cell, the hydrogen storage being connected to the photoelectrochemical cell by a first pipe; and a fuel cell for converting the hydrogen stored in the hydrogen storage into electricity, the cell being connected to the hydrogen storage by a second pipe.

20. The photoelectrochemical cell according to claim 11, wherein the counter electrode is disposed on the conductor.

21. An energy system comprising:

the photoelectrochemical cell according to claim 11;

a hydrogen storage for storing hydrogen generated inside the photoelectrochemical cell, the hydrogen storage being connected to the photoelectrochemical cell by a first pipe; and a fuel cell for converting the hydrogen stored in the hydrogen storage into electricity, the cell being connected to the hydrogen storage by a second pipe.

* * * * *